United States Patent
Jain et al.

(10) Patent No.: US 11,738,934 B2
(45) Date of Patent: *Aug. 29, 2023

(54) CLOUD COMPUTER SYSTEM FOR CONTROLLING CLUSTERS OF REMOTE DEVICES

(71) Applicant: 6D Bytes Inc., Sunnyvale, CA (US)

(72) Inventors: Vipin Jain, Saratoga, CA (US); Venkateswaran Ayalur, Cupertino, CA (US); Vijayasimha Doddabalapur, Foster City, CA (US)

(73) Assignee: 6D BYTES INC., Sunnyvale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/683,048

(22) Filed: Feb. 28, 2022

(65) Prior Publication Data

US 2022/0185573 A1 Jun. 16, 2022

Related U.S. Application Data

(63) Continuation of application No. 16/051,166, filed on Jul. 31, 2018, now Pat. No. 11,286,101.

(Continued)

(51) Int. Cl.
*B65D 47/04* (2006.01)
*B65D 83/06* (2006.01)
(Continued)

(52) U.S. Cl.
CPC .............. *B65D 83/06* (2013.01); *A47F 1/035* (2013.01); *A47J 43/0722* (2013.01);
(Continued)

(58) Field of Classification Search
CPC .... B65G 65/4881; B65G 3/04; G01G 13/026; B25J 9/1602; B25J 9/0096; B25J 13/006;
(Continued)

(56) References Cited

U.S. PATENT DOCUMENTS

| 674,057 A | 5/1901 | Edison |
|---|---|---|
| 2,849,215 A | 8/1958 | Hurst |

(Continued)

FOREIGN PATENT DOCUMENTS

TW        132888        4/1990

OTHER PUBLICATIONS

Wang et al., Architecting a Distributed Bioinformatics Platform with iRODS and iPlant Agave API, 2016, IEEE, p. 420-423 (Year: 2016).*

(Continued)

*Primary Examiner* — Mcdieunel Marc
(74) *Attorney, Agent, or Firm* — Fountainhead Law Group P.C.

(57) ABSTRACT

In one embodiment, a cloud computer system is disclosed for controlling a plurality of remote devices comprising a cloud server including a cloud based operating system comprising a data model stored in a computer memory. The data model includes commands performed by a plurality of remote devices in a remote system and, for each remote device, one or more operations for triggering processes executed by the remote device. The cloud based operating system generates a set of instructions from the plurality of commands and corresponding operations to control a portion of the remote devices to perform a task.

47 Claims, 54 Drawing Sheets

Related U.S. Application Data

(60) Provisional application No. 62/652,740, filed on Apr. 4, 2018.

(51) Int. Cl.

| | | |
|---|---|---|
| *B65D 25/38* | (2006.01) | |
| *G01F 11/26* | (2006.01) | |
| *B25J 9/00* | (2006.01) | |
| *B25J 11/00* | (2006.01) | |
| *B25J 15/06* | (2006.01) | |
| *A47F 1/035* | (2006.01) | |
| *B65G 65/48* | (2006.01) | |
| *G01G 13/02* | (2006.01) | |
| *A47J 43/07* | (2006.01) | |
| *B25J 9/16* | (2006.01) | |
| *G05B 19/414* | (2006.01) | |
| *B25J 13/00* | (2006.01) | |
| *G06F 40/30* | (2020.01) | |
| *A47G 19/34* | (2006.01) | |
| *B67D 1/00* | (2006.01) | |
| *B65G 3/04* | (2006.01) | |

(52) U.S. Cl.
CPC ............. *B25J 9/0096* (2013.01); *B25J 9/161* (2013.01); *B25J 9/1602* (2013.01); *B25J 9/1661* (2013.01); *B25J 11/0045* (2013.01); *B25J 13/006* (2013.01); *B25J 15/0608* (2013.01); *B65D 25/38* (2013.01); *B65D 47/04* (2013.01); *B65G 65/4881* (2013.01); *G01F 11/261* (2013.01); *G01G 13/026* (2013.01); *G05B 19/4147* (2013.01); *G06F 40/30* (2020.01); *A47G 19/34* (2013.01); *B65G 3/04* (2013.01); *B67D 1/0041* (2013.01); *B67D 2210/00076* (2013.01); *B67D 2210/00144* (2013.01); *G05B 2219/40* (2013.01)

(58) Field of Classification Search
CPC . B25J 9/1661; B25J 21/00; B25J 9/161; B25J 11/00; B25J 15/0608; B25J 11/0045; G01F 11/261; G01F 13/001; G01F 13/005; B65D 47/04; B65D 25/38; B65D 83/06; A47F 1/035; A47F 10/06; B67D 1/06; B67D 1/0888; B67D 2210/00076; B67D 1/0041; B67D 2210/00144; G05B 19/4147; G05B 2219/40; G06F 40/30; A47J 43/0722; A47G 19/34
See application file for complete search history.

(56) References Cited

U.S. PATENT DOCUMENTS

| | | | |
|---|---|---|---|
| 3,933,086 | A | 1/1976 | Standing |
| 5,132,914 | A | 7/1992 | Cahlander et al. |
| 5,386,762 | A | 2/1995 | Gokey |
| 6,276,560 | B1 | 8/2001 | Belcastro |
| 7,174,830 | B1 | 2/2007 | Dong |
| 7,325,485 | B2 | 2/2008 | Carhuff et al. |
| 7,762,181 | B2 | 7/2010 | Boland et al. |
| 8,276,505 | B2 | 10/2012 | Buehler |
| 8,560,334 | B2 | 10/2013 | Lahteenmaki |
| 8,612,181 | B2 | 12/2013 | Czaja et al. |
| 8,672,187 | B2 | 3/2014 | Ophardt |
| 8,909,800 | B1 | 12/2014 | Grebenschikov et al. |
| 9,131,807 | B2 | 9/2015 | Roy et al. |
| 9,563,372 | B2 | 2/2017 | Hwang |
| 9,815,191 | B2 | 11/2017 | Oleynik |
| 9,940,797 | B2 | 4/2018 | Lamb et al. |
| 10,127,783 | B2 | 11/2018 | Laska et al. |
| 10,241,726 | B2 | 3/2019 | Hwang |
| 10,601,860 | B2 | 3/2020 | Mihan et al. |
| 10,686,620 | B2 | 6/2020 | Gould et al. |
| 2004/0173103 | A1 | 9/2004 | Won |
| 2005/0193901 | A1 | 9/2005 | Buehler |
| 2007/0106422 | A1 | 5/2007 | Jennings et al. |
| 2009/0180843 | A1 | 7/2009 | Jackson et al. |
| 2011/0018406 | A1 | 1/2011 | Hartsfield, Jr. et al. |
| 2011/0090756 | A1 | 4/2011 | Farrell et al. |
| 2013/0103198 | A1 | 4/2013 | Nakamoto et al. |
| 2013/0138515 | A1 | 5/2013 | Taniguchi et al. |
| 2013/0279288 | A1 | 10/2013 | Dong et al. |
| 2014/0344420 | A1* | 11/2014 | Rjeili ................... G06Q 10/109 709/227 |
| 2015/0058447 | A1* | 2/2015 | Albisu ................ H04L 12/2818 709/219 |
| 2015/0089497 | A1* | 3/2015 | Borzycki ............ G06F 9/45533 718/1 |
| 2015/0114236 | A1 | 4/2015 | Roy et al. |
| 2015/0188777 | A1* | 7/2015 | Frost ........................ H04L 67/34 709/223 |
| 2015/0286435 | A1 | 10/2015 | Hwang |
| 2015/0290795 | A1 | 10/2015 | Oleynik |
| 2015/0347396 | A1 | 12/2015 | Goldberger et al. |
| 2016/0052770 | A1 | 2/2016 | Ratti |
| 2016/0059412 | A1 | 3/2016 | Oleynik |
| 2016/0081515 | A1 | 3/2016 | Aboujassoum et al. |
| 2016/0179935 | A1 | 6/2016 | Bhattacharjya et al. |
| 2016/0247370 | A1 | 8/2016 | Lamb et al. |
| 2016/0338545 | A1 | 11/2016 | Shah et al. |
| 2017/0003046 | A1* | 1/2017 | Gould .................. H04L 43/0811 |
| 2017/0005817 | A1* | 1/2017 | Gould .................... H04L 12/281 |
| 2017/0011442 | A1 | 1/2017 | Hu et al. |
| 2017/0060629 | A1* | 3/2017 | Vora ........................ G06F 9/542 |
| 2017/0063855 | A1* | 3/2017 | Vajravel .................. H04L 67/01 |
| 2017/0064045 | A1* | 3/2017 | Pai .......................... H04W 4/70 |
| 2017/0221296 | A1 | 8/2017 | Jain et al. |
| 2017/0328997 | A1 | 11/2017 | Silverstein et al. |
| 2018/0183860 | A1 | 6/2018 | Majumdar |
| 2018/0206060 | A1 | 7/2018 | Yazdani et al. |
| 2018/0253459 | A1 | 9/2018 | Srinivasan Natesan et al. |
| 2018/0262388 | A1 | 9/2018 | Johnson et al. |
| 2019/0308318 | A1 | 10/2019 | Jain et al. |
| 2019/0310611 | A1 | 10/2019 | Jain et al. |
| 2019/0333312 | A1 | 10/2019 | Jain et al. |
| 2020/0090099 | A1 | 3/2020 | Bhattacharjya et al. |
| 2020/0188400 | A1 | 6/2020 | Liu et al. |

OTHER PUBLICATIONS

Liu et al., Research and implementation of random test generator for VLIW DSPs, 2013, IEEE, p. 524-527 (Year: 2013).*

Hulea et al., WiPlatform, a sensing and event processing platform, 2015, IEEE, p. 214-317 (Year: 2015).*

Drucker et al., Faster Secure Cloud Computations with a Trusted Proxy, 2017, IEEE, p. 61-67 (Year: 2017).*

D. Sulaiman, et al., "MAMoC: Multisite Adaptive Offloading Framework for Mobile Cloud Applications," 2017 IEEE International Conference on Cloud Computing Technology and Science (CloudCom), 2017, 8 pages.

M. F. M. Fuzi, et al., "Virtual desktop environment on Cloud Computing Platform," 2014 IEEE 5th Control and System Graduate Research Colloquium, 2014, 5 pages.

Fuzi et al., Virtual desktop environment on Cloud computing platform, 2014, IEEE, p. 80-84 (Year: 2014).

Anonymous, "Duometer", Downloaded https://rubbermill.com/wp-content/uploads/durometer.pdf, 2022, 1 page.

Anonymous, "Rubber Properties", downloaded https://us.misumi-ec.com/pdf/fa/2010/p2121.pdf, 2022, 1 page.

Extended European Search Report dated Dec. 17, 2021 for EP Application # 19781332, 10 pages.

Montgomery, J., "Is the Domino's Pizza Tracker Real?" The Huffington Post, retrieved from http://www.huffingtonpost.com/rev-joel-montgomery/dominos-pizza-tracker_b5947734.html, last updated Dec. 7, 2014, pp. 1-6.

International Search Report and Written Opinion from PCT Application No. PCT/US2017/016298, dated Apr. 4, 2017; 8 pages.

(56) References Cited

OTHER PUBLICATIONS

International Search Report and Written Opinion dated Jun. 14, 2019 for PCT/US2019/025421, 8 pages.

Mohd Faris Mohd Fuzi et al., "Virtual Desktop Environment on Cloud Computing Platform", 2014 IEEE 5th Control and System Graduate Research Colloquium, Shah Alam, Malaysia, Aug. 11, 2014.

Dawand Sulaiman et al., "MAMoC: Multisite Adaptive Offloading Framework for Mobile Cloud Applications", 2017 IEEE 9th International Conference on Cloud Computing Technology and Science, Downloaded on Oct. 14, 2020, 8 pages.

Chi-Sheng Shih et al., "Virtual Cloud Core: Open CL Workload Sharing Framework for Connected Devices", 2013 IEEE Seventh International Symposium on Service-Oriented System Engineering, Downloaded on Oct. 14, 2020, 8 pages.

Chang Ho Yun et al., "Intelligent Management of Remote Facilities through a Ubiquitous Cloud Middleware", 2009 IEEE International Conference on Cloud Computing, Downloaded Oct. 14, 2020, 7 pages.

\* cited by examiner

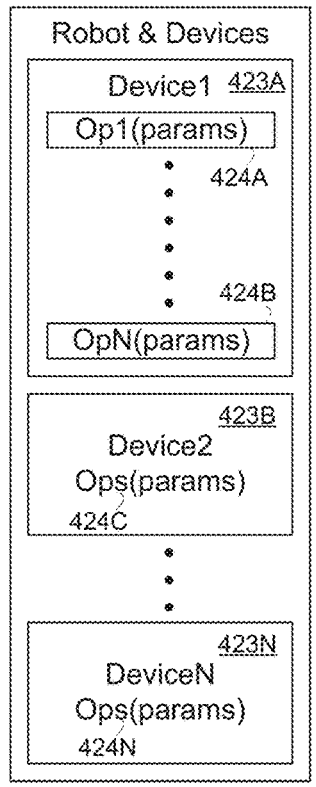 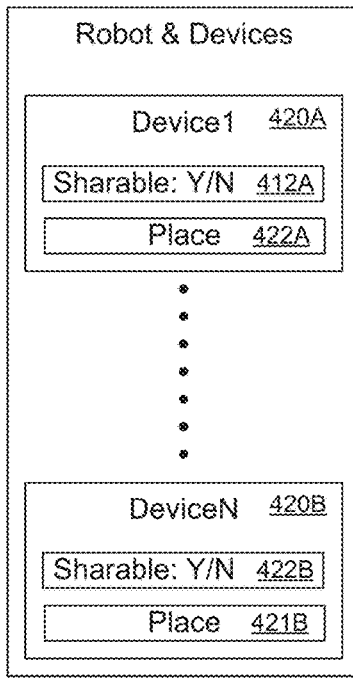 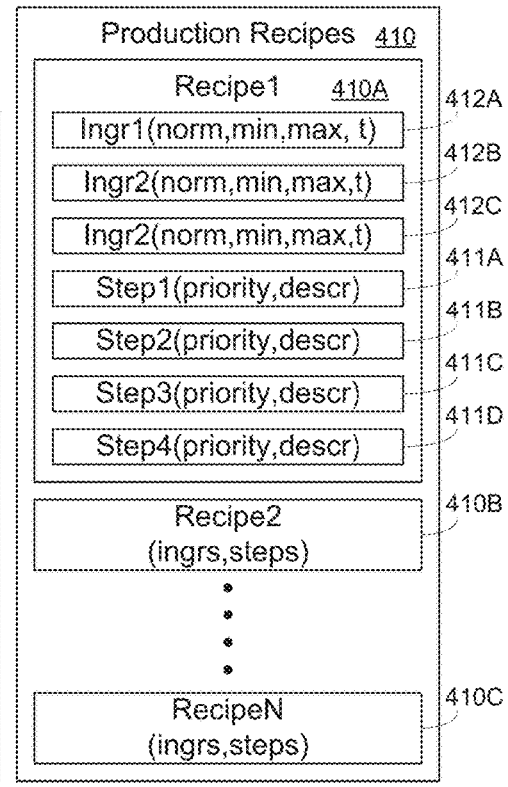
*FIG. 4C*  *FIG. 4B*  *FIG. 4A*
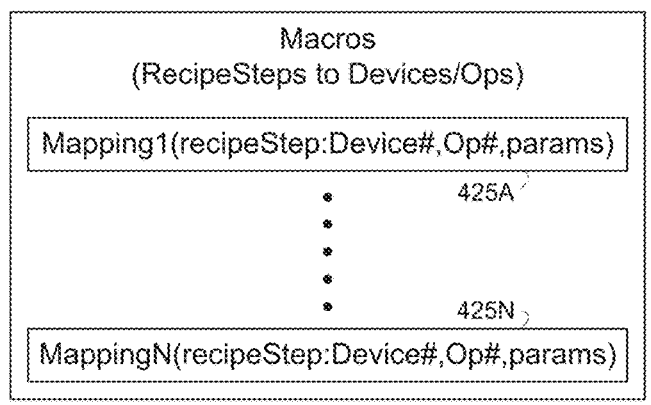 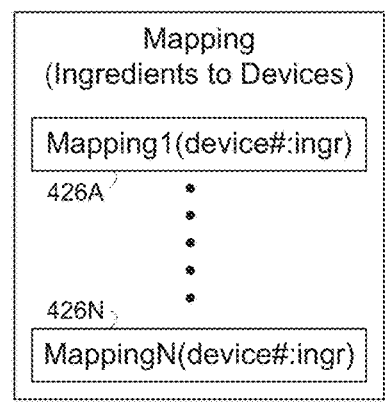
*FIG. 4D*  *FIG. 4E*

Edit Blueberry Cacao (12 oz)

| Description | Images | Ingredients | Add-ons | Steps |

Recipe ID: [illegible] _740_

Title *: Blueberry Cacao (12 oz) _741_

Primary Color:

Dark Color:

Blend Time: 60

Description:

Featured: ☐

Price: ☑ SMALL  ☐ MEDIUM  ☐ LARGE
       5.29

Cancel | Save

*FIG. 7A*

| Name | Min quantity 742 | Normal quantity 744 | Max quantity 743 | Dispense seconds 745 | |
|---|---|---|---|---|---|
| Blueberries | 110 | 120 | 130 | 8 | |
|  | 110 | 120 | 130 | 8 | ⊗ |
|  | 110 | 120 | 130 | 8 | |
| Banana | 38 | 48 | 58 | 6 | |
|  | 38 | 48 | 58 | 6 | ⊗ |
|  | 38 | 48 | 58 | 6 | |
| Apple juice | 160 | 170 | 180 | 9 | |
|  | 160 | 170 | 180 | 9 | ⊗ |
|  | 160 | 170 | 180 | 9 | |
| Chia | 7 | 9 | 11 | 9 | |
|  | 7 | 9 | 11 | 9 | ⊗ |
|  | 7 | 9 | 11 | 9 | |
| Cacao | 9 | 11 | 13 | 14 | |
|  | 9 | 11 | 13 | 14 | ⊗ |
|  | 9 | 11 | 13 | 14 | |

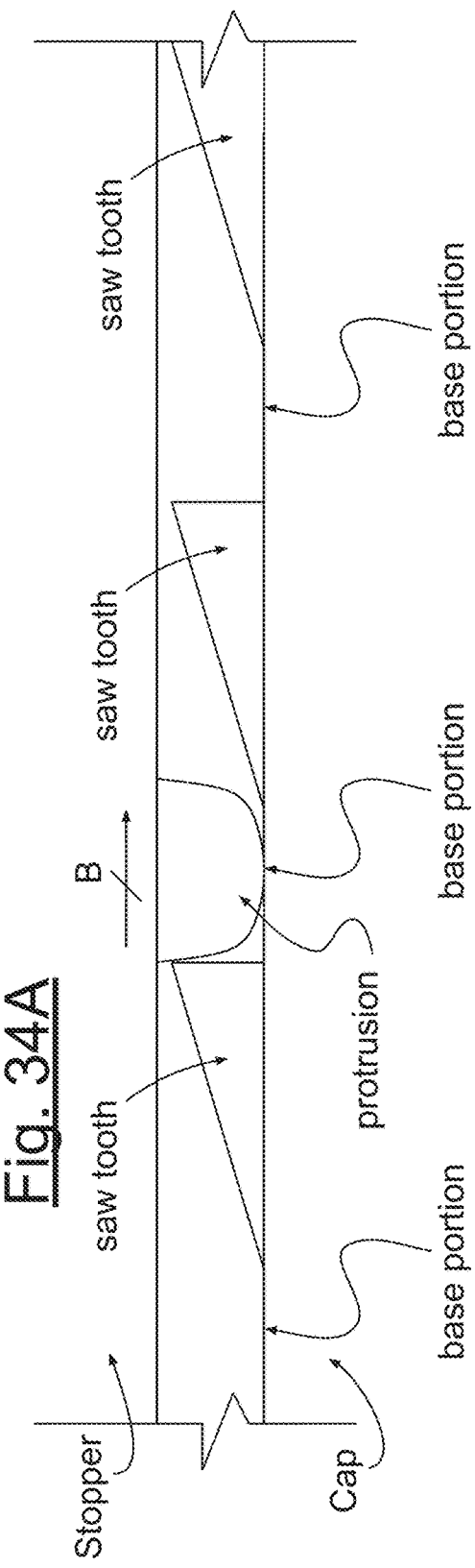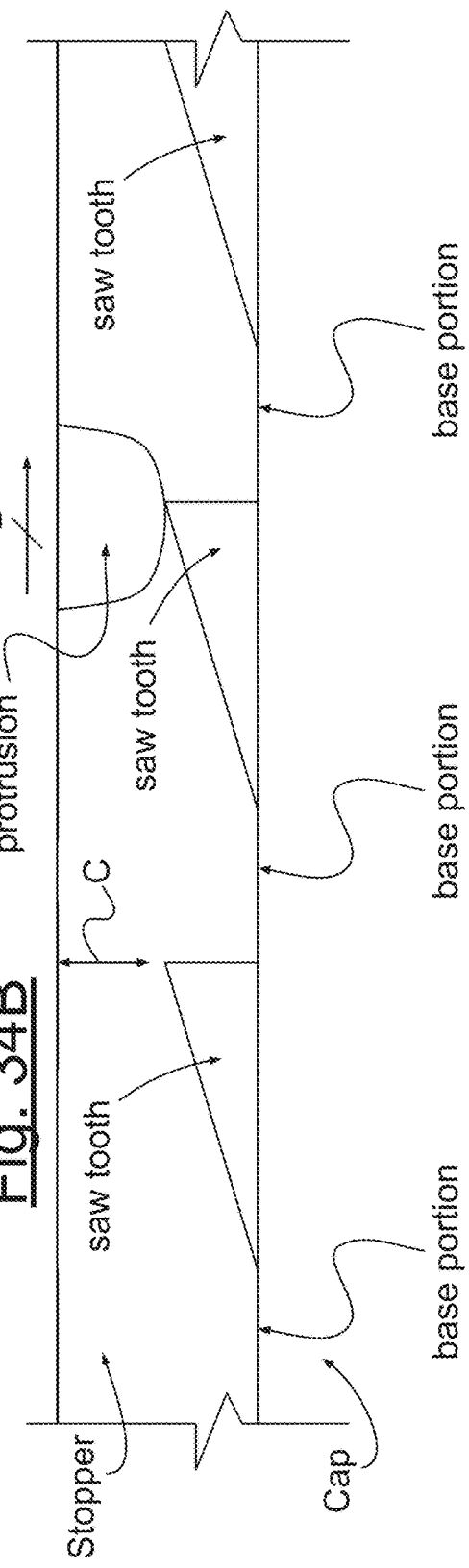

CLOUD COMPUTER SYSTEM FOR CONTROLLING CLUSTERS OF REMOTE DEVICES

CROSS REFERENCE TO RELATED APPLICATIONS

This application is a continuation of, and claims priority to, U.S. patent application Ser. No. 16/051,166, filed Jul. 31, 2018, the entire contents of which are incorporated herein by reference. U.S. patent application Ser. No. 16/051,166 claims the benefit of priority to U.S. Provisional Patent Application No. 62/652,740, filed Apr. 4, 2018, the entire contents of which are incorporated herein by reference.

BACKGROUND

The present disclosure relates to apparatuses, systems, and methods for a cloud operating system for controlling clusters of remote devices.

Autonomous systems are a technical challenge to build, yet offer far reaching benefits such as cost efficiency and flexibility. In an autonomous system (e.g., a fully automated system), devices operate with limited or no human intervention. Without human intervention, such systems must be robustly designed and highly intelligent. One technical challenge with such systems is that deployments of different instances of such systems may be challenging to control such that results and outcomes are consistent across deployments. Additionally, automated systems may include complex subsystems for preforming highly specialized tasks that may need to be controlled individually and/or collectively with other subsystems to achieve desired results. Example applications of automated systems may include automated systems that are used to manufacture products. One particular example automated system enabled by embodiments disclosed herein is an automated food production system.

SUMMARY

In one embodiment, the present disclosure includes a cloud computer system for controlling a plurality of remote devices comprising a cloud server including a cloud based operating system comprising a data model stored in a computer memory. The data model includes commands that may be performed by a plurality of remote devices in a remote system and, for each remote device, one or more operations for triggering processes executed by the remote device. The cloud based operating system generates a set of instructions from the plurality of commands and corresponding operations to control a portion of the remote devices to perform a task.

A local server is coupled to a plurality of remote devices. The local server receives the instructions from the cloud server, and the local server distributes particular instructions to corresponding remote devices. The local server distributes the instructions based on particular operations in the instructions corresponding to particular remote devices. The local server manages the execution of instructions in the remote devices, wherein each remote device executes the particular instructions received from the local server, and wherein each remote device is configured to execute a plurality of predefined device specific processes in response to the particular instruction.

In one embodiment, the present disclosure includes a computer implemented method of controlling a plurality of remote devices from a cloud computer system comprising storing a data model in memory of the cloud computer system, the data model comprising commands to be performed by a plurality of remote devices in a remote system and, for each remote device, one or more operations for triggering processes executed by the remote device. A set of instructions is generated in the cloud computer system in response to a user input, the instructions being generated from the plurality of commands and corresponding operations to control a portion of a plurality remote devices to perform a task, and the instructions sent to a local server over a network. The local server is coupled to the plurality of remote devices, the local server receiving the instructions from the cloud server and distributing particular instructions to corresponding remote devices, wherein the local server distributes the instructions based on particular operations in the instructions corresponding to particular remote devices, and wherein the local server manages the execution of instructions in the remote devices. The remote devices receive the distributed instructions and execute the particular instructions received from the local server, wherein each remote device is configured to execute a plurality of predefined device specific processes in response to the particular instruction.

The above method may be stored on a non-transitory machine-readable medium as a program executable by at least one processing unit of a computer, the program comprising sets of instructions for performing the techniques described herein.

The following detailed description and accompanying drawings provide a better understanding of the nature and advantages of the present disclosure.

BRIEF DESCRIPTION OF THE DRAWINGS

FIGS. 4A-E illustrate elements of an example cloud operating system according to one embodiment.

FIGS. 7A-H illustrate information and user interfaces for a cloud system according to an embodiment.

FIG. 34A-B illustrate the movement of the stopper in relation to the sawtooth forms on the ridge of the cap according to one embodiment.

DETAILED DESCRIPTION

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident to one skilled in the art, based on the language of the different claims, that the claimed subject matter may include some or all of the features in these examples, alone or in combination, and may further include modifications and equivalents of the features and techniques described herein.

Example Distributed Operating System

Figure 1:
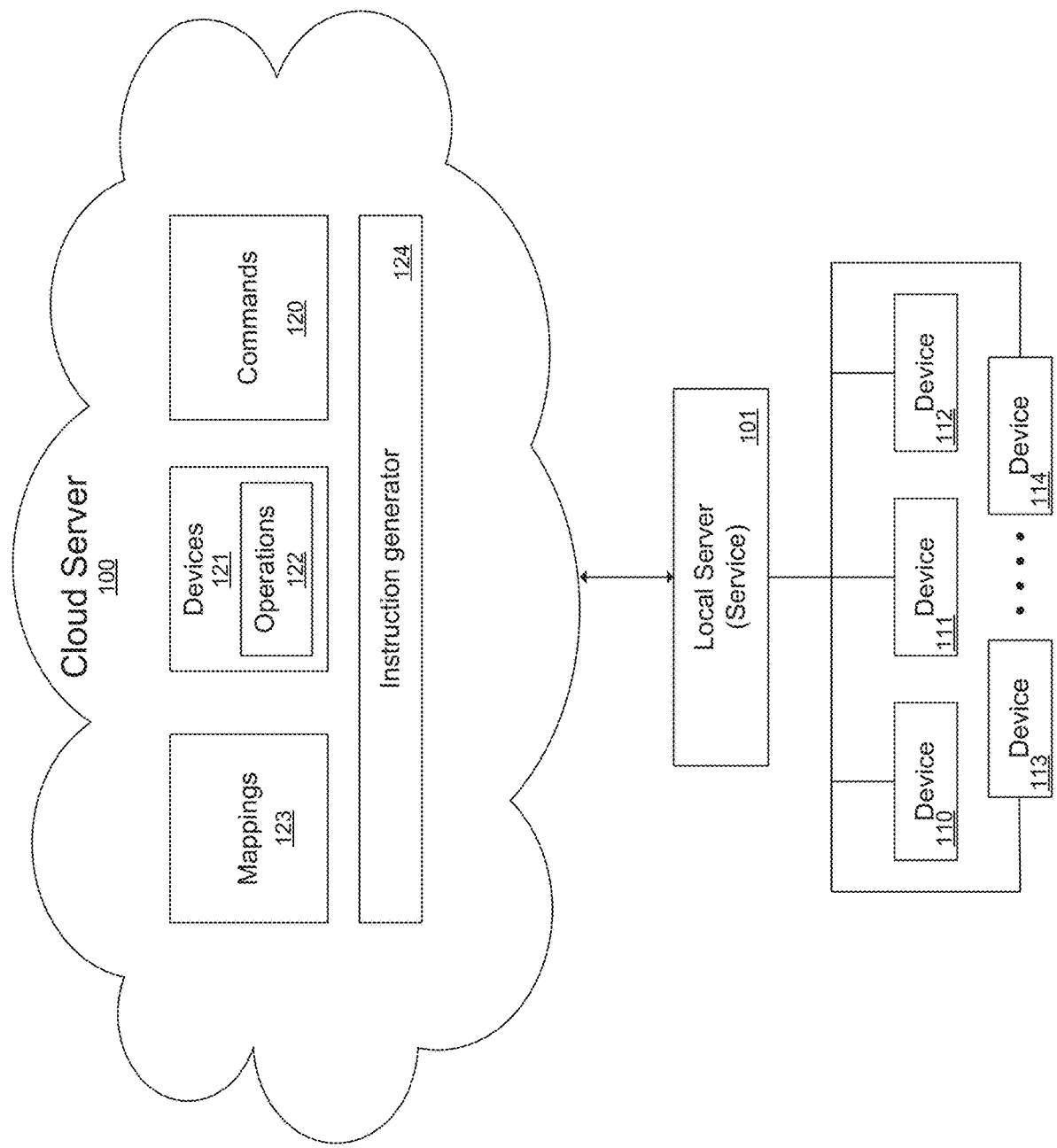
FIG. 1 illustrates a cloud server for controlling remote devices according to one embodiment.

One aspect of the disclosure includes controlling devices 110-114 from a cloud server 100 via a local server 101, which in some embodiments may include a robotic system that interacts with the devices to make a product (e.g., food). FIG. 1 illustrates a cloud based system for controlling the operation of a plurality of remote devices. Features and advantages of the present disclosure include a cloud server that generates instructions to a local server, and the local server distributes the instructions for execution by remote devices. As used herein, a cloud server comprises software executable on one or more cloud computer hardware, for example. A local server is a software service ("Local Service"), which may also execute on computer hardware, which may be local to the remote devices, for example. Embodiments of the disclosure may act as a distributed internet of things (IOT) operating system, for example, where instructions generated in a cloud computing system 100 are automatically propagated to different remote device clusters controlled by a local server 101 (aka local service). The local server 101 may distribute instructions from the cloud server 100 to particular devices 110-114 for execution. Commands 120 in the cloud server 100 are thus seamlessly translated into instructions that execute specific operations, for example. The devices may be coordinated so that their combined execution results in the completion of a task specified by a recipe in the cloud server, for example. One example embodiment described below pertains to production and delivery of physical items (e.g., food), where a cloud server issues instructions to a local server (e.g., a kiosk server), for example, and the local server distributes the instructions to a plurality of devices and at least one robotic system to prepare physical items (e.g., food). A wide range of other embodiments and applications of the features and techniques disclosed herein will be evident to those skilled in the art after reading the present disclosure.

Referring again to FIG. 1, a cloud server 100 may store information as a plurality of stored objects, for example. The stored information may specify commands 120, devices 121 and associated operations 122, and mappings 123 between particular commands and particular devices/operations, for example. The stored objects may be JSON files, table records, or any other mechanism for storing the information, for example. The cloud server 100 may be implemented on computer systems (e.g., hardware servers and storage arrays) in a data center and accessed over the Internet, for example. The commands 120 may be mapped to operations 122 to be performed by one or more of the remote devices 110-114 in a remote system. The remote devices 110-114 may be physically located away from the data center, for example. Information 121 about each device may correspond to a particular remote device and be associated with one or more operations 122 the remote device is capable of performing. The operations, when received by the associated remote device, may trigger complex device specific processes by the remote device, for example. In one embodiment, particular devices 121 have associated operations 122, and the commands 120 are mapped to one or more operations for a particular device, for example. Accordingly, invoking a command 120 may cause an instruction generator 124 on the cloud server 100 to generate a set of instructions from the commands and corresponding operations to cause a portion of the remote devices to perform a task. Instruction generator 124 may comprise a software service that puts the instructions together from the data models, mappings, and particular instructions from a user to perform particular operations, for example. In one example embodiment, one command may correspond to multiple operations performed by a plurality of remote devices. Accordingly, when a particular command is invoked, the corresponding operations mapped to the command may be combined and used to generate instructions that are sent to a local server, for example.

The local server 101 receives the instruction set from the cloud server 100. The local server 101 distributes one or more particular instructions to corresponding remote devices 110-114 coupled to the server to carry out one or more operations associated with the device. For example, if an instruction includes an operation associated with a particular device, then such instruction may be parsed out of the instruction set by the local server and sent to the targeted device to carry out the operation. Accordingly, the local server may selectively distribute the instructions based on particular operations corresponding to particular devices in the instructions received from the cloud server. Each remote device executes the particular operations in the instruction received from the local server. Each remote device may be configured to execute predefined device specific processes corresponding to the associated operations in response to receiving instructions embedded with different operations.

For example, a device 1 may be associated with an operation 1 in the cloud server 100. If a command is triggered in the cloud server that is mapped to device 1:operation 1, then the cloud server generates instructions including operation 1. When the local server parses the instructions from the cloud server, operation 1 is distributed to actual device 1 for execution. Device 1 receives operation 1 and performs a predefined process corresponding to operation 1. Similarly, as another example, device 1 may be associated with an operation 2 in the cloud server 100. If a command is triggered in the cloud server that is mapped to device 1:operation 2, then the cloud server generates instructions including operation 2. When the local server parses the instructions from the cloud server, operation 2 is distributed to actual device 1 for execution. Device 1 receives operation 2 and performs another predefined process corresponding to operation 2. Device 1 may be thusly triggered to perform a wide range of device specific processes (e.g., algorithms, complex operations, tasks, etc . . . ) by the cloud server. Likewise, as another example, a device 2 may be associated with an operation 3 in the cloud server 100. If a command is triggered in the cloud server that is mapped to device 2:operation 3, then cloud server generates instructions including operation 3. When the local server parses the instructions from the cloud server, operation 3 is distributed to actual device 2 for execution. Device 2 receives operation 3 and performs another predefined process corresponding to operation 3. Device 2 may be thusly triggered to perform a wide range of device specific processes (e.g., algorithms, complex operations, tasks, etc . . . ) by the cloud server.

In one embodiment, operations are specified in the instructions from the cloud server using operation names or descriptions. For example, instructions from the cloud server may include a string of characters such as "process":"pick" or "process": "dispense" (e.g., in a JSON file) as illustrated in an example embodiment below. In other embodiments, APIs, RPCs, COM, GPBs, or other communication protocols may be used to interface between the cloud server 100, local server 101, and remote devices 110-114, for example. In one embodiment, the instructions generated by the cloud server further comprise remote device identifications specifying the remote devices each operation is associated with. Accordingly, the local server may selectively distribute particular instructions based on the remote device identifications (e.g., name or other identifier of a device associated with each operation). For example, an instruction may identify a device by including "device" "name":"solid dispenser" or "device" "name": "robot", for example. When a robotic device receives a "pick" operation, for example, it may trigger a process inside the robotic device to move the robot in a predetermined manner, for example, as described in more detail below.

In one embodiment, the local server 101 may manage the execution of instructions in the remote devices 110-114. For example, when the local server distributes an instruction to a particular device, the device may start execution of an operation and the local server may prevent the device from receiving any further instructions until the device has completed the operation. The local server may "lock" a device, for example, after sending the device a command, and the local server may prevent other operations from being sent to the device until the current operation has been completed, for example. However, the local server may distribute operations to other devices while one or more devices are processing their operations (e.g., and thus, are locked). In one embodiment, instruction sets from the cloud server correspond to different jobs (e.g., production orders) and the instruction sets may include flags indicating that particular devices may be shared across jobs. If a device is able to be shared across jobs, then if the device is not being utilized during one job, it may be utilized during another job. Local server may manage execution of instructions across a network of devices and arbitrate initiation of operations by each device, for example.

As illustrated in example embodiments below, the commands 120 may be steps of a production recipe, where the production recipe may have multiple steps for producing a product, for example. The steps may be mapped to particular operations associated with particular devices, for example. Thus, when a production recipe is invoked, the production recipe, and the operations and devices mapped to the production recipe steps, are combined into instructions (e.g., by an instruction generator 124 in the cloud server 100) and sent to the local server 101 for distribution to each device necessary to perform specified operations to carry out the production recipe, for example.

In a multistep command, device operations 122 may be sequenced according to a specified sequence in the command so that the devices perform the specified operations in the specified sequence, for example. The specified sequence may be included in the instructions sent from the cloud server to the local server to control the sequence of execution of device operations, for example.

In one embodiment, commands 120 may be mapped to operations on a plurality of remote devices to perform a task involving multiple devices. For example, a production recipe may include steps that are mapped to operations by a robotic system and multiple devices interacting with the robotic system. Accordingly, the local server receives and distributes instructions for multiple devices with embedded operations that are executed by each device.

In one embodiment, at least one remote device is a robotic device (also referred to herein as a "robotic system"), and the robotic device and the other remote devices co-ordinate physical activity. In one embodiment, the distribution of instructions for a particular task alternates between sending an instruction to the robotic device and sending an instruction to one of the other remote devices. For example, a robotic device may receive a first operation to move an object to a predefined location, and the following operation is issued to a device in the predefined location to perform an operation involving the object (e.g., scan object, weigh object, blend, dispense, etc . . . ). The next operation may again be to the robotic device to move the object to another physical location, where the coordinated physical activity resulting from alternating operations between the robotic device and the other devices executes a complete task.

In one example embodiment, the local server 101 or device(s) 110-114 in the local server sends identification code(s) to the cloud server 100. The cloud server may generate instructions and operations in concert with the identification code(s). Such capability(ies) enable the cloud server(s) and local server(s) to operate and interoperate a heterogeneous mixture of servers and devices with varied capabilities.

In one example embodiment, the local server(s) 101 and/or device(s) 110-114 sends information pertaining to the features of components (e.g., ingredients) that are loaded into the device—examples in the case of food may be brand, cut size, traceability codes, viscosity, granularity, expiration date, quantity, or the like. The cloud server 100 may use this information to dynamically generate the offerings at the local station(s).

In one embodiment, the remote devices 110-114 are coupled to the local server 101 through a wired network (e.g., Ethernet). In another embodiment, the remote devices 110-114 are coupled to the local server 101 through a wireless network (e.g., WiFi). Other embodiments may include combinations of devices wired and wirelessly networked to the local server, for example.

Example System for Controlling Remote Devices Interacting with a Robotic System

Figure 2:
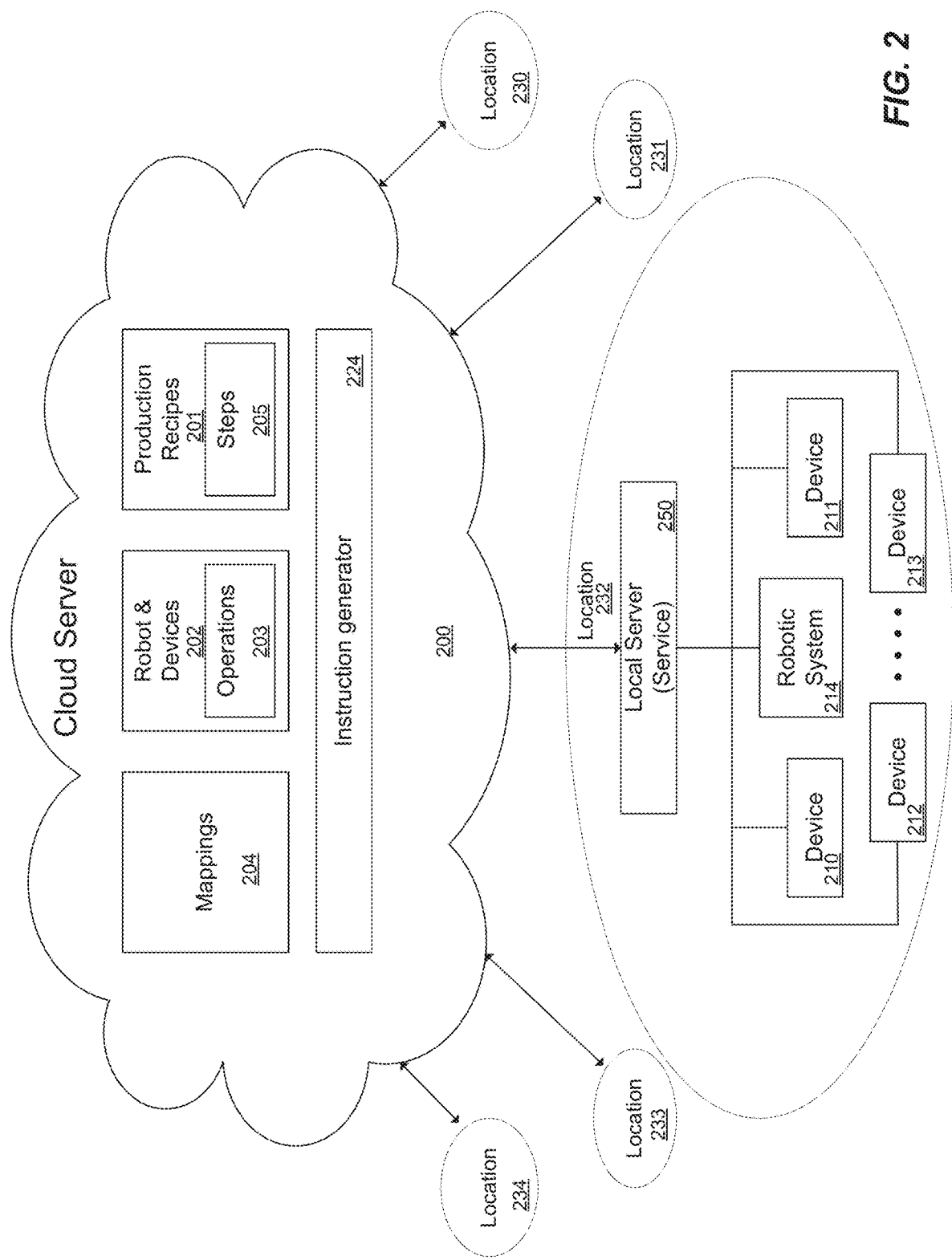
FIG. 2 illustrates a cloud server for controlling remote devices across different locations according to one embodiment.

As mentioned above, features and advantages of the present disclosure include coordinating physical activity between a robotic system and a plurality of remote devices from a cloud server. FIG. 2 illustrates two independent aspects of the disclosure. First, as described in more detail below, a cloud server 200 may include production recipes 201, devices 202 and operations 203, and mappings 204 for multiple locations 230-233. Second, one or more devices 210-214 may be a robotic system (e.g., device 214). Robotic systems refer broadly to actuation mechanisms that can interact with the remote devices 210-213 to perform various tasks. One example task where a robotic system is used to interact with remote devices is food preparation, as described in more detail below. One example type of robotic system is a robotic arm as illustrated below. However, it is to be understood that robotic systems according to the present disclosure are not to be limited to robotic arms. Accordingly, production recipe steps 205 may be mapped to operations 203 that cause a robotic device, such as a robotic arm, for example. Mappings 204 may associate particular steps 205 with one or more operations 203 on devices and one or more robotic system operations, for example. In one embodiment, the robotic system 214 coordinates physical activity, and the robotic system may move items being operated on between devices 210-213, where each device may perform some operation on the item. The item may be a part, product under production, product being manufactured, or the like, for example. One embodiment described below illustrates application of some techniques described herein to the production of food items, for example.

Figure 3:
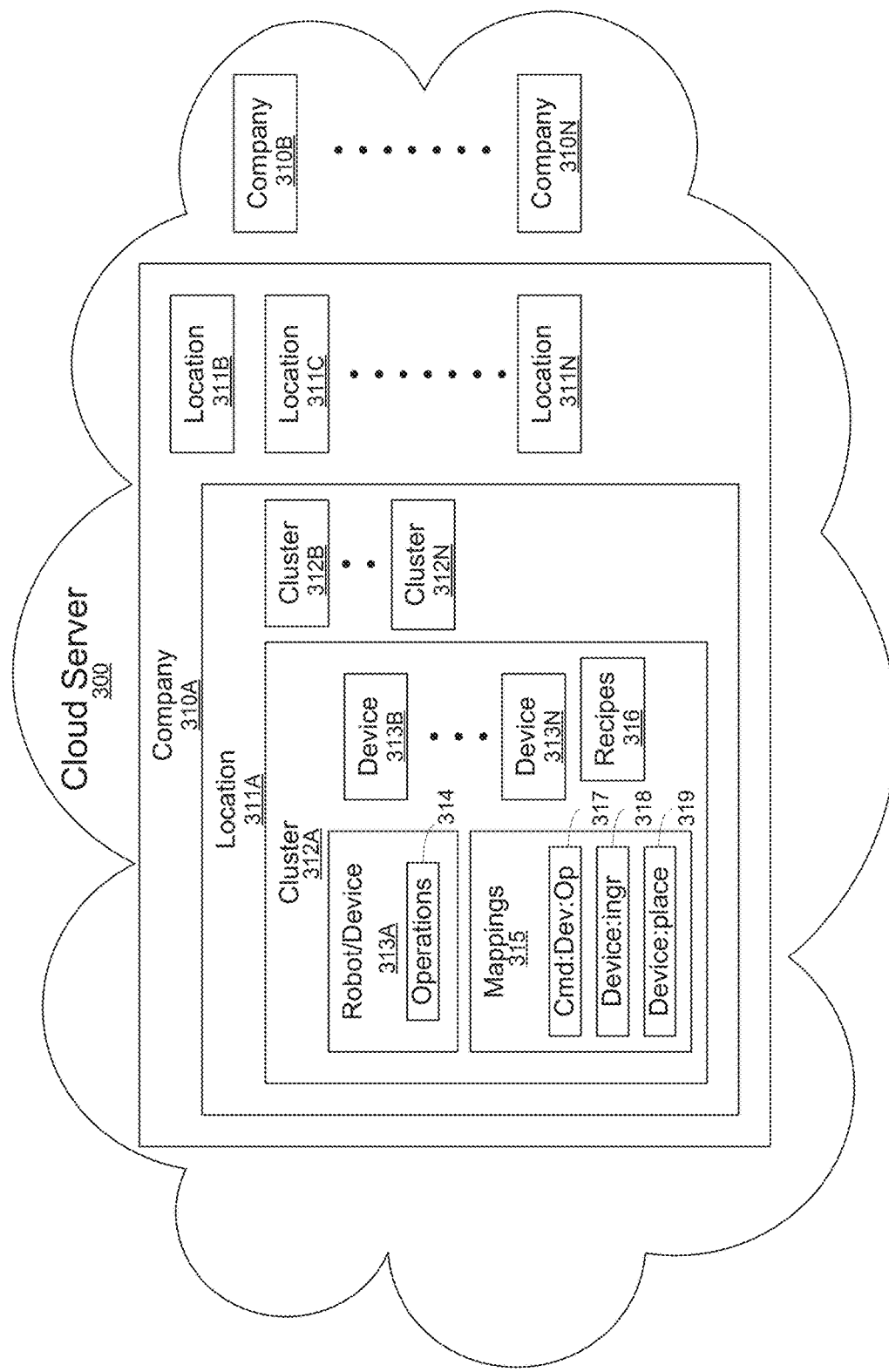
FIG. 3 illustrates a cloud server for controlling remote devices according to another embodiment.

FIG. 3 illustrates configuring clusters of devices in a cloud server 300 where different companies may have different clusters of devices in different locations, configured in different ways, for example. Different companies 310A-N may have different clusters 312A-N of devices in different locations 311A-N, and the clusters in each location may have different devices 313A-N and different mappings 314, for example. From FIG. 3, it can be seen that a variety of entities may exist in a cloud server.

Companies 310: The list of all the companies one or more systems are deployed at. Each company may have its own management and financial models.

Locations 311: The systems can be distributed across several locations. Various embodiments may have no hard-coded relationship between companies and locations, and each Location may or may not be associated with a specific Company.

Clusters 312: A cluster comprises a local server (also referred to herein as a local service or local software service) and a plurality of devices (e.g., IoT devices and a robotic arm). Each location can have one or more clusters. Particular clusters at particular locations may have devices 313 and associated operations 314, commands 316 (e.g., recipes) as well as mappings 315 between commands (e.g., recipe steps) and devices and operations 317 (and particular operation parameters), devices and ingredients 318, and/or devices and position information 319 ("place"), for example. Accordingly, different device clusters 312 may, for example, be configured to make different products by performing different coordinated tasks, for example. In one example embodiment, clusters 312 are Kiosks described below, and may be configured to make different food items, such as a Smoothie making Kiosk as well as Burrito making Kiosk, for example.

The topology illustrated in FIG. 3 provides a flexible cloud server software architecture for different entities to configure and control different locations having different clusters, with different devices, recipes, and mappings, for example.

FIG. 4A-E illustrate various embodiments of data stored in the cloud server. FIGS. 4A-E illustrate elements of a data structure (or data model) for performing the various techniques described herein. As illustrated in FIG. 4A, a plurality of production recipes 410 may be defined. Production recipes 410A-C may specify steps 411A-D to be performed to create or otherwise produce a product, which may be a food product, for example. Production recipes 410A-C may comprise data corresponding to different ingredients 412A-C stored in the cloud server. Ingredients 412A-C are the components of the product being produced, for example. In one embodiment, ingredient data may have a minimum field, maximum field, normal field, and time field. In other embodiments, ingredient data parameters may be included for other properties such as viscosity, temperature, etc., or any other parameter where variations in the parameter impacts to the final recipe, for example. Features and advantages of some embodiments allow users to adjust the amount of each ingredient of an item under production (e.g., a food item) by adjusting amounts of ingredients within allowable ranges set by the minimum and maximum values. A user interface, for example, of a mobile application (or "App") may display "Slider bars" or "sliders" that users may adjust. The App receives the maximum, minimum, and nominal values and a user may increase or decrease each ingredient within the ranges defined in the ingredient data, for example, so that the user has some flexibility in adjusting the amounts of different ingredients within the ranges without changing the basic makeup of the item, for example.

In one embodiment, steps may include natural language descriptions of a particular portion of the process for producing a product (e.g., "put liquid in jar"). In this case, a lay user may advantageously configure a cluster of devices to produce a product without requiring any advanced programming skills, for example. In one embodiment, the production recipe step information stored in the cloud server are associated with a priority, where the priorities of different steps of a particular production recipe are different, and priorities control the order that the local server distributes instructions to each device. The priority may be included in the instructions sent from the cloud server to the local server, for example, and used by the local server to control an order of execution of corresponding operations by particular devices. Recipe steps may also include a description, for example, indicating the natural language description of the step.

As illustrated in FIG. 4B, in some example embodiments one or more devices 420A-B may be associated with a place 421A-B. The place may provide a physical position of a particular device for interaction with a robotic system, for example. Place data is the association between the virtual and physical space. As described further below, place may be used as the co-ordinate from a robot's point of view in terms of where to find "the physical device", for example. For example, x, y, z, Rx, Ry, Rz of a device may be mapped to software application program interfaces (APIs). Accordingly, mapping information may include a maintaining a physical location of the devices and items under production, for example. Additionally, in some example embodiments, one or more devices may be specified as sharable 422A-B (e.g., using a software flag in the cloud server). When a device is specified as sharable, the device may be used across multiple tasks, for example, so that when one device in a cluster is performing one step for one recipe, a robotic system may interact with another device to perform another step for a different recipe, for example.

As illustrated in FIG. 4C, the cloud server may include information associating particular devices 423A-N with device specific operations 424A-N and parameters. The cloud server also includes information about a plurality of mappings as illustrated in FIGS. 4D and 4E. Mappings 425A-N may associate recipe steps with particular devices and one or more device specific operations illustrated in FIG. 4D, for example. In one example embodiment, mappings may link natural language or higher level steps to one or more device specific operations so that when a command is issued (e.g., step:"put liquid in jar"), the command is translated automatically into one or more device specific operations executable by the remote devices and/or a robotic system, for example. In one embodiment, a plurality of mappings associate recipe steps with particular devices and a plurality of device specific operations. In another embodiment, a plurality of mappings 426A-N associate particular devices in a particular cluster of devices with ingredients as shown in FIG. 4E, wherein the ingredients are components of the item being produced by execution of the instructions across the devices in a cluster.

Example Cloud System with Robotics/IOT Devices that Coordinate Operations on an Item Embodiments of the present disclosure may further include a robotic system that physically coordinates operations on an item or product under production with a plurality of devices under control of a cloud operating system where the execution of cloud based commands results in actions by the remote devices automatically, for example, as described above. In one embodiment, a robot and IoT devices coordinate physical activity of physical item. For example, IoT devices may operate on the item and the robot moves the item between IoT devices. In one embodiment, the IoT devices deliver/move components of the item. As illustrated below, the IoT devices may comprise a motor (e.g., a stepper motor) coupled to a mechanical assembly for moving components or ingredients of the item from a first position to a second position. The second position may be in contact with the item being moved by the robot. In one embodiment, the robotic system is capable of holding and moving an item within a working area and has a first reach, for example, and at least a portion of the devices are positioned around the robotic system within a first reach to interact with the item. The system may further comprise a delivery platform (e.g., a counter) within the first reach, where the robotic system places the item at a predetermined position on an upper surface of the delivery platform and wherein an item delivery device (aka an engaging unit) on the upper surface of the delivery platform engages the item and moves the item from a first position to a second position. In one embodiment, the item delivery device is magnetically coupled to a movable unit (e.g., a car) configured on or below a lower surface of the delivery platform, for example. The movable unit may move along a path, for example, and in accordance therewith, the item delivery device on the upper surface is magnetically pulled along the path to move the item along a corresponding path on the upper surface of the delivery platform, for example.

Figure 5:
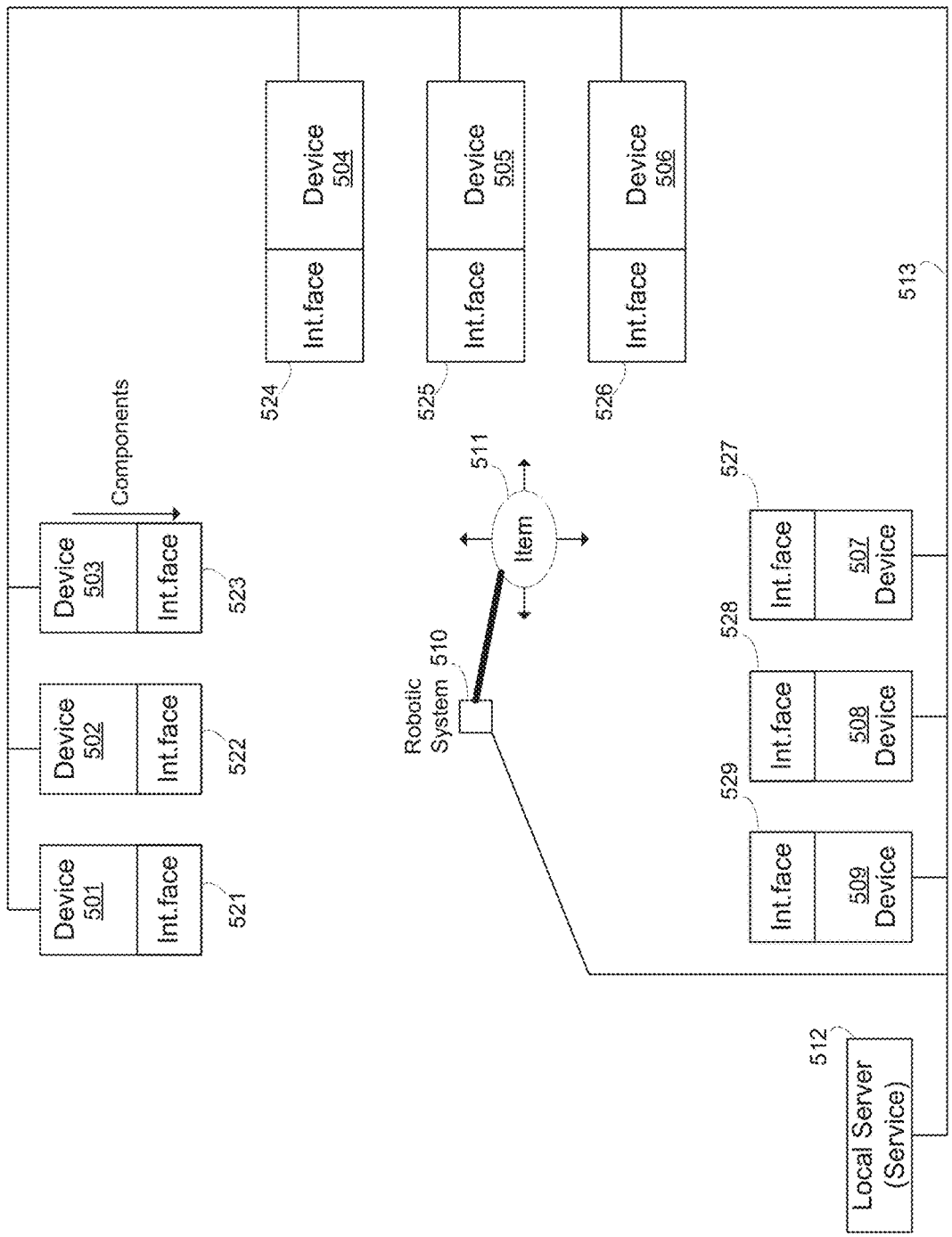
FIG. 5 illustrates an example cloud controlled server, robotic system, and remote devices according to one embodiment.

FIG. 5 illustrates a cluster of devices 501-509 including a robotic system 510 for coordinating operations on an item 511. The devices and the robotic system are coupled to a local server 512 and a cloud server (not shown) that operates as described above. The devices, robotic system, and local server may be networked together via a wired or wireless network 513 (e.g., Ethernet, WiFi, Bluetooth, NFC, etc . . . ). Thus, each device and the robotic system are coupled to the local server 512. In one embodiment, the robotic system moves an item between physical interfaces 521-529 of a plurality of devices in a cluster of devices. The local server coordinates movement of the item by the robotic system across a plurality of predetermined positions based on the distribution of instructions from the cloud server, wherein the predetermined positions comprise physical interfaces on the devices for receiving the item. The physical interfaces may be used to perform operations on the items. In one embodiment, components (or ingredients) are coupled to the item. For example, a robotic system may place the item in a particular device physical interface. Next, the device receives an instruction from the local server, where the instruction configures the device to move one or more components (e.g., food ingredients) from a first location to a second location, where the second location is in the device physical interface, and in accordance therewith, the device couples the one or more components to the item (e.g., a food item under production). One example device that moves components is a dispenser, for example. As described in more detail below, the components may be one or more of a powdered food item, a granulated food item, a cut food item, or a liquid food item and the devices are one of a plurality of dispensers, for example. The system may also include one or more devices that physically process the item ("physical processing devices"). Example embodiments of the system in FIG. 5 may include a robotic system that moves one or more items between physical interfaces of dispensers and one or more physical processing devices, for example. Dispensers may add components to the item and physical processing units may physically process the components (e.g., heating, cooling, mixing, or other physical activity). Dispensers and physical processing units may perform their tasks in any order specified by a production recipe in the cloud server, for example.

Figure 6:
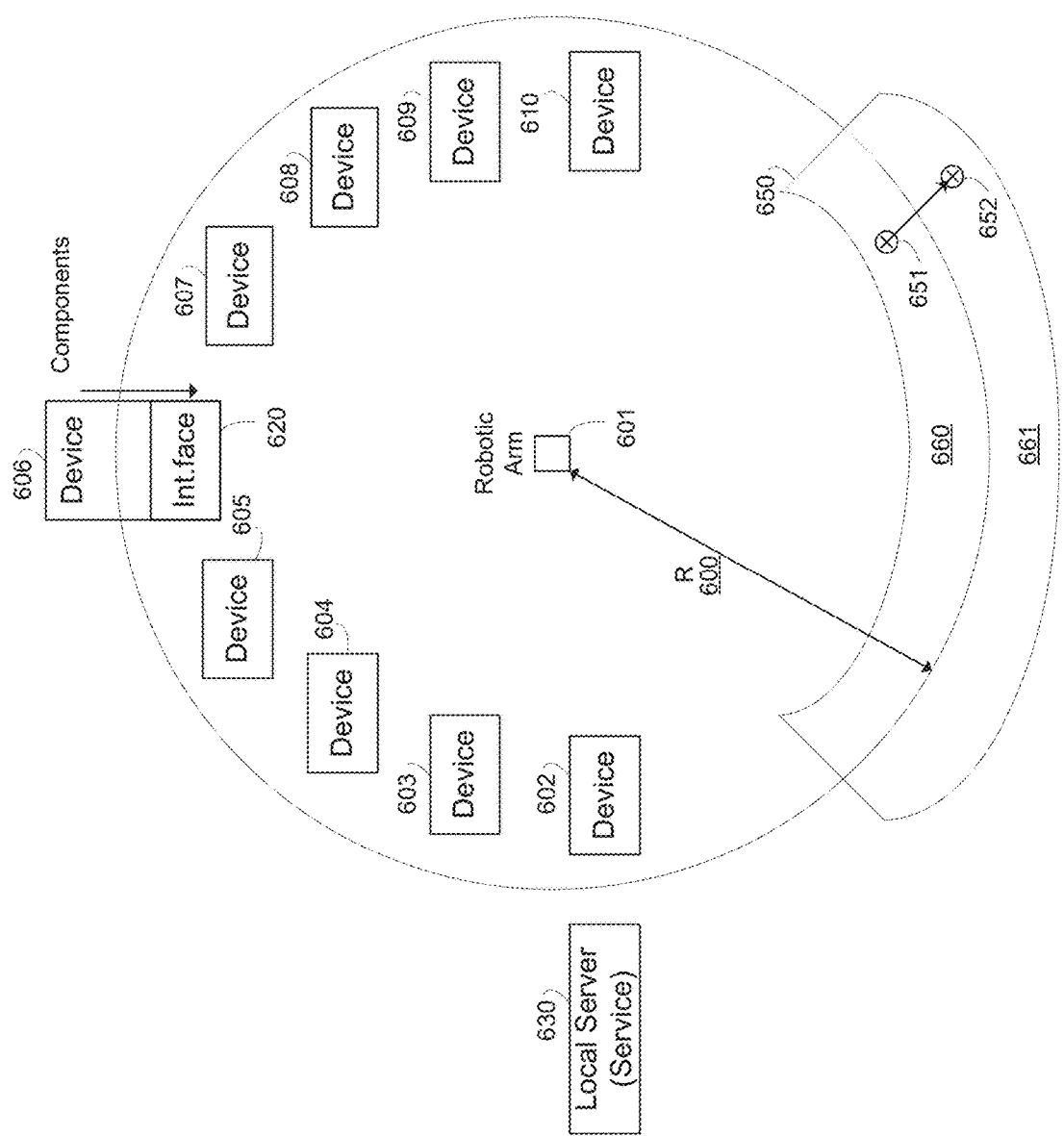
FIG. 6 illustrates an example cloud controlled kiosk according to one embodiment.

FIG. 6 illustrates another aspect of the disclosure. Embodiments of the disclosure may pertain to devices physically coordinating production of items within a radius 600 of a robotic arm, for example. As illustrated in FIG. 6, a first device coupled to the local server 630 is a robotic arm 601 having a radius of reach ("R"). In this example, the plurality of devices 602-610 are configured around the robotic arm 601 within the robotic arm's radius 600. The devices may further have physical interfaces (e.g., interface 620 for receiving an item placed in the physical interfaces by the robotic arm, for example. Thus, the devices move components of the item under production into the physical interface based on instructions received from the cloud server and distributed to the devices by the local server 630.

While a robotic arm 601 and arranged devices 602-610 may be applied to a range of applications, in this example the radius 600 of the robotic arm extends over a portion 660 of a counter 650, for example. Here, second portion 661 of the counter 650 is outside the radius of the robotic arm. Features and advantages of the disclosure configure the robotic arm to place completed items (fully finished goods or completed from the perspective of tasks performed by the robotic arm and related cluster of devices) at a predetermined position 651 on the counter inside the radius. As illustrated, a delivery mechanism (not shown) moves the completed items from inside the radius to outside the radius to a second predetermined position 652. In this example, the local server 630 distributes a first instruction from the cloud server to the robotic arm 601 to place a completed item in the first predetermined position 651 on the counter 650 within the radius of the robotic arm. Then, after the robotic arm 601 sends a signal to the local server 630 indicating that the robotic arm has completed the place operation, the local server distributes a second instruction from the cloud server to a delivery device to move the completed item from the first predetermined position 651 to a second predetermined position 652 outside the radius of the robotic arm. In one example implementation described in more detail below, the plurality of devices 601-610 and the local server 630 are a kiosk. While FIG. 6 illustrates delivery from within the reach of a robotic system to outside the reach of a robotic system for a robotic arm having a circular radius defining a sphere, it is to be understood that other types of robotic systems with different reaches patterns and working areas could also be used in other embodiments.

Example System Directed to Preparation of Food Products

Figure 7:
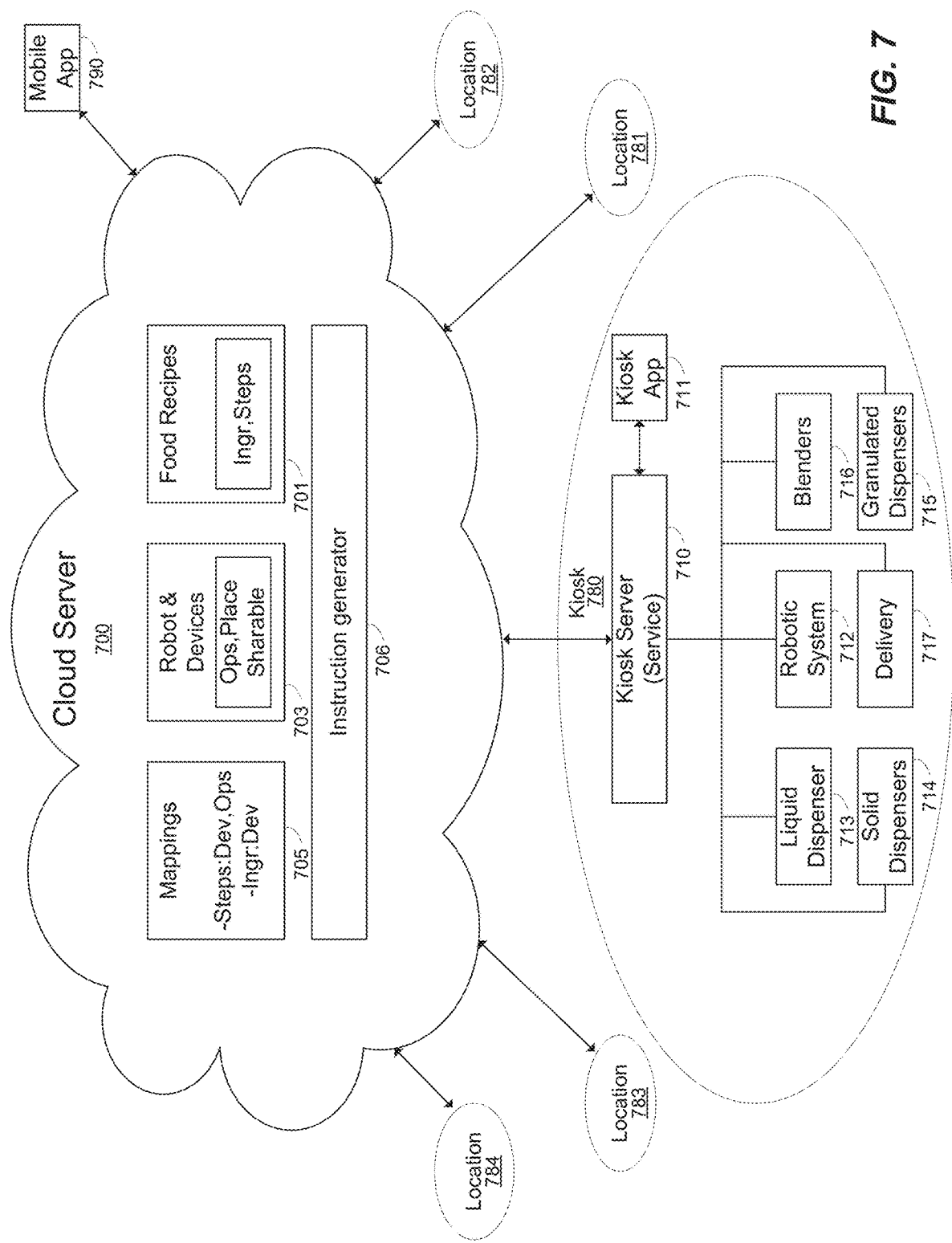
FIG. 7 illustrates a cloud server for controlling a food production kiosk according to one embodiment.

Features and advantages of the present disclosure include an automated system for preparing food products based on a cloud server controlling one or more robotic systems and devices in kiosks using a food operating system (FOO-DOS™). FIG. 7 illustrates the techniques described above applied to an automated kiosk 780 for producing food items. For instance, in one example implementation a cloud server 700 stores information comprising food recipes 701 comprising a plurality of natural language steps and a plurality of ingredients. The steps may have an associated order expressed as a priority. Users may vary particular ingredients manually through a UI of an App on a mobile device 790, for example, to change the levels of various ingredients between maximum and minimum values without altering the basic nature of the food item, for example. The cloud server further stores a data structure comprising information 703 about devices and corresponding operations, which when received by the devices, cause the devices to execute device specific processes. Each operation may comprise one or more corresponding parameters, for example. The system may include a plurality of mapping data 705. For example, the cloud server may include mappings associating steps of the recipes to one or more operations on the devices and/or mappings associating food ingredients to particular devices, for example. Accordingly, in response to execution of a recipe (e.g., "an order"), the information on the cloud server is automatically translated into instructions by instruction generator 706, sent to a kiosk 780 comprising a local server 710, robotic system 712, and devices 713-717, and the local server distributes the operations embedded in the instructions to the devices based on the order to produce a food product.

Referring again to FIG. 7, the plurality of devices comprise a robotic system 710, one or more dispensers 713-715, and one or more physical processing units as described above. The example in FIG. 7 shows a solid food dispenser 714, a granulated food dispenser 715, a liquid dispenser 713, a blender 716, a robotic system 712, and a delivery system 717 for moving an automatically produced food product from a first position on a counter (e.g., within a reach of the robotic system) to a second position on the counter (e.g., outside a reach of the robotic system), for example.

The following is one example of steps of a recipe for a smoothie:
Ingredients:
Banana: Normal value, Max, Min, time
Protein Powder: Normal value, Max, Min, time
Orange Juice: Normal value, Max, Min, time
Steps (e.g., commands):
Get solid into jar (priority 1)
Get powder into jar (priority 2)
Get liquid into jar (priority 3)
Robot→Place (Device: Blender)

The following are example device specific operations mapped to a command step "Get solid into jar" (e.g., a prioritized list of operations to complete the step):

Device=Robot; Device Specific Process=Place; parameter=(device, ingredient dispenser)—operation description: Places jar under ingredient dispenser, Device=Ingredient Dispenser; Device Specific Process=Dispense; parameters=(quantity: VALUE; desired weight: VALUE)—operation description: Dispenses specified amount from ingredients, Device=Robot; Device Specific Process=Pick; parameters=device, ingredient dispenser)—operation description: Removes jar from ingredient dispenser.

As mentioned above, particular ingredients (bananas) may be mapped to a particular ingredient dispenser in a kiosk in the cloud server. The mapping may form an association between the ingredient and the dispenser for specific instance of a kiosk 780 corresponding to a specific location, for example, so different locations 781-784 may have different dispensers with different ingredients, for example. The data stored in the cloud server forms a data model of each local cluster, which may be used for automatically producing items in response to product orders, for example.

In one embodiment, one command step may modify a subsequent command step. For example, a first command may be associated with operations and parameters to cause a dispenser to dispense 50 grams of a solid (e.g., mangos) into ajar. However, the dispenser may actually dispense 75 grams. The actual result of some of the device operations may be sent back to kiosk server 710 and cloud server 700 to modify subsequent operations. In this illustrative example, if 75 grams of mangos was actually dispensed, then a subsequent command to dispense 90 grams of liquid (e.g., Kefir) may be modified to dispense 135 grams of liquid so that the ratio of components (e.g., of mangos to Kefir) is maintained.

Some embodiments may perform the modification to the subsequent instructions locally in a local server (101 in FIG. 1 or 710 in FIG. 7), for example, without sending information back to a cloud server. However, in other embodiments, the results of various operations by the devices may be sent to the cloud server (100 in FIG. 1 or 700 in FIG. 7), and the cloud server has the ability to override the local server, for example. For example, some embodiments may change the logic on how liquid dispensing is adjusted when solid dispensing changes (e.g., using a different technique than the ratio method illustrated above). To deploy the new logic for a different technique, if it is done on the local server, the system will have to deploy the change to every installation. However, in some embodiments, the cloud server has the ability to override the local server. Accordingly, changes to the processing logic may be implemented across multiple device clusters and local servers (e.g., multiple kiosks) with just one update to cloud server, for example. The system may include the ability to make decisions locally as well as ability to override from the cloud.

Figures 7E, 7F:
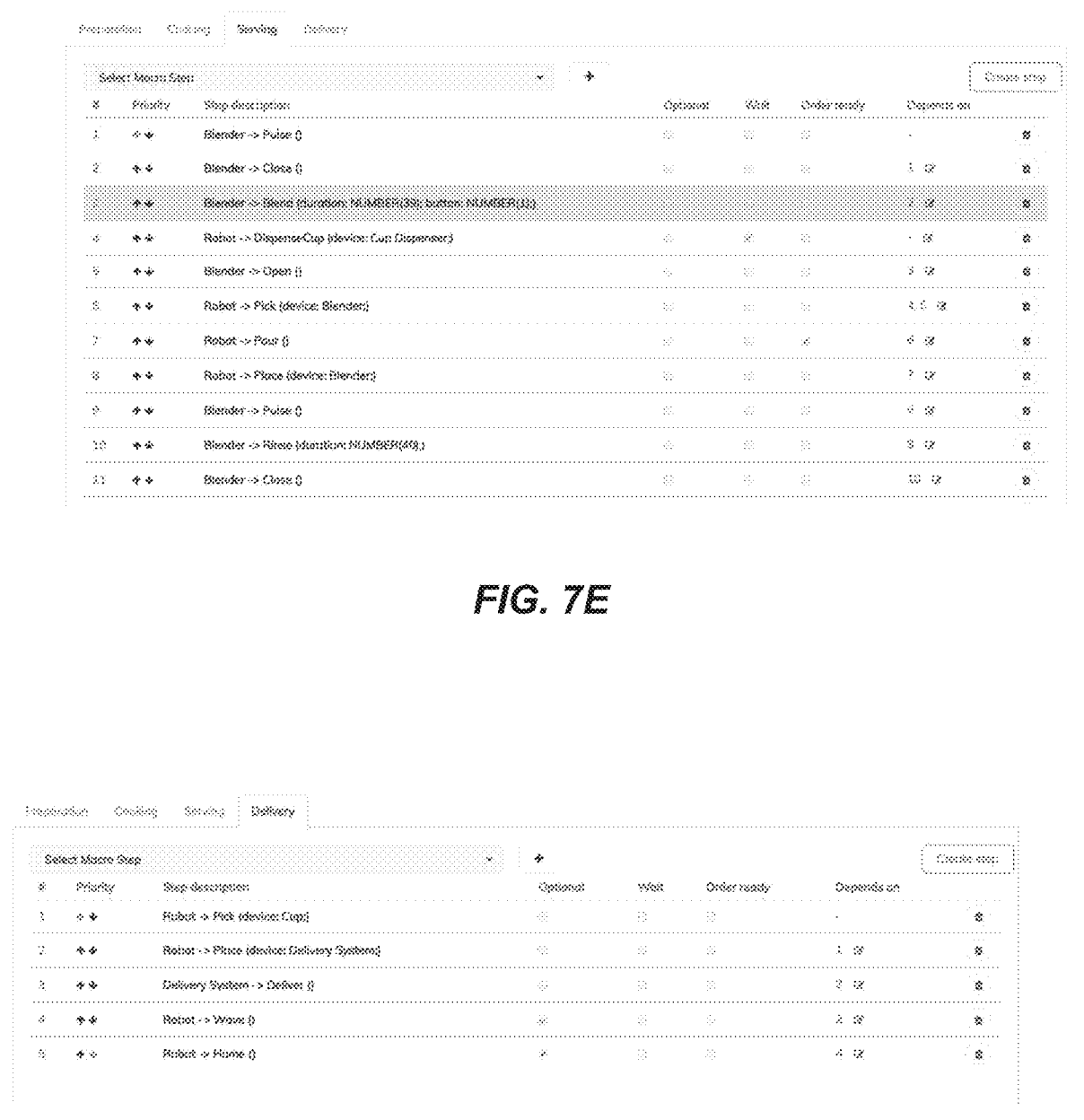

The data stored on a cloud server for a specific example is illustrated in FIGS. 7A-H. Data may be accessed through a user interface (UI) and stored on the server using a variety of data storage techniques (e.g., objects, tables, etc . . . ). The data fields in the following UI figures illustrate the data fields and relationships for an example data model. FIG. 7A illustrates a recipe description. Each recipe may include a recipe ID 740, a recipe name (or "title") 741 and other information about the recipe (e.g., price, description, blend time for configuring the blender, etc . . . ). FIG. 7B illustrates ingredients comprising minimum 742 and maximum 743 quantities (which in some embodiments may set boundaries for modification by a user) and a normal quantity744 and dispense times 745, for example. Each ingredient may have multiple values for small, medium, and large servings, for example. In this example FIG. 7C illustrates steps and priorities, where the steps are commands expressed as natural language descriptions so that a lay user can define a process of producing a product, for example. Invoking each step then invokes associated operations, which are incorporated into instructions and sent to the local server for distribution to the appropriate device. In this example, a highest priority step is "Get solid ingredients into jar" 750, which may be associated with a solid dispenser device and operations for execution by a solid dispenser to dispense ingredients, for example. A second highest priority step is "Get powder ingredients into jar" 751, then "Get liquid ingredients into jar" 752, and then a step 753 for invoking a robotic system to "place" a jar in a "Blender" device, for example. Priorities may be changed by a user using the up/down arrows 754, for example, and may include step dependencies 755. FIG. 7D illustrates a mapping of the step "Get powder ingredients into jar" to device specific operations for controlling a robotic system and dispenser to perform the step. This example mapping includes a device name 756, device specific operation name 757 (here, process name) (e.g., devices may perform multiple operations), and operation specific parameters 758. This example command step may invoke an operation on a "robot" to "place" an item in an "ingredient dispenser," another operation on an ingredient dispenser" to "dispense" a particular "quantity" of an ingredient (e.g., specified as a time in seconds for the dispenser to dispense, a desired weight, and a quantity parameters), and a third operation for the "robot" to "pick" the item up from the "dispenser" for placement in another physical interface, for example. Each operation may be assigned an ID 759, which may be used for distributing the operations in the server, for example. Users may define command steps and "ADD" operations for devices, processes on the remote devices to execute, and parameters to develop customized command steps on clusters of remote devices for a wide range of applications, for example. FIG. 7E illustrates a plurality of operations mapped to a command macro of prioritized steps for "Serving" a product. In some embodiments, a macro command step may be a number of operations that are performed repeatedly when an item is produced, for example, and may be the same across productions cycles, for example. A "Serve" command in this example includes multiple operations directed to the "blender" remote device for mixing a blended drink (e.g., pulse, close, blend, open) and cleaning the jar (e.g., pulse, rinse, close) as well as operations for a robot (e.g., obtaining a cup, picking up the jar from the blender, pouring the contents of the jar into the cup, and placing the jar back in the blender for cleaning), for example. FIG. 7F illustrates a plurality of operations mapped to a macro of prioritized steps for delivering a product (using a delivery mechanism described below). This example command macro is mapped to operations for controlling a robot remote device to pick up a cup and place the cup in a predetermined position on a counter. The macro further includes operations for triggering a delivery system to move the cup from a first predetermined position on the counter to a second predetermined position on the counter. Finally, in this example, the macro includes an operation instructing the robot to perform a "wave" function and then return to a "home" position. FIG. 7G illustrates operations (aka device processes) and corresponding parameters associated with a device (here, a robotic system). FIG. 7G illustrates that a robotic system may have operations for picking up an item, placing an item, going to a particular position, going to a home position, waving, blending, griping, ungripping, for example. FIG. 7H illustrates a robot specific operation "Pick". This example operation includes an operation ID, a name, one or more parameters, which may be defined by a user to meet the processes available on a particular remote device. Users may add remote devices to clusters with new functionality and define the operations, parameters, and other features available on such devices in the cloud server system for cloud control of the new remote devices, for example.

As mentioned above, the cloud server may organize and otherwise associate information around companies, locations, and clusters. Referring again to FIG. 7, in this example, the clusters of devices are for food preparation. For example, each Kiosk 780 can have multiple devices, such as a Robot, Dispensers, Blenders, Range, Oven, etc. In some cases, one device can have multiple functionalities. For example, Range and Oven can be one entity vs two entities. Each Kiosk may also have multiple places. These are typically the places where the devices exist in the Kiosk. This is a reference in physical space to devices so that devices can be operated on mechanically (e.g., by the robot). A place may or may not have a device but each device is, for example, in a place (and thus, may be associated with a place as described above). Each Device or Place may perform a defined set of command steps of a production recipe. For example, some of the steps can be blend, cook, bake, pick, place, cut, dance, etc. Each step may be a combination of multiple device operations or smaller steps, for example.

In one example embodiment, production recipes are food preparation recipes or recipe categories. Categories are a set of steps grouped together to create a "Product." For example, the product can be smoothie, cake, juices, pasta bowls, burritos, etc. Products in the same category may share the same production recipe steps, for example. Recipes may contain a set of ingredients, which when combined with the steps in Categories, makes a "Product." For example, Peach Perfection or Strawberry Whirl may be different types of smoothies. Veggie Burrito or Chicken Burrito are different types of burritos and so on. The process of making a category of products is the same, but the ingredients makes it a very different product. A production recipe can have its own set of steps as well without an explicit category, as described above. Ingredients are items that go into a recipe and, combined with steps, makes into a product. The ingredients are available in the Kiosk through Ingredient Dispensers, which may be in a specific place in the Kiosk, for example. Thus, when the cloud server receives an "order" to build a product (e.g., make a smoothie) at a particular kiosk location, the cloud server selects the recipe and ingredients for the selected item, determines the devices and operations from the model of the kiosk at the particular location, and generates instructions for the local kiosk server to cause the robot and devices to make the item, for example.

In some example implementations, users may interact with the cloud server through a mobile application 790 (App). As discussed above, in one embodiment the App may present a user with sliders to adjust the amount of different ingredients in a particular recipe, for example. Alternatively, users may interact with the kiosk through a kiosk App 711, which may interact with the kiosk server directly to access the cloud server and kiosk models to gather information and generate instructions for a customer's order, for example.

The kiosk server 710 (aka kiosk service) may be the central entity that distributes and coordinates the cloud operating system instructions from the cloud server, and which understands the recipe and distributes work and manages various devices within the kiosk, for example. The kiosk server may refer to a "svc connector app," to provide a constantly running service to communicate between the cloud server, the kiosk server, and various devices within the kiosk. Kiosk devices may be self-contained modules within each device that communicate with the kiosk server. These devices may include a plug-in module (e.g., a controller) to communicate with and interpret instructions received from the kiosk server, for example. In one embodiment, the devices are managed in a systematic, streamlined manner. As mentioned above, the kiosk server distributes instructions to the devices. Example instructions sent from the kiosk server to devices in the kiosk are illustrated below.

Some embodiments may include a kiosk App, which provides user interface services for customer order placement, delivery, and entertainment, for example.

Kiosk server 780 and device communications may be implemented using a variety of techniques. Communications can be divided between protocol (e.g., WiFi, BLE/BT, bluetooth, etc) and application. In one embodiment the kiosk is the server and the devices are the clients. In some applications the devices may be servers and the kiosk the client. In one embodiment, WiFi is used for connectivity and the kiosk 780 and remote devices 712-717 may have their respective IP addresses.

Figure 8:
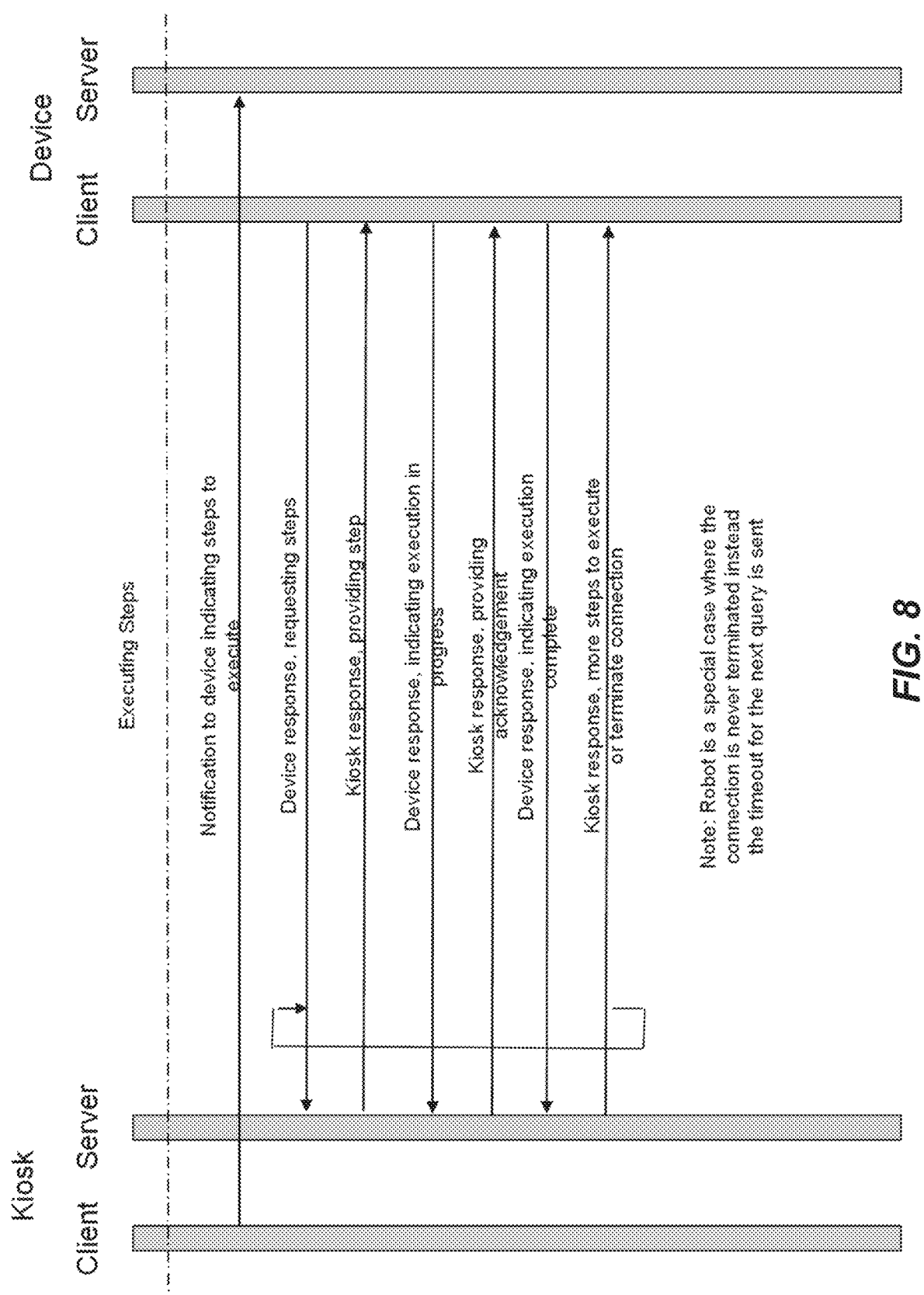
FIG. 8 illustrates a process between a kiosk server and remote device according to an embodiment.
Figure 9:
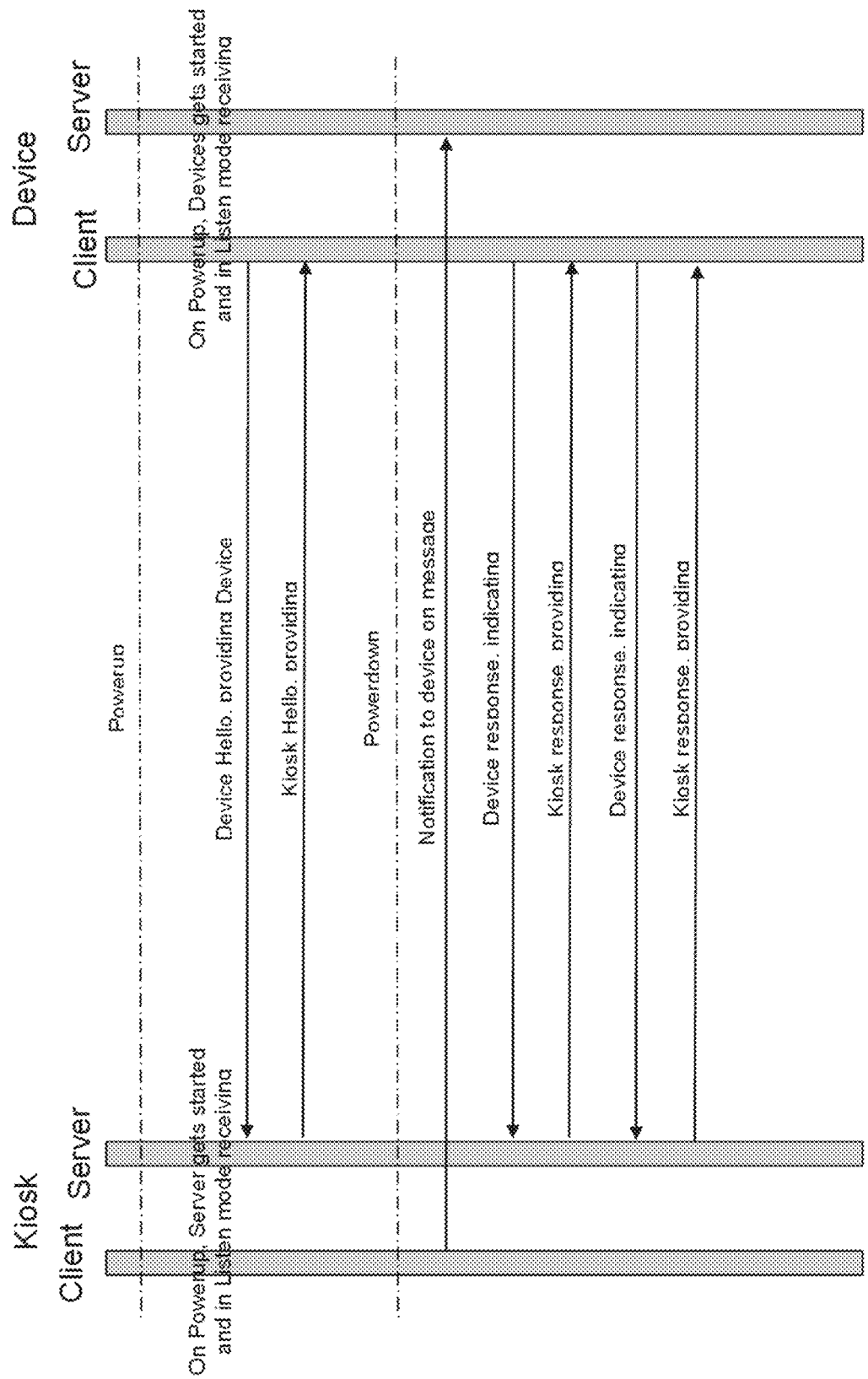
FIG. 9 illustrates another process between a kiosk server and remote device according to an embodiment.
Figure 10:
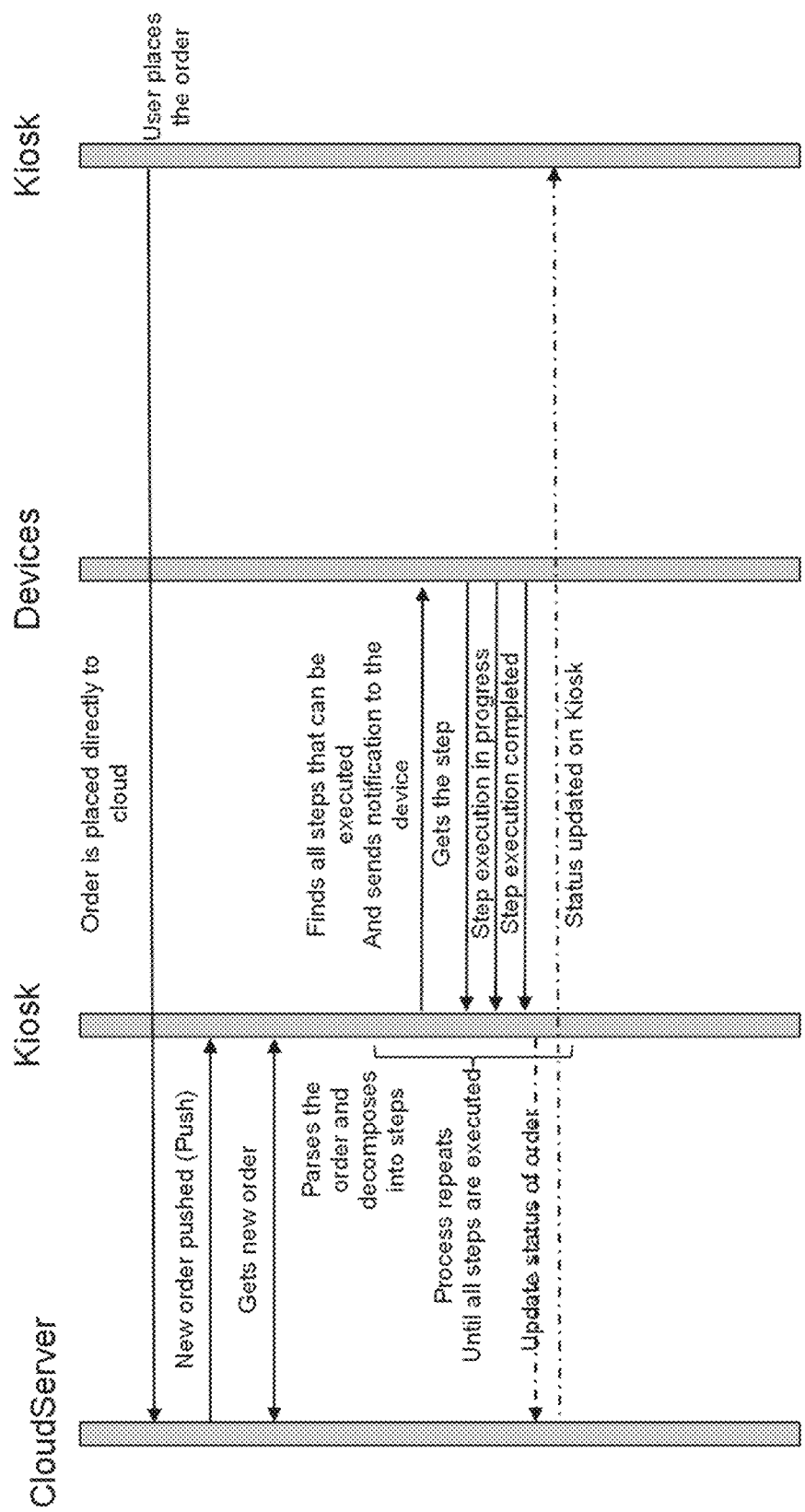
FIG. 10 illustrates an order process according to an embodiment.
Figure 11:
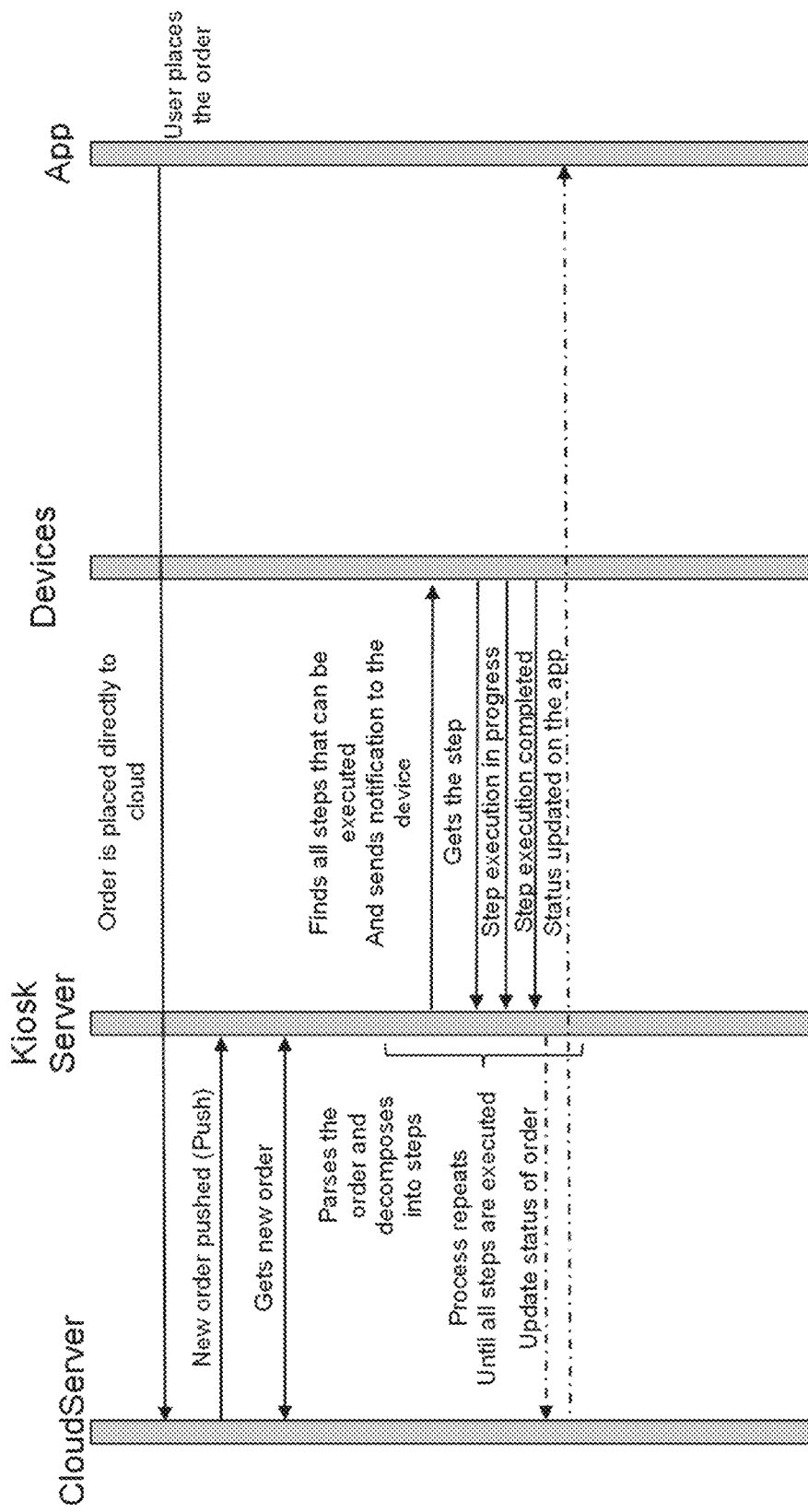
FIG. 11 illustrates another order process according to an embodiment.
Figure 12:
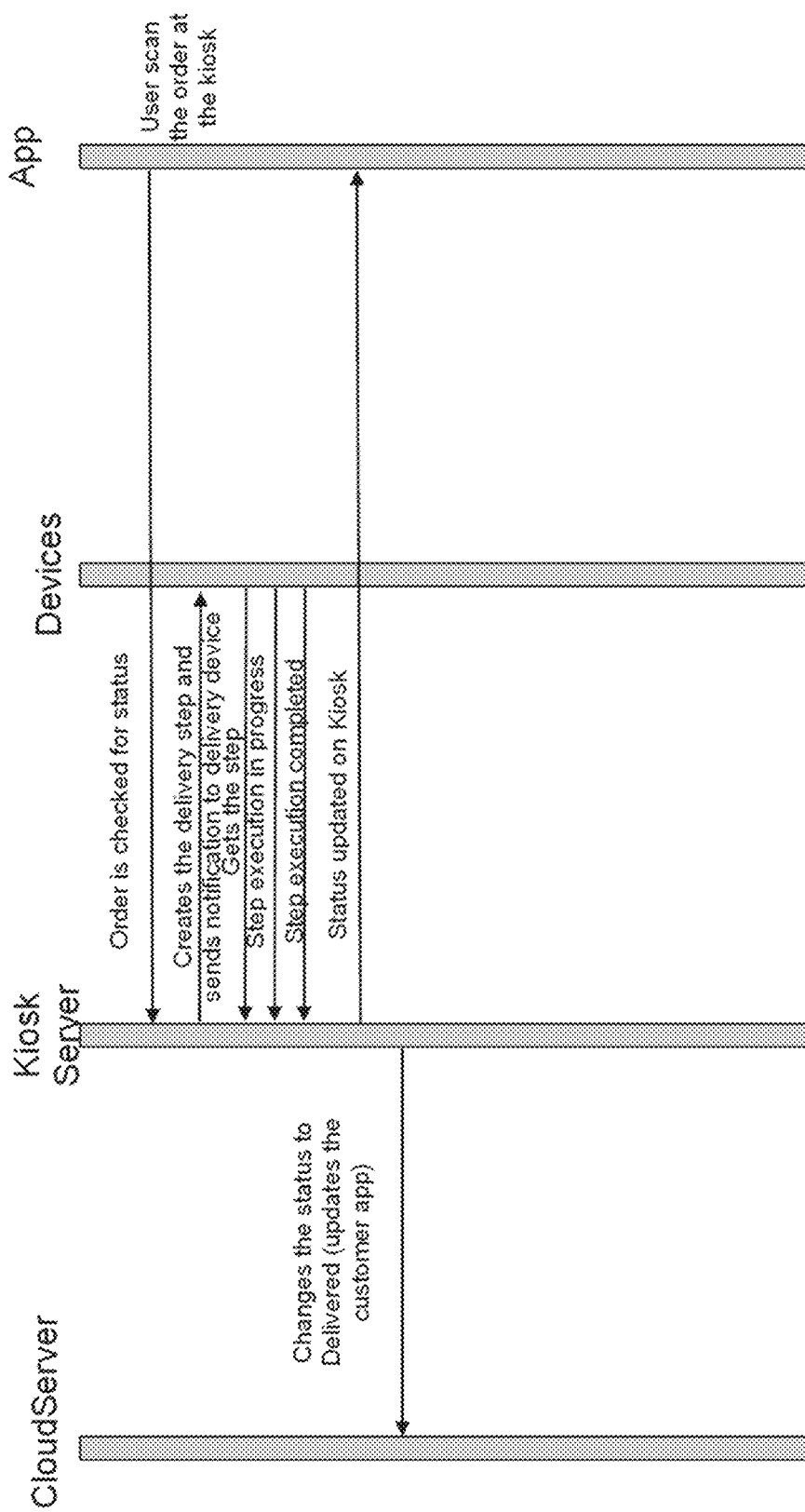
FIG. 12 illustrates an order delivery process according to an embodiment.

In one embodiment, the local server (local service) and devices act as both server and client. For example, a device may act as a client at times and further have a server to resolve a polling issue at other times. The kiosk may send a push notification to a device to start a poll immediately, for example. The server on a remote device may also be used to monitor the status in case of error situations. In one example embodiment, the robotic system may follow this model and may act as both a client and a server, for example. FIG. 8 illustrates execution of steps where the kiosk server and devices have client and server components, for example. FIG. 9 illustrates a power up sequence. FIG. 10 illustrates recipe handling (e.g., when an order is placed from kiosk). FIG. 11 illustrates recipe handling (e.g., when an order is placed from a mobile app). FIG. 12 illustrates delivery of a completed item according to an embodiment. In one example embodiment, messages in the system are sent in JSON format or using one of the other interface techniques described above. In some implementations, one or more particular devices in the kiosk may not be capable of sending or receiving messages in the required format. However, in that case, the message structure may get translated to the appropriate format. For example, a blender or stove may not have the ability to take a direct instruction from the kiosk server. However, in some embodiments, a control unit may be coupled to the stove to send and receive messages with the local server and translate such messages into control signals for operating the device, for example.

Example Robotic Kiosk

Features and advantages of the present disclosure may further include an automated food production kiosk based on a robotic system physically coordinating food production through interaction with IoT devices such as food dispensers and physical processing units, for example, as well as a delivery system. FIGS. 13-18 illustrate various embodiments of robotic kiosks according to the present disclosure.

Figure 13:
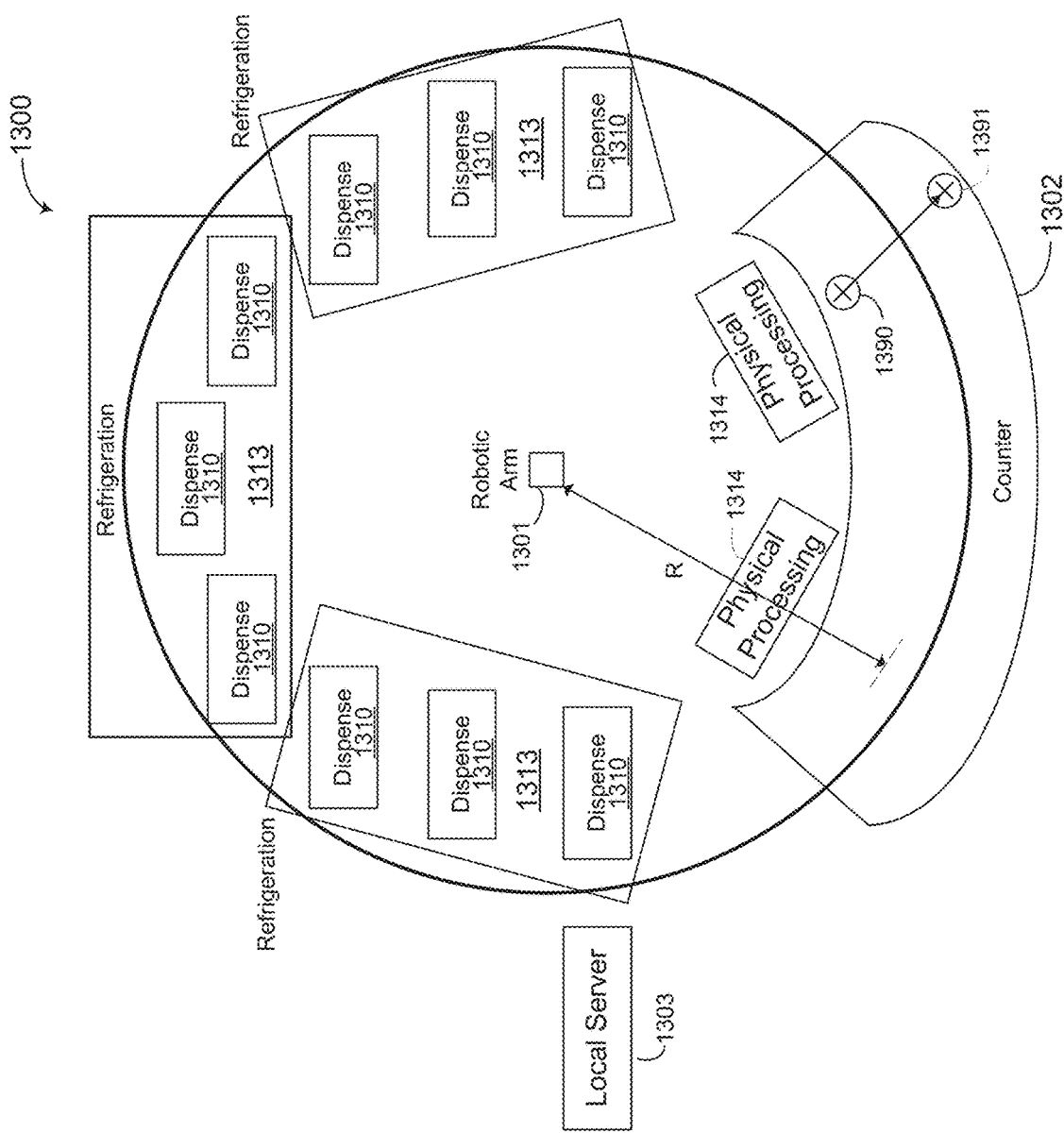
FIG. 13 illustrates an example kiosk according to another embodiment.

In one embodiment, the present disclosure includes an apparatus comprising an autonomous kiosk as illustrated in FIG. 13, for example. In this example, a kiosk 1300 includes a robotic arm 1301, a plurality of dispenser systems 1310, a plurality of physical processing units 1314, and a counter 1302. While the present example illustrates various techniques using a robotic arm, it is to be understood that other robotic systems could be used that define different working areas with different reaches, for example. The robotic arm described here is just one example. The robotic system has a maximum reach (e.g., radius, R) defining a working area (e.g., a sphere), for example. The dispenser systems in this example are configured around the robotic system, and the dispenser systems each have a physical interface within the reach (e.g., radius) of the robotic system to receive an item. Each physical processing unit also has a physical interface within the reach of the robotic system to receive the item.

The counter 1302 includes a first portion within the reach of the robotic system and a second portion outside the reach of the robotic system, for example. The robotic system may sequentially move the item between predetermined positions in different interfaces of different dispenser systems. When the item is in one of said predetermined positions, a corresponding dispenser couples an ingredient stored in the dispenser to the item, for example. When the ingredients are coupled to the item, the robotic system moves the item to a physical processing unit to process the item. The above steps for dispensing and processing the item could be repeated if multiple processing steps are defined by a recipe, for example. The dispensers and physical processing units may produce the product in a variety of orders based on the production recipe. For example, the system may get ingredients 1-3, process using processing unit #1, get ingredients 4-5, and process using processing unit #2, then deliver, for example. Alternatively, the system may get all ingredients and then process. When the system has completed producing the item (e.g., completed a recipe), the robotic system moves the item to a first predetermined position 1390 on the first portion of the counter (indicated by a circle with an +) within the reach of the robotic system, and a delivery unit moves the item from the first predetermined position 1390 on the first portion of the counter to a second predetermined position 1391 (indicated by circle +) on the second portion of the counter.

In one embodiment, the kiosk comprises a local server 1303 for coordinating the production of each item without human interaction. The server may be coupled to a cloud computer system over the Internet, for example, and the server may be coupled to control units for the dispensers 1310, robotic system 1301, and physical processing units 1314 over a local network, such as Ethernet, Wifi, Bluetooth, NFC, or the like (not shown), for example.

In one embodiment, each physical interface of each device (e.g., a dispenser or physical processor) in the kiosk has a predefined position stored in a computer memory. Accordingly, the robotic system moves between the physical interfaces based on the stored predefined positions. The robotic system may be mounted in a first predefined position, which defines a sphere or reach, for example, and the physical interfaces are mounted in a plurality of second predefined positions such that physical interfaces do not move relative to the robotic system.

In one embodiment, the plurality of dispensers are food dispensers, the plurality of physical processing units are food processing units, and the item is a food item. The dispensers and the physical processing units may be automated systems under control of the local server 1303, for example. In various example embodiments, the physical processing units 1314 may be a combination of food processing units, such as a blender, a stove, an oven, a mixer, shaker, a heater, or a grill, or any other device that may be used to prepare food. Such devices may be coupled to a control unit (not shown) included as part of the physical processing unit for receiving instructions from the local server and performing device specific operations and processes, for example.

In one embodiment, the kiosk 1300 further comprises a plurality of refrigeration units 1313, where a portion of the dispenser systems that store ingredients are inside the refrigeration units. As illustrated in an example implementation below, dispenser systems may include dispenser units comprising a hopper for storing ingredients, a dispenser element for moving ingredients from the bottom of the hopper to a trap through which the ingredients can fall into a jar or other receptacle, for example. The jar is placed in a physical interface below the dispenser and above or on top of a scale, for example. The scale, the dispenser unit, and a control circuit may form a local feedback loop for accurately dispensing amounts of ingredients as defined in instructions from the local server, for example. A dispenser system 1310 may also be configured in a feedback loop with the local server 1303, where the local server sends an amount to dispense, the disperser returns a dispensed amount to the server based on a scale measurement, and the server updates the amount and sends a second dispense instruction to fine tune the amount dispensed to obtain a desired amount, for example.

In one embodiment, the refrigerators 1313 may be arranged to form a curve around the robotic system and the counter may form a curve around the robotic system. As illustrated in the example in FIG. 13, the dispenser systems 1310 and the counter fully surround the robotic system and are within the reach of the robotic system so the robotic system can move items between interfaces, the processing unit, and the counter, for example. In the example in FIG. 13, the kiosk is substantially circular. Thus, when the refrigerators and counter are coupled together, the kiosk may be fully enclosed, for example. Other shapes and configurations may be used as illustrated below. As illustrated in example embodiments shown below, the interfaces may be below the refrigerators. Thus, when the refrigerators and counter are coupled together, the robotic system may reach the physical interfaces and the position on the counter for item delivery, for example.

Figure 14:
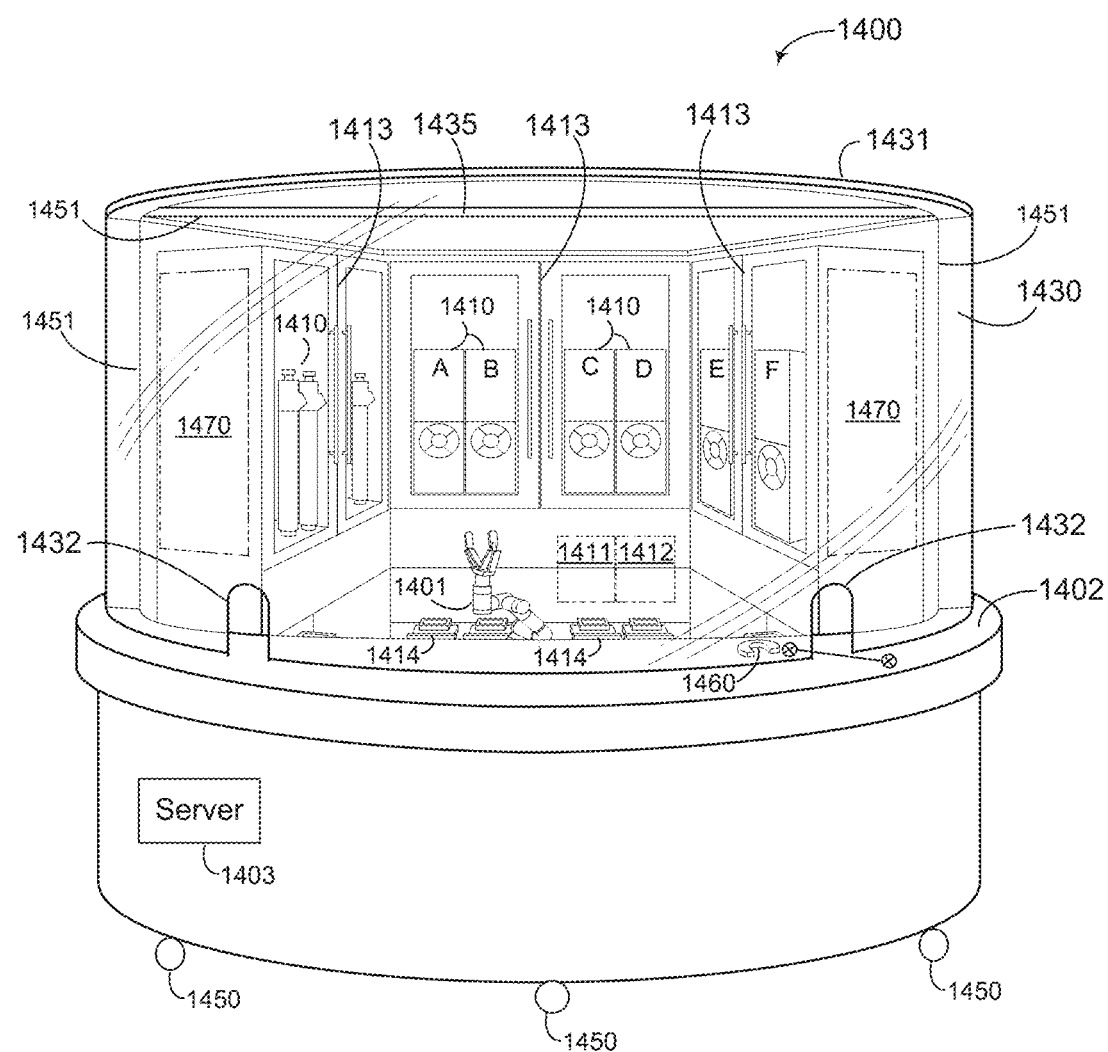
FIG. 14 illustrates an example food production kiosk according to one embodiment.
Figure 15:
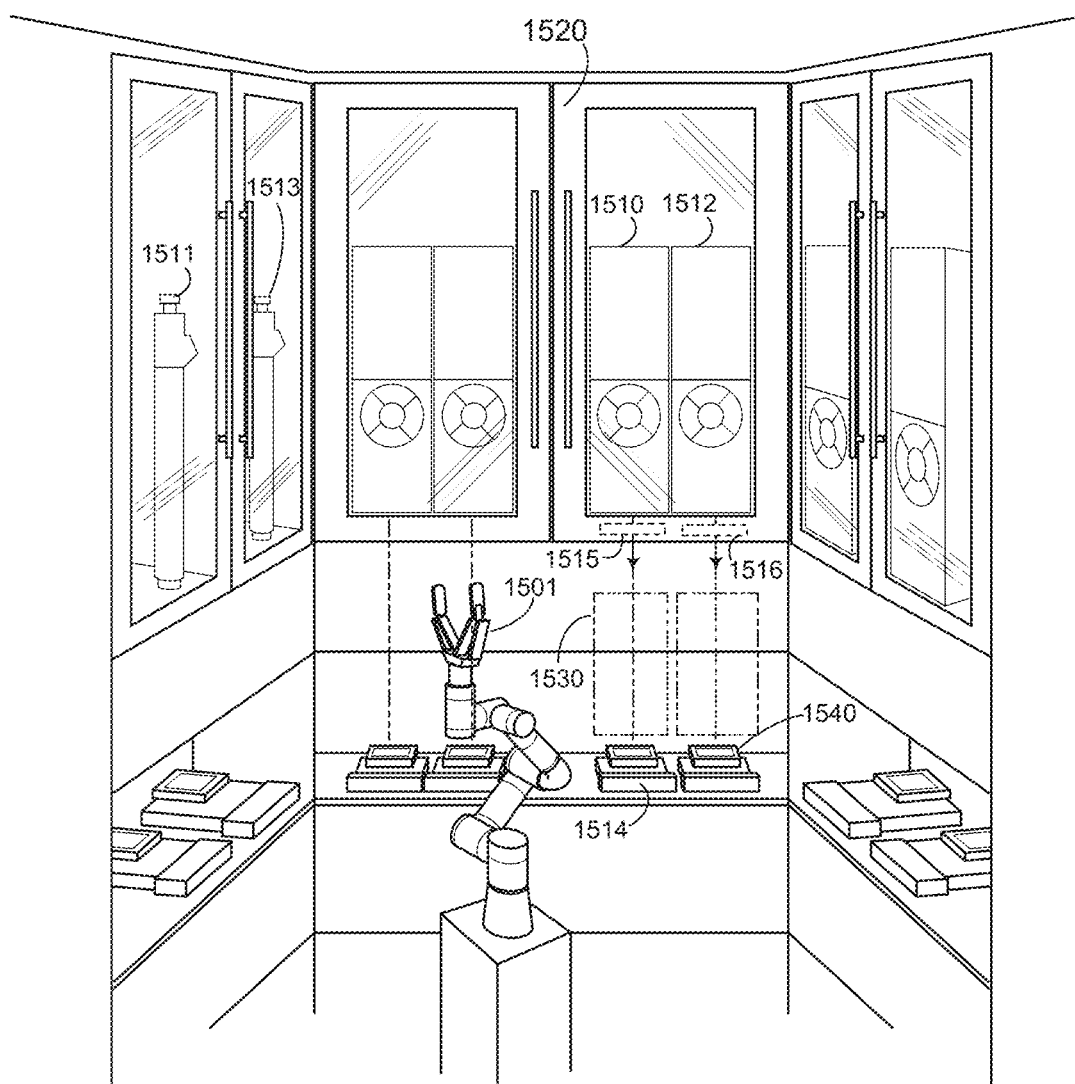
FIG. 15 illustrates another view of an example food production kiosk according to one embodiment.

FIG. 14 illustrates an example kiosk 1400 according to one embodiment. In this example, dispenser systems 1410 are configured around a first portion of the robotic system and a counter 1402 is configured around a second portion of the robotic system. Further, the dispenser systems may be arranged above a plane defined by the counter, for example. As illustrated in FIGS. 14-15, the dispenser systems 1410A-F include a hopper for storing an ingredient, a dispenser element configured vertically below the hopper to move ingredients, and a scale 1414. An upper portion of the scale forms the physical interface for receiving the item. Two physical interfaces for dispensers 1410C-D are illustrated at 1411 and 1412. In this example, ingredients move vertically downward from the dispenser to the item.

In one embodiment, the physical interface of one or more dispenser systems is configured below a portion of the dispenser system that stores ingredients. For example, the physical interfaces of the dispenser systems in this example are below ingredient dispensing portions of the dispensing systems. Additionally, physical interfaces for receiving the item may be approximately in line with the counter, for example. This may be advantageous for minimizing the amount of vertical movement a robotic system must go through in producing the product, for example.

Features and advantages of the present disclosure include mounting the robotic system in a first predefined position and configuring the physical interfaces in a plurality of second predefined positions so the physical interfaces do not move relative to the robotic system. The plurality second predefined positions of the physical interfaces may be stored in a computer memory (e.g., of the server), for example, and the robotic system moves between the physical interfaces based on the stored second predefined positions and a recipe received from a cloud server. For example, if a recipe specifies that the food item is to include ingredients from dispensers 1410C and 1410D, then the server may access stored positions for physical interfaces 1411 and 1412. First, the server may send the robotic system the position for interface 1411. The robotic system may then move a jar, for example, into the physical interface 1411. Next, the server may send dispenser 1410C an instruction to dispense an amount of ingredients specified in the recipe, for example. Then, the server may send the robotic system the position for interface 1412. Once the jar is in interface 1412, the server may send dispenser 1410D an instruction to dispense an amount of ingredients from dispenser 1410D specified in the recipe, for example. Accordingly, the stored predefined positions may be used by the server to control the movement of the robotic system within the kiosk to move food items (e.g., a jar) between physical interfaces in the kiosk.

Referring again to FIG. 14, the kiosk 1400 may be fully enclosed. In this example, the counter comprises wheels 1450 for moving the counter away from other elements of the kiosk to access the other elements (e.g., for periodic maintenance). The wheels may be distributed around the bottom of a base unit below the counter, for example.

As illustrated in FIG. 14, the kiosk further comprises a window 1430 extending along a length of the counter and extending vertically to a top 1431 of the kiosk. The window 1430 may comprise one or more openings 1432 for retrieving a completed item. The openings may comprise a bottom comprising a portion of the counter, two vertical sides comprising vertical edges of the window, and a top comprising a horizontal (here, rounded horizontal) edge of the window. It is to be understood that other shapes and locations for the window could also be used.

FIG. 15 illustrates another aspect of the kiosk according to an embodiment. FIG. 15 illustrates an expanded view of an interior of a kiosk having a robotic arm 1501 surrounded by refrigeration units 1520. Inside each refrigerator 1520 is a food dispenser. In this example illustration, solid food dispensers (e.g., solid food dispenser 1510) are configured in the back and to the right of the robotic arm and powdered food dispensers (e.g., powdered dispenser 1511) are configured to the left of the robotic arm. The food ingredient dispensers may store different food ingredients for a recipe. For example, dispenser 1510 may store cut up kiwis, while dispenser 1512 may store cut up strawberries. Similarly powder dispenser 1511 may store powdered sugar while powder dispenser 1513 may store a protein powder, for example. In this example, each of the food dispensers is located inside one of the refrigeration units to keep perishable food ingredients cool and fresh. The refrigeration units comprise openings in the floor of the refrigerator between a bottom of each dispenser system and above the corresponding physical interface. Two openings 1515 and 1516 in refrigerator 1520 are shown for dispensers 1510 and 1512, respectively. The openings are configured so that ingredients exiting from the bottom of each food ingredient dispenser move vertically downward from the food ingredient dispenser to the item when the item is in the corresponding physical interface. For example, opening 1515 is aligned with physical interface 1530 and scale 1514, for example, so that a jar may be placed in physical interface 1530 to capture ingredients from dispenser 1510 as they move vertically down through opening 1515. A jar (aka, a pitcher) may be held in place on top of the scale 1514 by ridge 1540 engaging a bottom of the jar, for example. Thus, the jar may be held in place in the physical interface 1530 and measure the amount of ingredients dispensed, for example. While a physical interface in this example is a location under the dispenser and above the scale for placing a jar, it is to be understood that a variety of other physical interfaces may be used for other applications.

Figure 16:
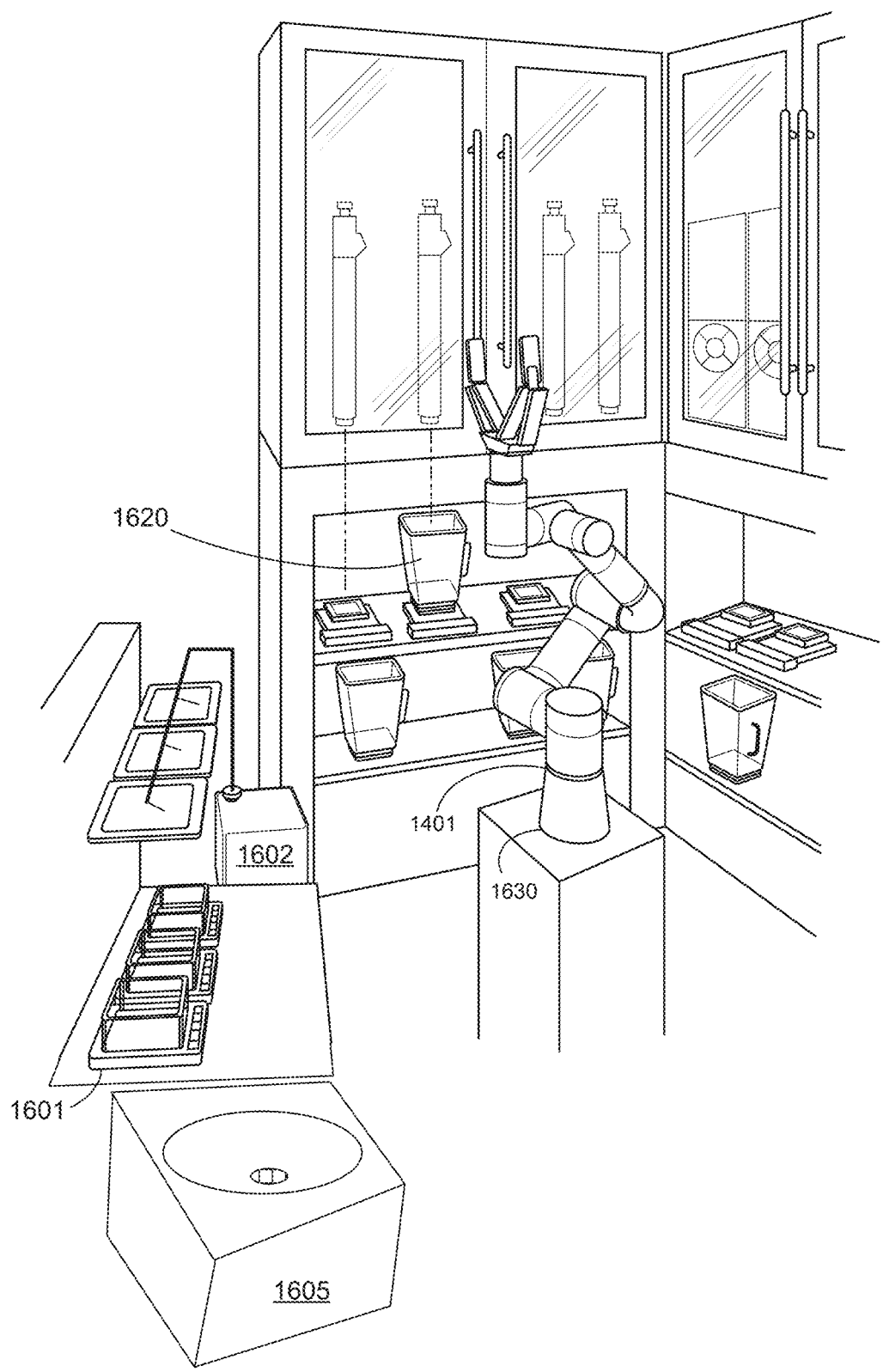
FIG. 16 illustrates yet another view of an example food production kiosk according to one embodiment.

Referring to FIG. 16, in one embodiment the item is a jar 1620 (aka, a container) holding a blended drink. After a blending step, the robotic arm 1401 pours the blended drink into a cup (not shown), and wherein the cup is moved by a delivery system from a first predetermined position on the counter within the radius of the robotic arm to a second predetermined position outside the radius of the robotic arm and proximate to an opening in the window such that a user may retrieve the cup through the window. In one embodiment, the delivery system comprises a magnetic puck 1460 shown in FIG. 14 on an upper surface of the counter and a car (not shown in FIG. 14) magnetically coupled to the puck mounted on a lower surface of the counter, and wherein the car moves along a path between the first position and the second position below the counter, and in accordance therewith, a magnetic binding force moves the puck, and wherein the puck pushes the item from first predetermined position to the second predetermined position on the upper surface of the counter.

Referring again to FIG. 14, the counter 1402 may be curved around approximately half the kiosk, and the front window 1430 may extend above the counter to a top 1431 of the kiosk and at least a portion of the top of the kiosk comprises a top window 1435. The kiosk may comprise a forward (or front counter) portion and a back (rear equipment) portion, wherein the forward portion comprises the counter 1402, the window 1430, and a portion of the top of the kiosk as a single moveable unit on wheels 1450 below a base of the counter. In this example, sidewalls and/or an edge of the moveable unit meet sidewalls of the refrigeration units 1413 and/or an outer back kiosk case, for example, along edge 1451 to seal the interior of the kiosk from external access, for example.

In one embodiment, the refrigeration units 1413 have first and second sidewalls viewable through the window, the kiosk further comprising displays 1470 (or monitors) mounted on the first and second sidewalls. In one embodiment, the displays are coupled to the local server to display the available food products (e.g., a menu) and items in the process of being produced by the kiosk. For example, the monitors may display an available menu and/or descriptions of the current state of items in the process of being produced by the kiosk. Displays 1417 may be coupled to the local server 1403 to receive information to be displayed. For example, when server 1403 receives an order (e.g., from the cloud system), the server may write a name, description of the order, and status of the order into a memory location and send the name and description to one of the displays for display to a user, for example.

FIG. 16 illustrates additional features of the present disclosure. For example, in one embodiment a base 1630 of the robotic arm is elevated above a floor, and wherein the robotic arm 1401 moves the item between a plurality of positions within a sphere above and below the counter.

FIG. 16 further illustrates an example of one type of processing unit. In this example, the physical processing unit comprises a plurality of blenders 1601 for mixing ingredients received in a jar from the dispensers. A blender may further be used for cleaning the dispensers, where the given blender is coupled to an automated water source 1602, for example. As an initial step, an empty blender may be placed in the blender processing unit 1601 and water may be dispensed from the water source to the blender processing unit and into the jar automatically under control of the local server. The water may include a cleaning agent, for example. The local server may send an instruction to dispense the water and then turn the blender on to agitate the water inside the jar, for example, thus cleaning the interior of the jar. The physical processing units may further comprise a sink 1605 located under the counter for and adjacent to the blender. Once the water is blended in the jar for a predetermined time, the robotic arm may receive an instruction to move the jar from the blender and pour the water into the sink, for example.

Figure 17:
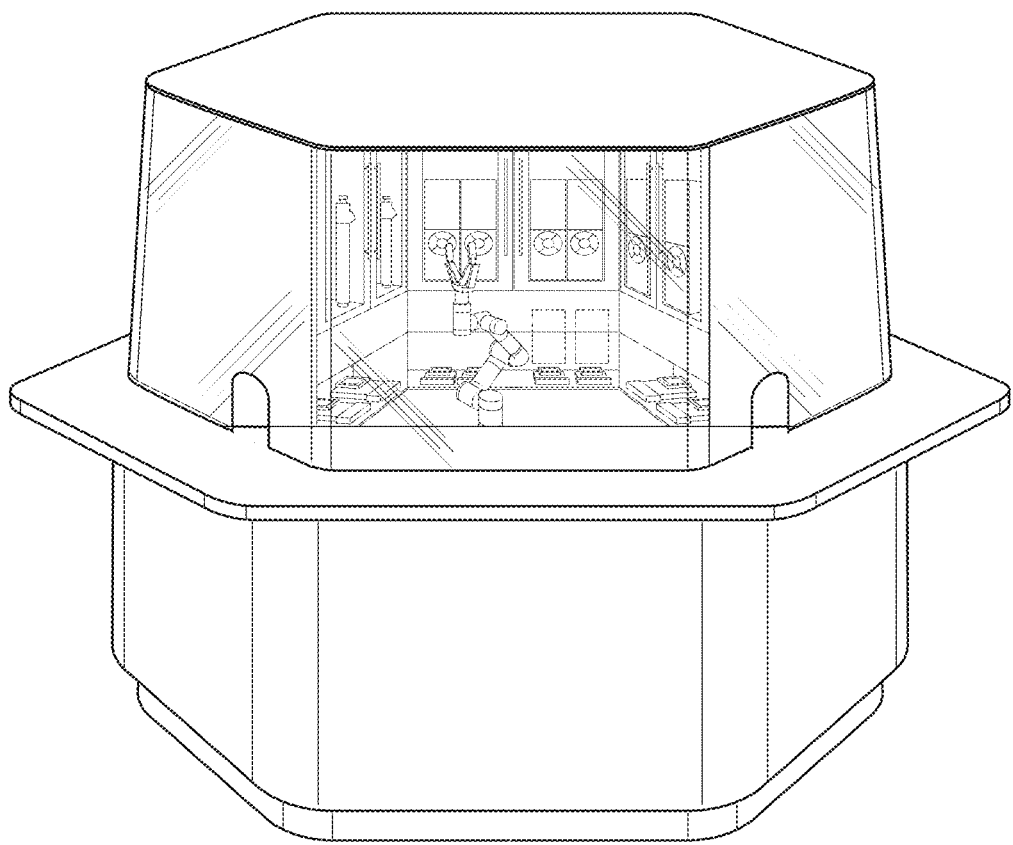
FIG. 17 illustrates another example food production kiosk according to one embodiment.
Figure 18:
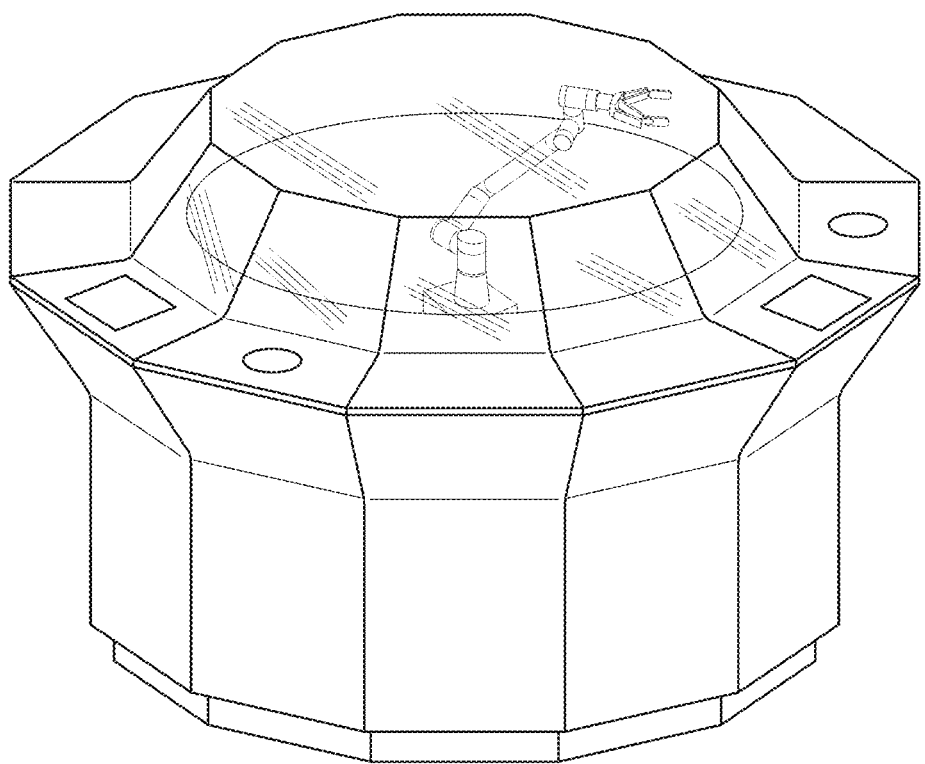
FIG. 18 illustrates another example food production kiosk according to one embodiment.

Embodiments of the kiosks disclosed herein may take a number of different shapes and forms. For example, in various embodiments the kiosk may be circular or a polygon in shape (e.g., a square, rectangle, or hexagon). FIG. 17 illustrates an example kiosk wherein the kiosk is substantially a hexagon. Additionally, components of various kiosks may be placed in different locations. FIG. 18 illustrates an example kiosk wherein the dispenser systems and the physical processing units are arranged below a plane defined by the counter, and wherein the counter substantially surrounds the robotic system. In this example, the delivery system may deliver food items to a number of openings around the periphery of the kiosk, for example.

Example Solid Dispenser

In one embodiment, one or more remote devices include a solid dispenser. Thus, the present disclosure further relates to solid dispensing, and in particular, to a component dispenser apparatus and methods for same, such as a solid food dispenser.

Figure 19:
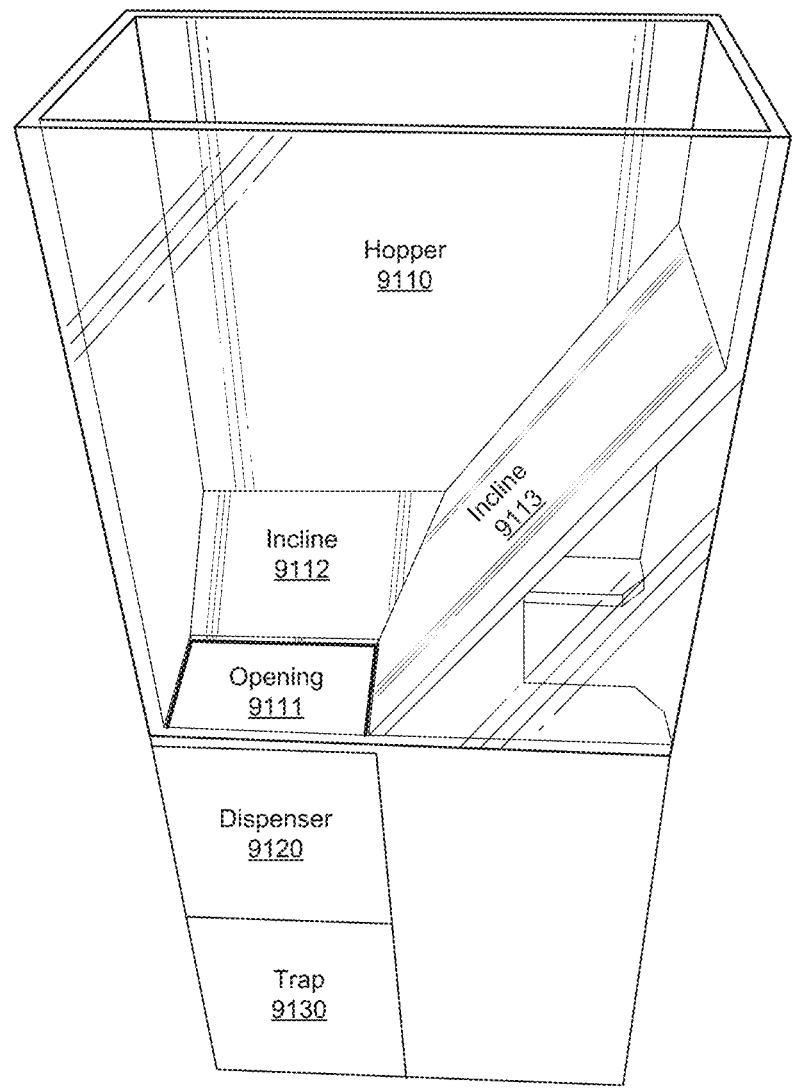
FIG. 19 illustrates a dispenser apparatus according to one embodiment.

FIG. 19 illustrates a dispenser apparatus according to one embodiment. The dispenser apparatus may include a hopper 9110, a dispenser unit 9120, and a trap unit 9130, for example. The dispenser unit may be coupled to the hopper to receive the components to be dispensed. In this example, the trap is configured below the dispenser and the hopper 9110 is configured above the dispenser 9120. The hopper 9110 is coupled to the dispenser 9120 at an opening 9111 in the bottom of the hopper 9110 and a corresponding opening in the top of the dispenser 9120 described in more detail below.

The hopper may hold components to be dispensed (aka ingredients), such as food ingredients, for example. The food ingredients may be frozen or fresh ingredients, either whole pieces or with different size cuts, for example. In this example, the hopper includes a minor incline 9112 and major incline 9113. An upper opening in the top of the hopper 9110 may be larger than the lower opening 9111 in the bottom of the hopper so that the hopper can hold a larger amount of ingredients to be dispensed, for example. In this example, the major incline 9113 directs the ingredients from at least one side of the hopper 9110 toward one side of the lower opening 9111 in the bottom of the hopper. Additionally, in this example, the minor incline 9112 directs the ingredients from at least another side of the hopper 9110 toward one side of the lower opening 9111 in the bottom of the hopper. Opening 9111 is exposed to a dispenser unit 9120 to allow ingredients to smoothly flow from the hopper to the dispenser. In this example, the hopper 9110 may be rectangular to allow multiple such structures to be placed adjacent to each other for efficient dispensation of multiple ingredients using limited space along a particular surface (e.g, optimizing space where units are placed side-by-side for access by a robotic system).

Figure 20:
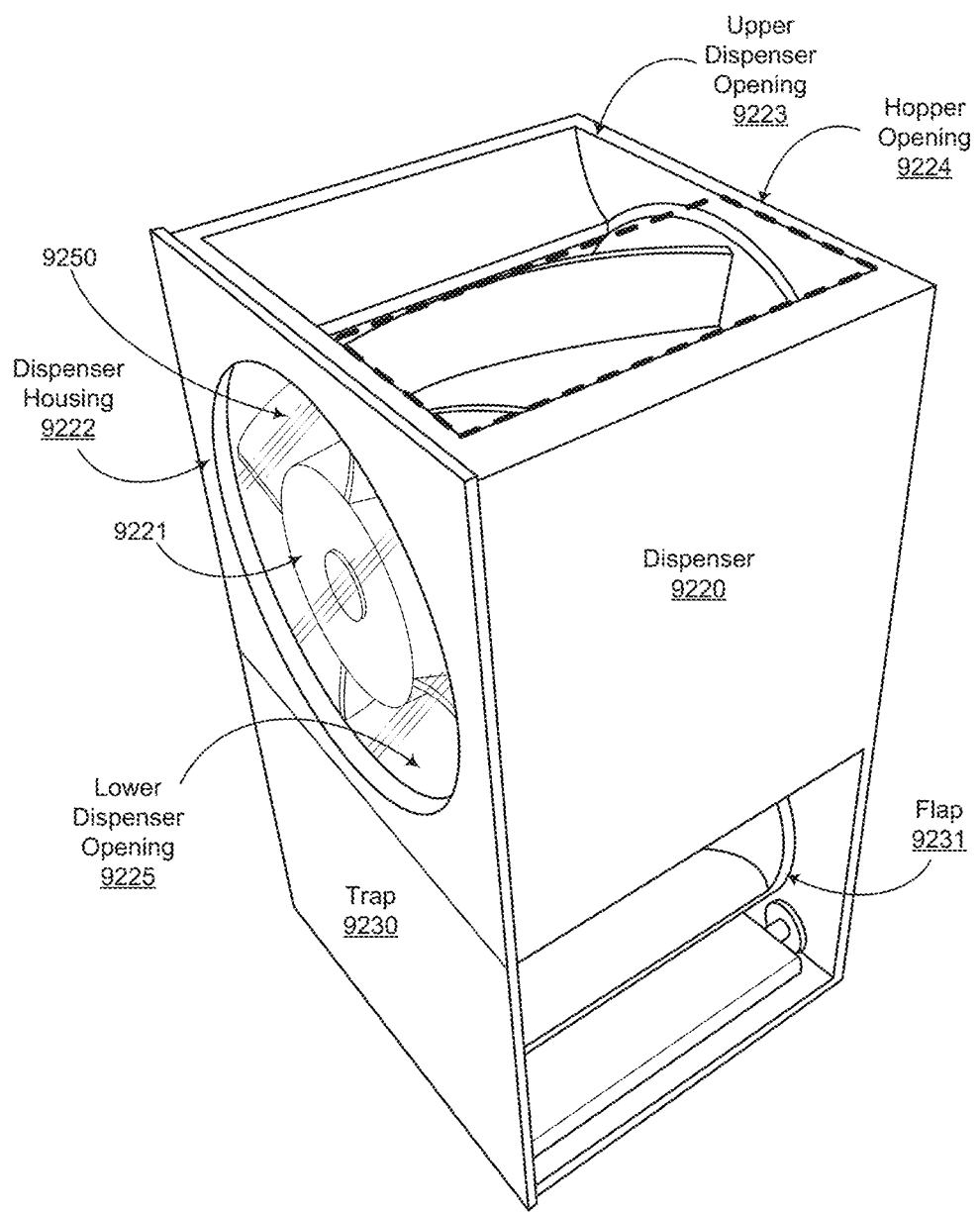
FIG. 20 illustrates another view of a dispenser unit coupled to a trap unit according to another embodiment.

FIG. 20 illustrates another view of a dispenser unit 9220 coupled to a trap unit 9230 according to another embodiment. This view illustrates the rotational nature of a dispenser element 9221 and its configuration within the dispenser housing 9222 of the dispenser unit 9220. Hopper opening 9224 is aligned with an upper opening 9223 of dispenser 9220 so that ingredients from the hopper may move into the channels created between the dispenser element 9221 and dispenser housing 9222. As described in more detail below, the dispenser element 9221 is rotated (e.g., by a motor controlled by a computer) to move a controlled amount of ingredients through the channels and into a lower opening 9225 in the dispenser housing 9222 and into the trap unit 9230. In one embodiment, the lower opening 9225 of the dispenser 9222 is coupled to an upper opening in the trap 9230. The trap 9230 includes a flap 9231 comprising a hole. As described in more detail below, in a first closed position, the hole may extend horizontally (side-to-side), and a sidewall of the flap 9231 forms a barrier between the upper opening of the trap 9230 to stop movement of ingredients from dispenser 9220, for example. In a second open position, the hole may extend vertically (top-to-bottom) to create passage (or vertical channel) between the upper opening of the trap 9230 and a lower opening of trap 9230 to allow movement of ingredients from dispenser 9220, through the trap 9230, and to a physical interface where a receptacle may be positioned to receive the ingredients exiting the trap, for example. In the following Figures and description, it is to be understood that dispenser 9220 may or may not include a transparent material 9250 (e.g., glass or plastic) to form a window (here, circular) to view the operation of the dispenser element 9221, for example.

Figure 21:
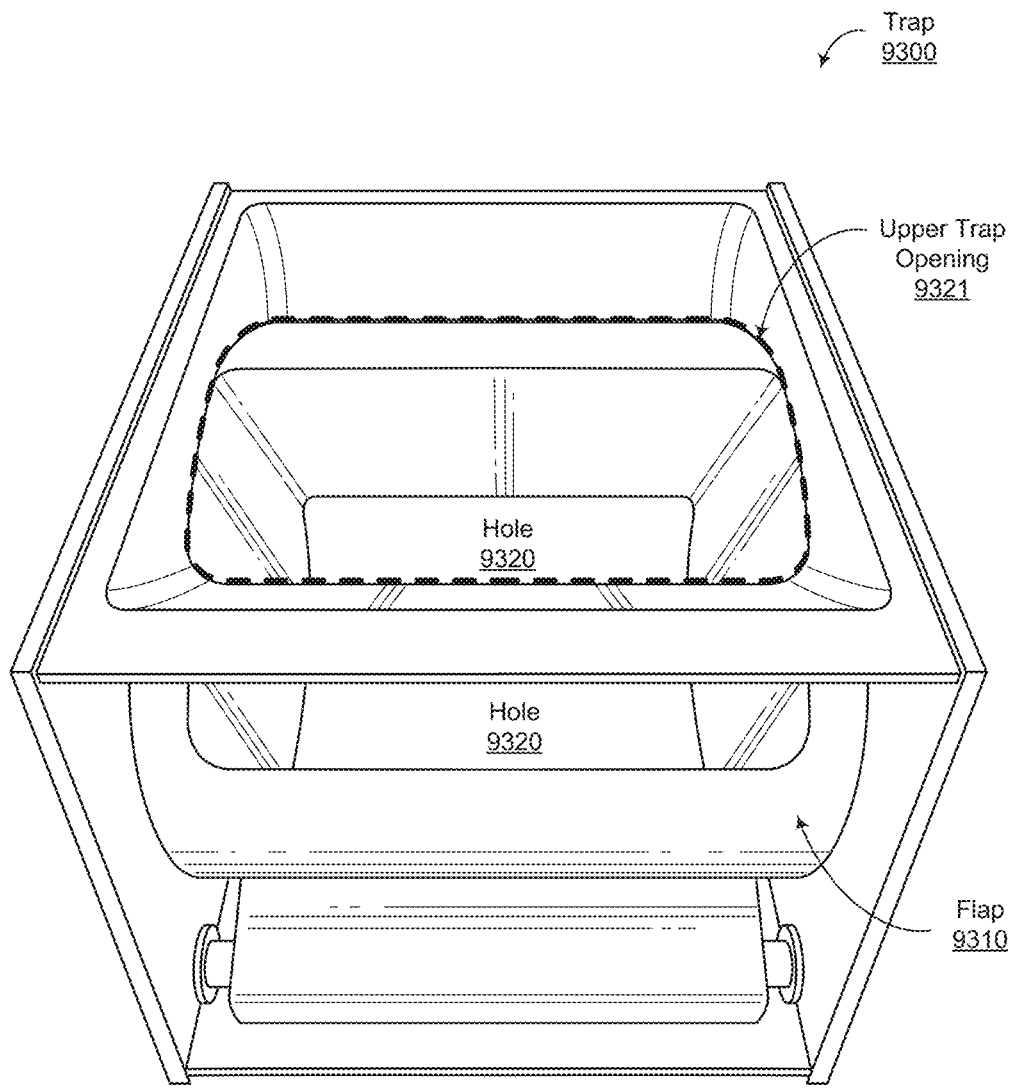
FIG. 21 illustrates an example trap according to one embodiment.

FIG. 21 illustrates an example trap 9300. The trap 9300 includes a flap 9310 which can be rotated to create a passage (or hole) 9320 from an upper opening to a lower opening of the trap. In one example embodiment, the trap is configured below the dispenser element such that when the flap is in a home position, the passage is closed and no amount of the ingredients passes from the dispenser through the trap (the top opening is closed). In this example, the flap is a cylinder having a central hollow region forming a rectangular hole 9320. When the flap is in a first position where the rectangular hole is in a horizontal position, the trap is closed, and there is no pathway from an upper opening of the trap to a lower opening of the trap. However, when the flap is in a second position where the rectangular hole is rotated into a vertical position, the trap is open, and there is a pathway from the upper opening of the trap to the lower opening of the trap. In one embodiment, the upper opening 9321 in the trap and the lower opening in the trap (not shown) are rectangular and approximately the same size (e.g., aligned in position, size, and cross-sectional shape) as the rectangular hole in the flap to minimize the impedance of ingredients flowing through the trap, for example. In this example, the internal passage of the flap 9310 forms a rectangular chamber with rounded edges and the upper and lower trap openings have the same rectangular shape and rounded edges to align with the hole in the flap. In another embodiment, the trap may be integrated with a weighing scale that provides feedback (e.g., to a server or a dispenser control unit) about the quantity of product that has been dispensed.

Figure 22:
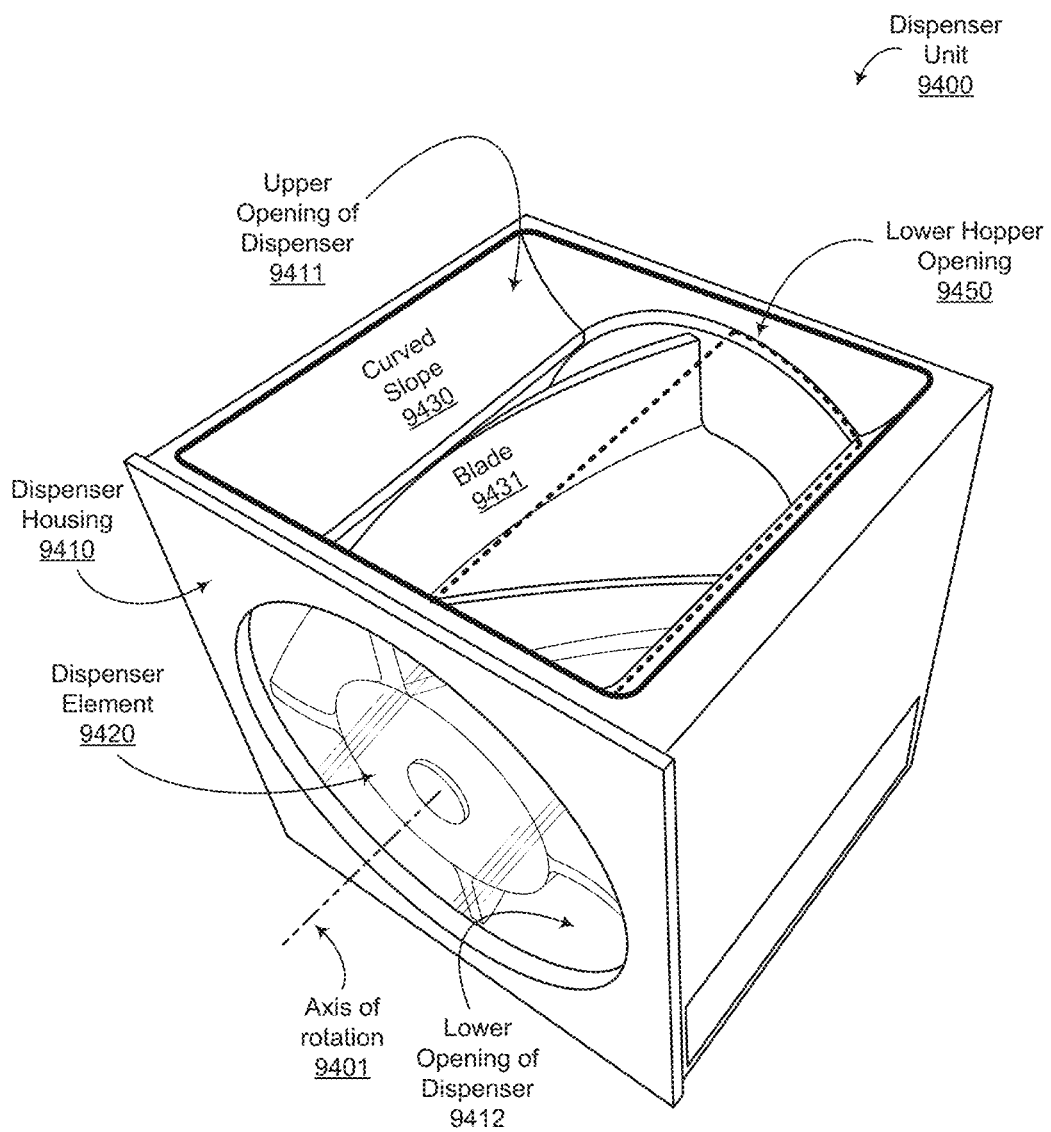
FIG. 22 illustrates a dispenser unit according to one embodiment.

FIG. 22 illustrates a dispenser unit 9400 according to one embodiment. The dispenser unit includes a housing 9410 and a dispenser element 9420. The dispenser element 9420 is coupled about a horizontal axis of rotation 9401. The housing 9410 has an upper opening 9411 coupled to a lower opening 9450 of the hopper (not shown) to receive ingredients and a lower opening 9412 in which the ingredients exit the dispenser. The dotted line approximately indicates the proximate location of an interface between opening 9450, which would be formed by the minor and major inclines at the bottom of the hopper (see FIG. 19), and the upper opening 9411 of the dispenser housing. In this example, the upper opening 9411 of dispenser 9400 has curved sloping surface 9430 from an outer opening to an edge forming an inner opening, which intersects with blades 9431 of the dispensing element 9420 as described below. The blades 9431 also intersect with the hopper opening to open and close channels through the dispenser unit from the hopper as described below. A rod may be coupled through the center of the dispenser element 9420 and may be coupled to a stepper motor (not shown). The stepper motor may be coupled to a controller (not shown) which may control the rotational position of the dispenser element, which controls the amount of ingredients dispensed as described below.

Figure 23A:
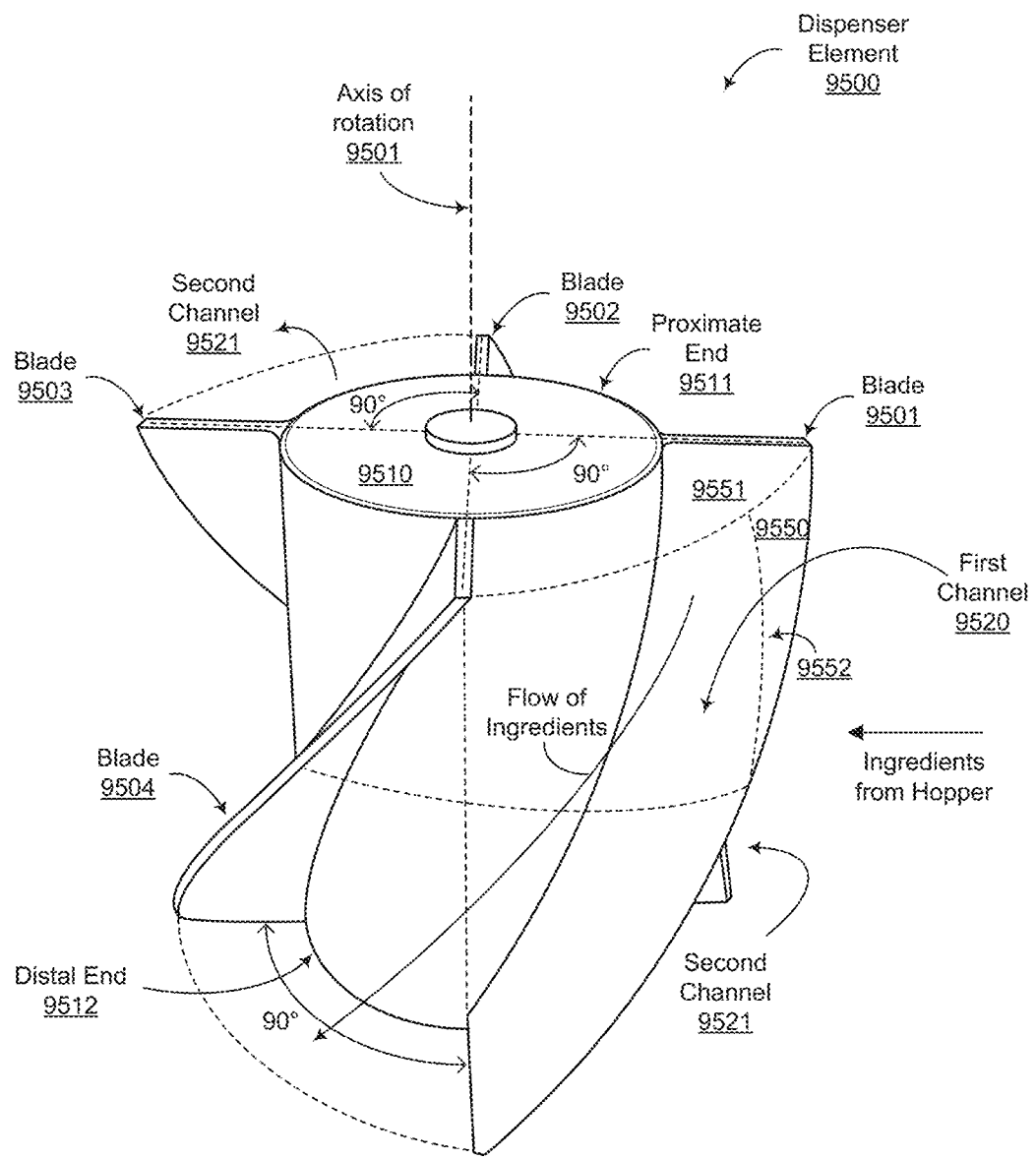
FIG. 23A-B illustrate alternative the dispenser elements according to various embodiments.

FIG. 23A illustrates the dispenser element 9500 according to one embodiment. In this example, the dispenser element 9500 includes four (4) blades 9501-9504 which form first and second channels 9520 and 9521. In this example, the channels are in opposite quadrants on opposite sides of the dispenser element. The 4 blades emanate from a cylindrical base 9510 about the horizontal axis 9501. The blades 9501-9504 emanate from the base 9510 at a number of degrees (e.g., 90 degrees) from each other at a proximate end 9511 of the cylinder 9510. Two adjacent blades 9501 and 9504 of the four blades 9501-9504 form the first channel 9520 and the other two adjacent blades 9502 and 9503 of the four blades 9501-9504 form the second channel 9521. Ingredients from the hopper may flow from the top down (here, from the right to the left). The dispenser element 9500 may be rotated back and forth (e.g., clockwise and then counter clockwise) between first and second degrees (e.g., from 0 to less than 90 degrees and back) to control the flow of items from an upper opening in the dispenser housing through the first and second channels and to a lower opening in the housing (see FIG. 22). As described in more detail below, FIG. 23A illustrates opening 9550 formed by the blade 9501, a sidewall 9551 of the dispenser housing (not shown, but illustrated using a dashed line), and an edge 9552 of the lower opening in the hopper (also not shown but illustrated using a dashed line). A similar triangular shaped channel opening may be formed for the second channel 9521. As discussed below, the angle of rotation of the dispensing element may increase or decrease the size of channel openings 9550 to control the amount of ingredients that flow into each channel and through the dispenser, for example.

In one embodiment, the first and second channels curve about the horizontal axis such that the first and second channels shift by a number of degrees (e.g., 90 degrees) from the proximate end 9511 (e.g., the top in FIG. 23A) to the distal end 9512 (e.g., the bottom in FIG. 23A of the dispenser element 500.

In one example embodiment, the hopper incorporates an agitation mechanism that periodically agitates the product in the dispenser without dispensing the product such that the product stays in state that is easy to dispense. The frequency and the agitating mechanisms (e.g., circular motion with different blades, impact force along the back wall, etc . . . ) may be controlled by a combination of local and cloud servers in concert with the type of product in the hopper, for example.

Figure 23B:
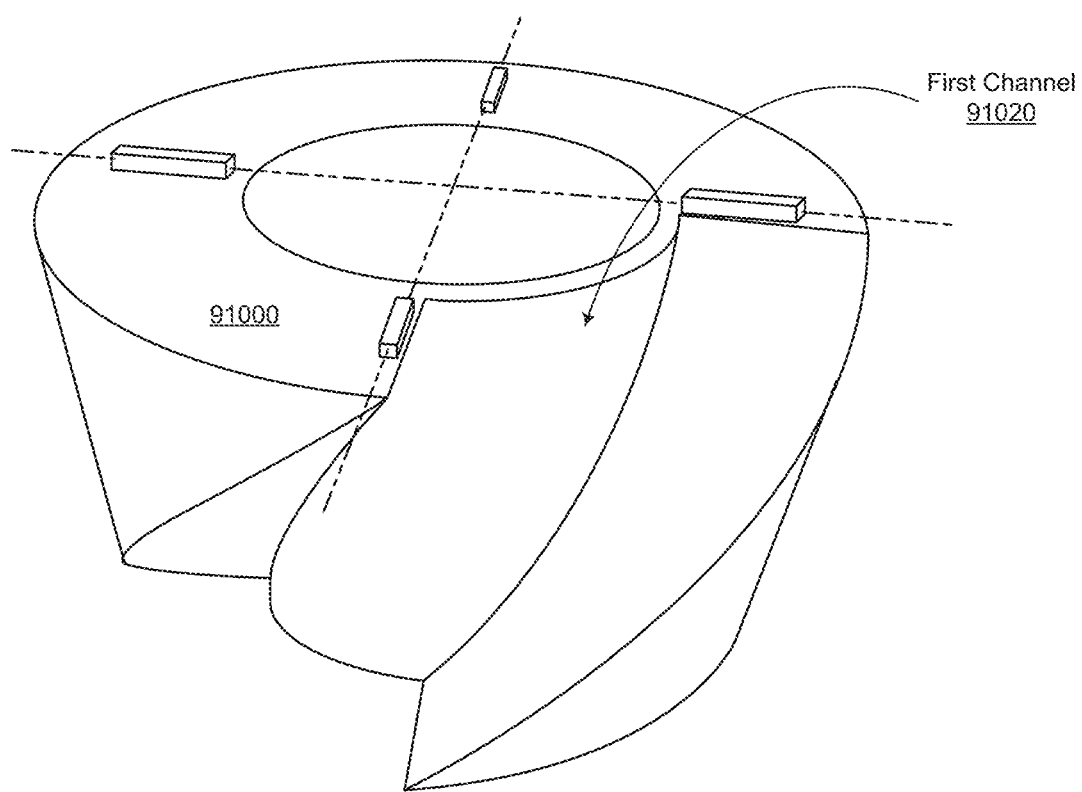

FIG. 23B illustrates another example dispenser element 91000 according to another embodiment. The dispenser element has a first channel 91020. Other embodiments may further include a symmetrical second channel in an opposite quadrant on the opposing side of the first channel. In one embodiment, the first, or first and second, channels may operate similar to the dispenser element of FIG. 23A. However, different shapes of first and second channels may be machined or molded such that the ingredients are less likely to stick and flow more effectively.

Figure 24:
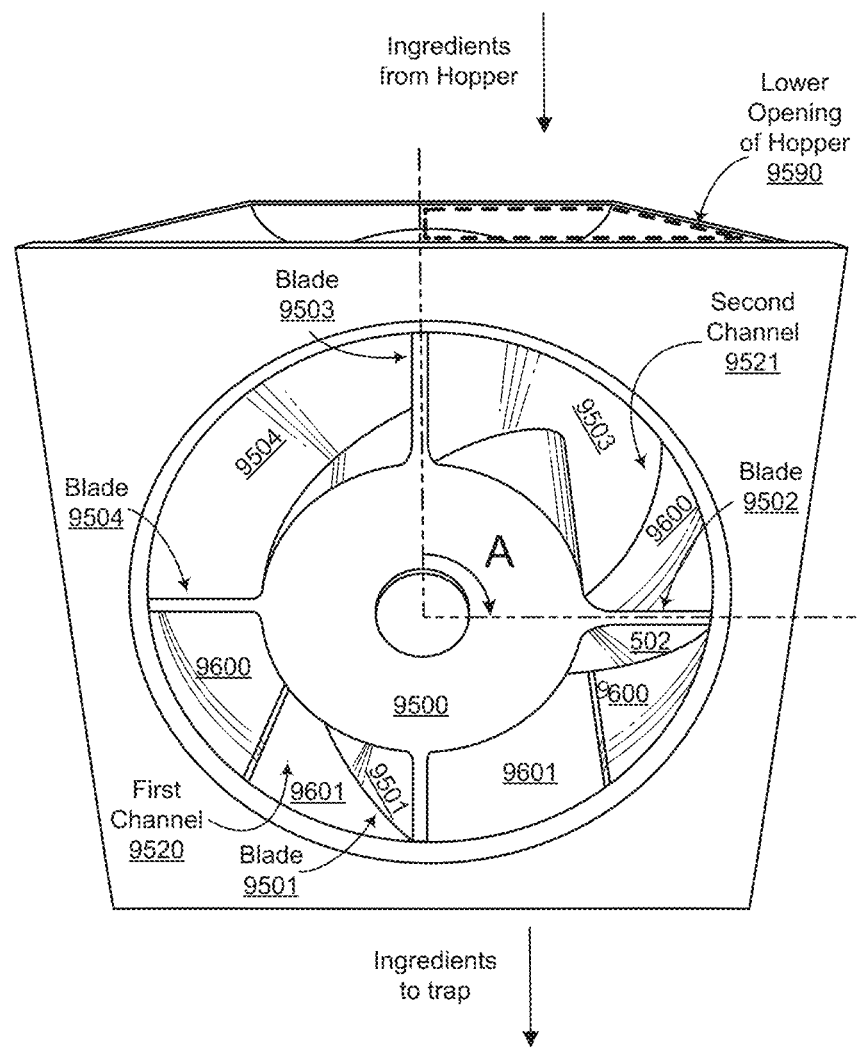
FIG. 24 illustrates a dispenser element in a first threshold position according to one embodiment.
Figure 26:
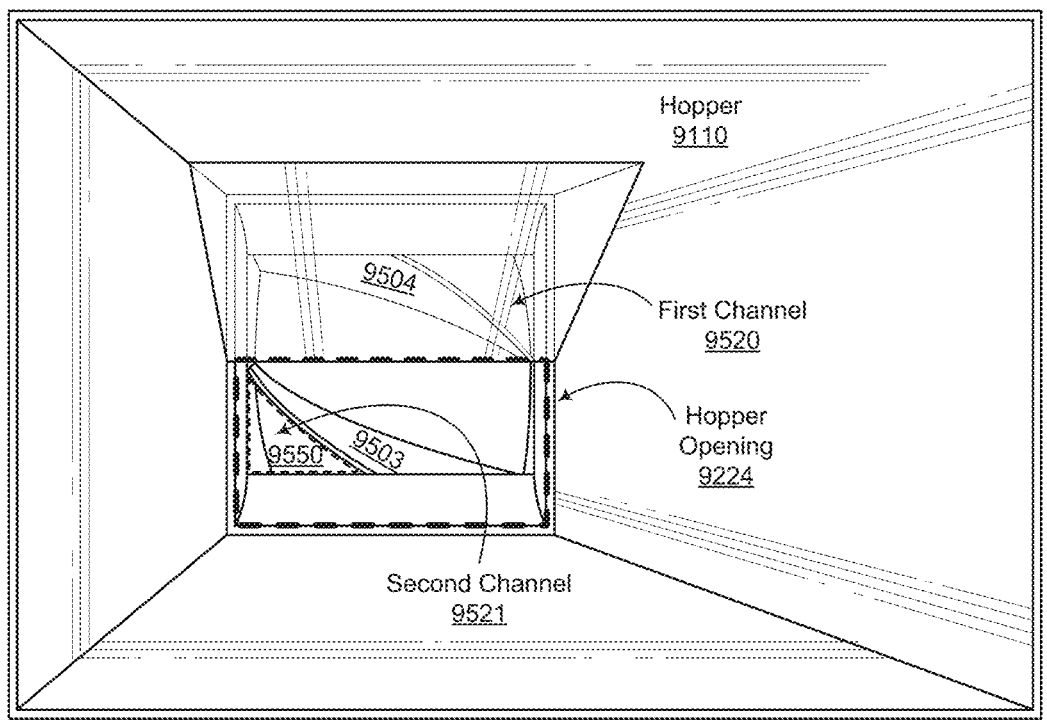
FIG. 26 illustrates a top view of a food dispenser apparatus according to one embodiment.

FIG. 24 illustrates a dispenser element 9500 in a first threshold position in which the leading edge (here, blade 9504) of the first channel 9520 at the rear (and not visible) is at 0 degrees (relative to angle A). For example, blade 9504 of the first channel 9520 curves from the horizontal position in the front of the dispenser housing to the vertical position in the rear of the dispenser housing, where blade 9504 may form a seal with incline 9112 (FIG. 19) at the edge of the opening 9590 (opening 9111 in FIG. 19) defined by the hopper (See FIG. 26 showing a top view where the upper blade 9504 of the first channel 9520 is at the edge of the hopper opening 9590 and the first channel 9520 is closed). Additionally, blade 9503 of the second channel 9521 curves from the vertical position in the front of the dispenser housing to the horizontal position in the rear of the dispenser housing. Accordingly, blade 9503 is also at the edge of the opening 9590 defined by the hopper to form an opening 9550 (in FIG. 23A) into the second channel (See FIG. 26 showing a top view where the upper blade 9503 of the second channel 9521 is at the edge of the hopper opening 9590 and the second channel 9521 is fully opened). As the dispensing element is rotated (e.g., first clockwise and then counterclockwise) an input opening into the first channel may increase in size and the opening into the second channel may decrease in size. As ingredients enter each channel they may move through a channel formed by the sidewalls of the blades and the sidewall 9600 of the dispenser housing toward the lower opening in the dispenser housing 9601.

Figure 25:
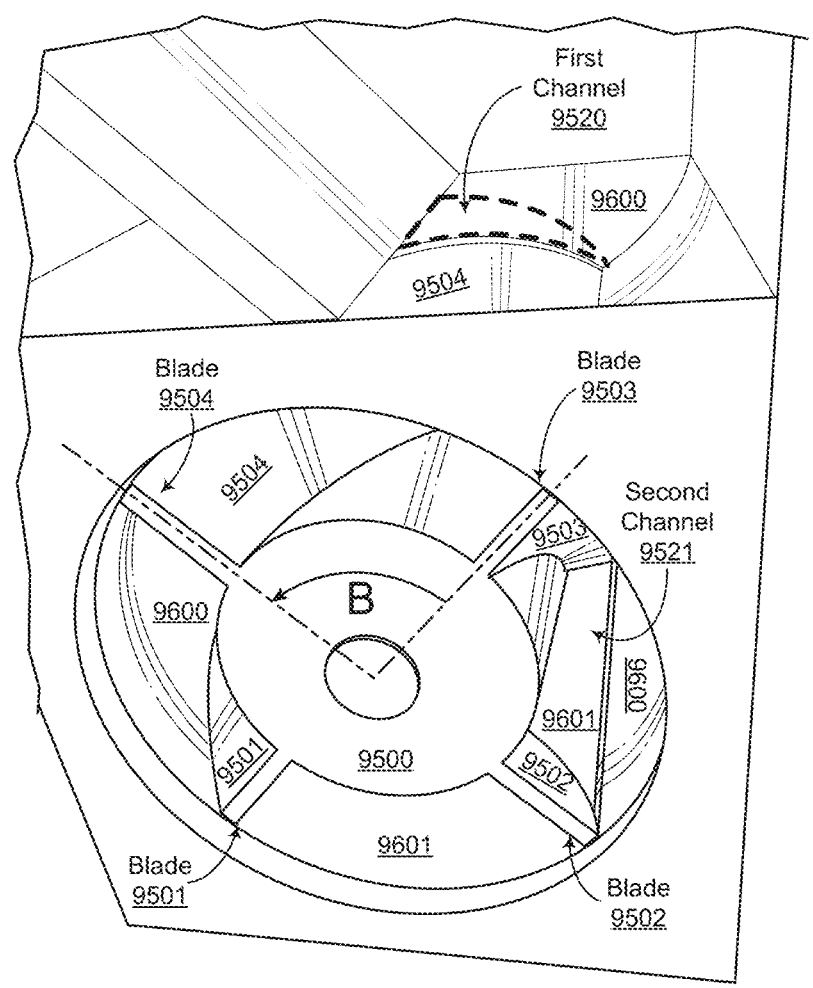
FIG. 25 illustrates a dispenser element in a second threshold position according to one embodiment.
Figure 27:
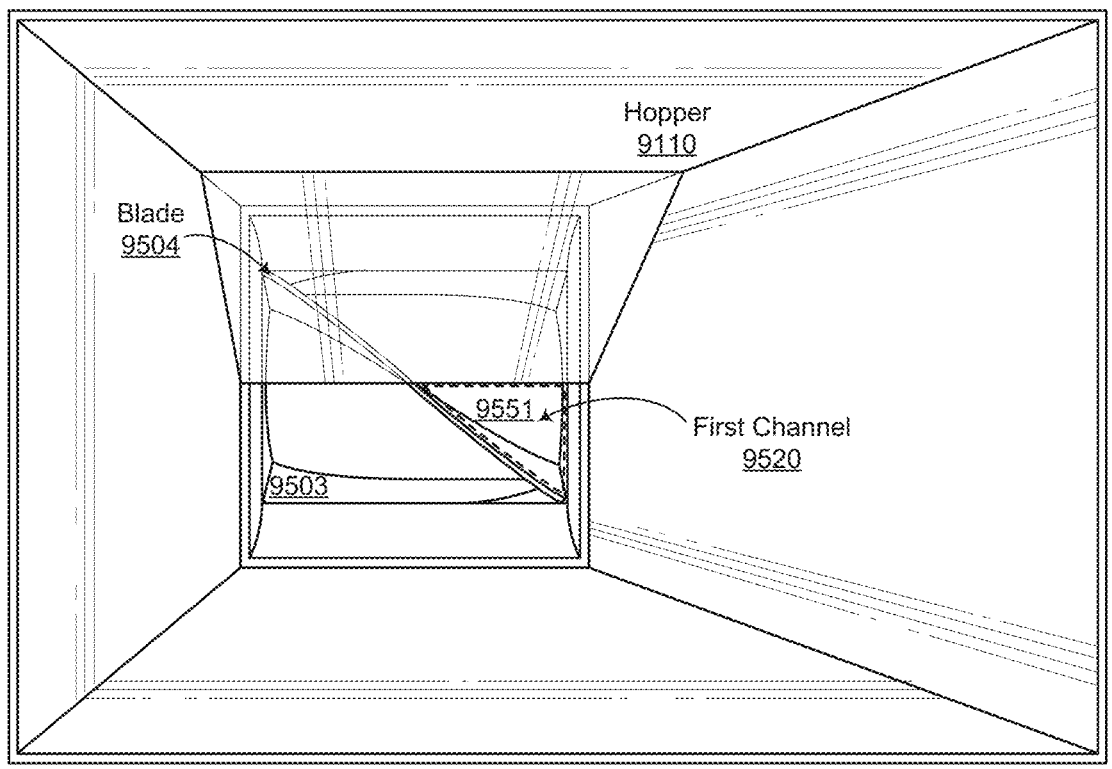
FIG. 27 illustrates a top view of an ingredient dispenser apparatus according to one embodiment.
Figure 28:
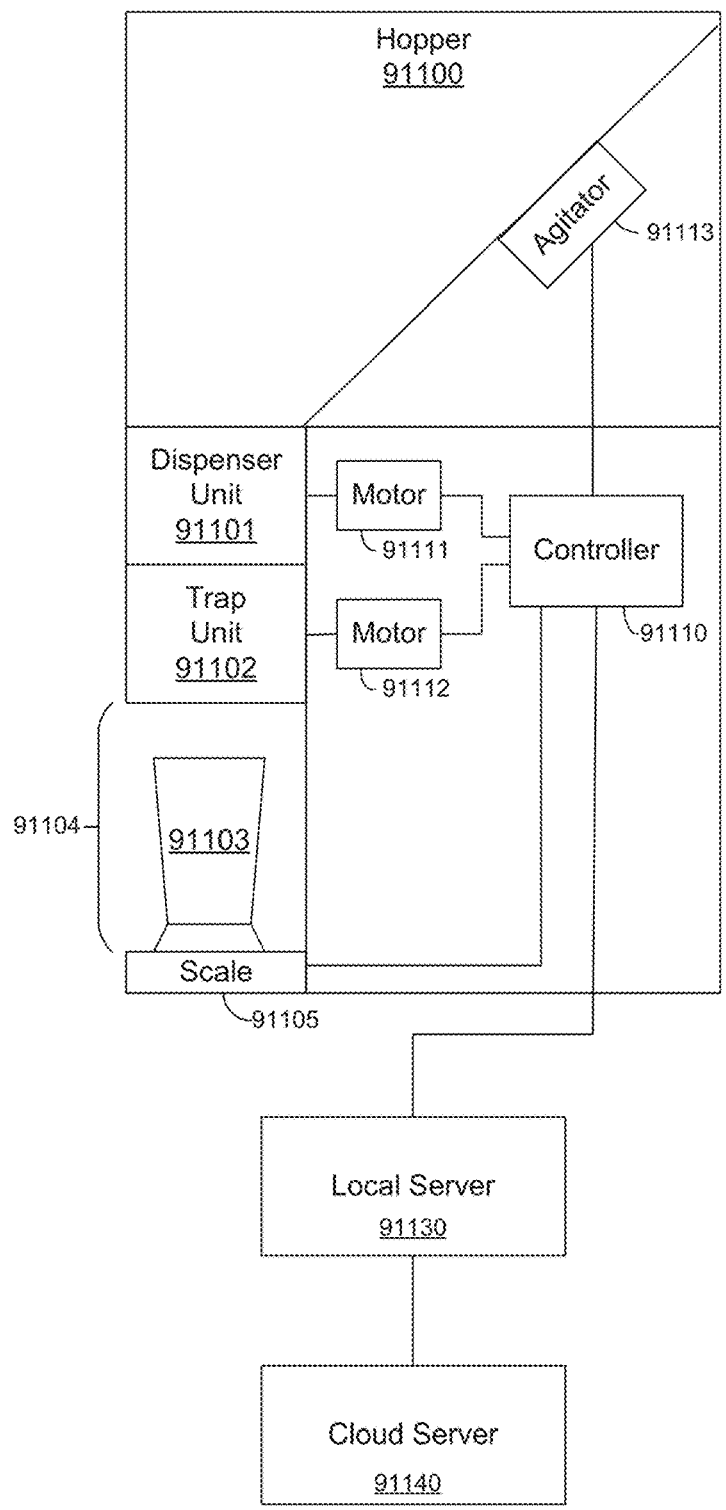
FIG. 28 illustrates a fully automated computer controlled dispenser system according to an embodiment.

FIG. 25 illustrates a dispenser element in a second threshold position in which the leading edge of the second channel 9521 (blade 9503) at the front (and visible) is at 0 degrees (relative to angle B). Since the upper blade 9503 of the second channel 9521 is adjacent to the upper opening of the dispensing unit, the second channel is closed in this position (See FIG. 27). More specifically, blade 9504 of the first channel 9520 curves from the shown position in the front of the dispenser housing to a position in line with the front position of blade 9503 (90 degrees) in the rear of the dispenser housing, where blade 9504 is at a second edge of the opening 9590 defined by the hopper (See FIG. 27 showing a top view where the upper blade 9504 of the first channel 9520 is at a second edge of the hopper opening 9590 and the first channel 9520 is fully opened). Note that embodiments of the disclosure may include blades that are long enough to intersect the edge of the hopper incline 9112 (FIG. 19) to seal the first channel, for example. Additionally, blade 9503 of the second channel 9521 curves from shown position in the front of the dispenser housing (zero degrees relative to angle B) to a position in line with the front position of blade 9502 (90 degrees) in the rear of the dispenser housing. Accordingly, blade 9503 is also at the same edge of the opening 9590 as the rear portion of blade 9504 (e.g., the edge of the opening 9590 defined by the dispenser housing, See FIG. 27 showing a top view where the upper blade 9503 of the second channel 9521 is at the edge of the hopper opening 9590 and the second channel 9521 is fully closed). As the dispensing element is rotated (e.g., first counterclockwise and then clockwise) an input opening into the second channel may increase in size and the opening into the first channel may decrease in size.

FIG. 26 illustrates a top view of a dispenser apparatus according to one embodiment. FIG. 26 shows a dispenser unit view through the top of a hopper 9110 in the first threshold position shown in FIG. 24. The position of the blade corresponds to FIG. 24, or with reference to FIG. 25 to a configuration where the dispensing element is rotated along angle B approximately 40-45 degrees which creates an opening minor B 9550 which would allow ingredients to fall into the second channel 9521. In this position, the first channel 9520 may be close or have an opening so small that no ingredients may enter, for example. However, the rotation that opens the second channel 9521 to the upper opening of the housing (e.g., hopper opening 9224) also creates an opening in the first channel to the lower opening of the housing 9601 (see FIGS. 24-25), allowing items to flow out of the first channel 9520. Additionally, dispensing element 9500 may be rotated such that there may be positions in which both the first and second channels have upper openings simultaneously. The size of the opening minor B for the second channel is approximately the same size as the lower opening for the first channel. Accordingly, the size of these openings, as set by the angle of rotation by a motor, for example, may be used to control the amount of items that flow through the channels.

FIG. 27 illustrates a top view of a dispenser apparatus according to one embodiment. FIG. 27 shows a dispenser unit view through the top of a hopper 9110 in the second threshold position shown in FIG. 25. The position of the blade corresponds to FIG. 25, or with reference to FIG. 24 a configuration where the dispensing element is rotated along angle A approximately 40-45 degrees which creates an opening minor A 9551 which would allow ingredients to fall into the first channel 9520 but not the second channel. Since no ingredients can enter the second channel, flow through the second channel is stopped. Additionally, referring again to FIG. 25, ingredients may enter the first channel but flow is stopped because the sidewalls of the dispensing unit housing extend at least 90 degrees between an upper opening of the housing and a lower opening of the housing. As shown in FIG. 25 the lower blade 9501 of the first channel 9520 is adjacent to the edge of the housing sidewall 9600, thereby forming a seal in the first channel that prevents the flow of items from the upper opening to the lower opening of the dispensing unit. According, given the symmetry of the present example, when either the first or second channels are fully opened at the top of the dispensing unit to receive ingredients, they are also fully closed at the bottom of the dispensing unit to prevent ingredients from exiting the dispenser. Conversely, when either the first or second channels are fully closed at the top of the dispensing unit, they are also fully opened at the bottom of the dispensing unit so that ingredients may exit the dispenser. Similarly, the size of one input opening for one channel is typically the same size as an output opening of the other channel in this example.

Referring to FIGS. 24-27, the dynamic operation of the dispenser is as follows. Referring to FIG. 24, the first channel 9520 may be selectively rotated into a position between 40 and 80 degrees from the first threshold position (e.g., in the direction of angle A) corresponding to a variable opening between the first channel 9520 and the opening 9590 (See FIG. 27 showing the first channel forming an opening 9551 in the dispenser housing and bottom of the hopper). This allows a first amount of the ingredients to enter the first channel. If the angle of rotation is less than 45 degrees (A<45 degrees), for example, based on the configuration of the particular lower opening of the dispenser housing, the dispenser element may be in a position allowing the first amount of ingredients to exit the first channel and fall into the trap. This is illustrated in FIG. 24, for example, where the lower vertical blade 9501 of the first channel maintains an opening to the trap up to about 45 degrees, where blade 9501 intersects an edge of the lower opening 9601 in the dispenser housing and the first channel 9520 becomes closed at the bottom.

Referring to FIG. 25, the second channel 9521 may be selectively rotated into a position between 40 and 80 degrees, for example, from the second threshold position (e.g., in the direction of angle B) corresponding to a variable opening between the second channel and the opening in the housing (See FIG. 26 showing the second channel forming an opening 9550 in the dispenser housing and bottom of the hopper). This allows a second amount of the ingredients to enter the second channel. If the angle of rotation is less than 45 degrees (B<45 degrees), for example, based on the configuration of the particular dispenser housing lower opening, the dispenser element may be in a position allowing a second amount of ingredients to fall out of the second channel and into the trap.

In one example embodiment, the first and second channels are selectively rotated into a home position, which may be the position shown in FIG. 25, for example. In the home position, no amount of the ingredients passes through the dispenser unit. In one embodiment, the first and second openings created by moving the dispenser element clockwise and counter clockwise are configured to be the same so that approximately equal portions pass through each channel. The angle of rotation may further control the amount flowing into each channel, for example.

Advantageously, as mentioned above, the size of the channel inputs may be varied so that the system reliably delivers different amounts of repeatable quantities of ingredients. For example, one or more rotational movements may deliver a first amount of ingredients for a first use, and another one or more rotational movements may deliver a second amount of ingredients for a second use. This is particularly advantageous where the dispenser is used to dispense solid food items for consecutive orders which may use different amounts of ingredients, for example.

Figure 29:
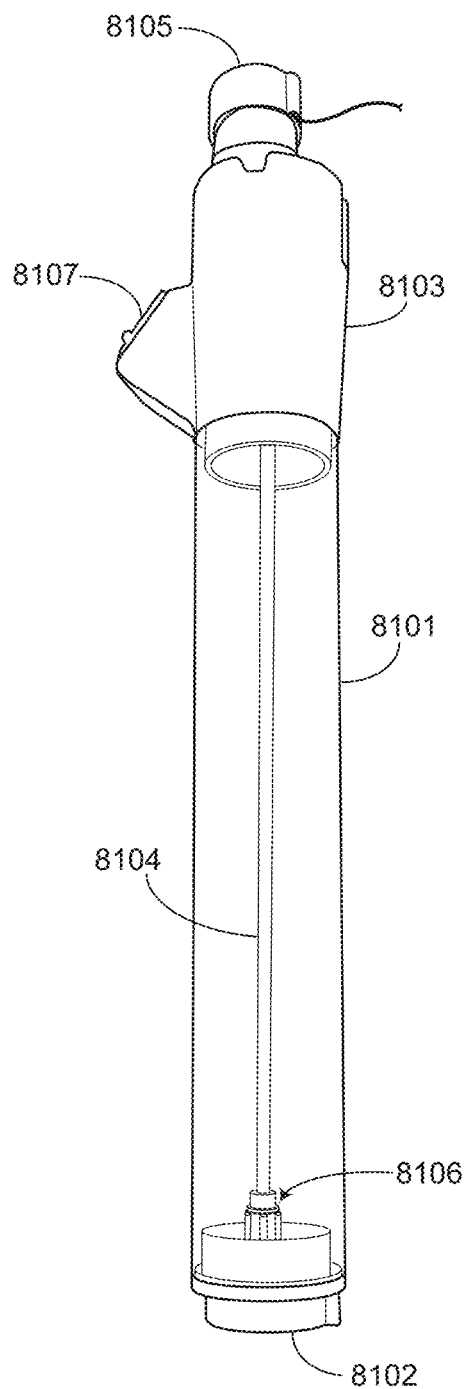
FIG. 29 illustrates a granule dispenser apparatus according to one embodiment.

FIG. 29 illustrates a fully automated computer controlled dispenser system according to an embodiment. This example illustrates a hopper unit 91100 coupled to a dispenser unit 91101, coupled to a trap unit 91102. Ingredients in the hopper move into the dispenser unit and through the trap as described above. The dispenser element in the dispenser unit may be controlled by a motor 91111 and a flap in trap unit 91102 may be controlled by a motor 91102, for example. Motors 91111 and 91112 are coupled to a controller 91110, which receives instructions from a server (e.g., local server 91130). Instructions from server 91130 may include an amount of ingredients to dispense, for example, which may have been received as part of are recipe from cloud server 91140, for example. The amount may be converted into a particular number of back and forth movements of the motor 91111 to move a dispenser element to dispense the amount in the instruction. In this example, a receptacle 91103 is placed (e.g., by a robotic arm) in a physical interface 91104 to receive ingredients that flow through the dispenser and through the trap. The receptacle 91103 may be placed on a scale 91105 to measure the weight of ingredients dispensed. Scale 91105 sends the weight of the dispensed ingredients to controller 91110 to form a feedback loop causing motor 91111 to rotate dispensing element to dispense more ingredients until a desired weight is obtained. In one embodiment, the weight measured on the scale is sent from the controller to the server, and the server continues to issue updated amounts to dispense until a desired weight is obtained, for example. For example, the controller may provide a feedback signal to the server with a weight measured by the scale such that the server responds to the weight of ingredients within the receptacle to configure the controller to dispense an updated weight of ingredients (e.g., a final weight less the weight measured by the scale). Motor 91112 may rotate the flap to configure trap 91102 in the open position at the beginning of a dispense operation, for example, and may configure trap 91102 in the closed position after a desired weight is obtained. For example, in response to a command from the server to the controller to dispense, the controller configures the motor to open the trap, and the controller closes the trap prior to responding to the server that the dispense operation is completed. Finally, this example illustrates the use of an agitator 91113 coupled to controller 91110. Agitator 91113 may include an electrical vibrator activated by controller 91110 to create vibrations in the hopper 91110 so that ingredients do not stick to the sidewalls or inclines of the hopper, for example.

Referring again to FIG. 25, in one embodiment, a second position a rotational difference from the home position (shown in FIG. 25) may be determined by a predetermined calibration factor corresponding to at least a size of the first channel, a desired amount of the ingredients, and/or a cut size of the ingredients, for example. This calibration factor may also include other positions as well. The calibration factor may comprise different values downloaded from a cloud server over the internet based on different ingredients of different sizes, for example. For instance, ingredients may be pineapple which has a chef's cut. Fruit of this cut may have been empirically characterized at the factory and a table of values may be ready for sending to each dispenser apparatus. In one embodiment, an initial calibration factor is loaded from the server to the controller to set a rotation value (e.g., amount of rotation for a given amount of a particular ingredient) and a cycle value (e.g., number of back and forth cycle) to deliver the desired weight of the items.

Additionally, different cut sizes of different ingredients may have different size dispenser elements. For example, a larger cut size may have a cylindrical base with a smaller radius and blades with correspondingly larger heights, where another smaller cut size may have a cylindrical base with a larger radius and blades with correspondingly smaller heights. Accordingly, in one embodiment, for a first size of items, the cylinder has a first diameter and the blades have a first radial length. In another embodiment, for a second size of items greater than the first size of items, the cylinder has a second diameter and the blades have a second radial length. The first diameter is greater than the second diameter and the first radial length is less than the second radial length.

In one embodiment, the dispenser element agitates (rotates back and forth) between two predefined positions to provide first and second amounts of ingredients. The two positions may be symmetrical because, as mentioned above, the input opening size of one channel at the upper opening may correspond to an output opening size of the other channel at the lower opening. This allows for alternating first and second channel dispensing of ingredients in succession. This may provide for nearly equal quantized portions of the ingredient to be dispensed from each channel into the lower opening of the dispenser unit and through the trap, for example.

In yet another embodiment the first amount of an ingredient is an incremental amount, and the dispenser element agitates between the two positions through a predetermine number of cycles to provide a final amount of the ingredient.

In one embodiment, the dispenser apparatus includes a scale to measure the weight of the first amount of ingredients after falling out of the first channel. In one embodiment, a receptacle is situated to receive the items exiting the trap and a scale is situated to measure the weight of the receptacle and items located within the receptacle. In another embodiment, the value of weight is used to control the motor coupled to the dispensing element to dispense a final amount of the ingredients specified in an instruction received from the local server, for example.

In yet another embodiment, a controller is coupled to control a motor (e.g., a stepper motor) coupled to open and close the trap, and a server is coupled to the controller. In response to an instruction from the server to the controller to dispense, for example, the controller opens the trap, and the controller closes the trap prior to responding to the server that the dispense operation is completed.

In one embodiment, the scale provides a feedback signal to the controller such that the dispenser element responds to the weight of items within the receptacle in a local feedback loop to deliver a desired weight of the items. In another embodiment, a feedback loop between the dispenser and the local server may fine tune the weight of items in the receptacle.

In another embodiment, the dispenser apparatus includes a server coupled to the controller. An initial calibration factor is loaded from the server to the controller to begin an initial rotation value and cycle value to deliver the desired weight of the items.

Example Granulated Dispenser

In one embodiment, one or more remote devices include a granulated dispenser. Thus, the present disclosure further relates to dispensing, and in particular, to granular dispenser apparatuses, systems, and methods for same.

FIG. 29 illustrates a granular dispenser apparatus according to one embodiment. In this example, the apparatus includes a container 8101, a cap 8102, a feeder housing 8103, a rod 8104, a motor 8105, and a stopper 8106. The cap is coupled to the bottom of the container, and the feeder housing is coupled to the top of the container. The stopper is coupled to the motor via the rod and may be spring loaded against a ridge of the cap. The stopper and the cap may be round (or circular) in shape so that the stopper can rotate around an edge of the cap, for example. As described in the examples below, the stopper and cap may form an interface comprising elements to alternately create seal and openings. The interface may include sawtooth forms and protrusions, where in a first position the protrusions are between the sawtooth forms and the cap and stopper are sealed, and in a second position the protrusions are on top of the sawtooth forms to create openings between the cap and stopper so granular items in the container may flow out of the container, for example. The actual spring (not shown) may be located within the feeder housing, for example. In one embodiment, the motor may be a stepper motor, for example.

Granulated components are placed into the container via a feeder opening 8107 of the feeder housing. Example granulated components may include powders or larger granulated items, for example. The container holds the granulated components which will be dispensed. In a home position, the ridge of the cap forms a seal with the stopper, thereby preventing the granulated components from exiting the container from the cap. When the motor is engaged, the rod turns and the stopper is rotated. Protrusions on the surface of the stopper engage sloped portions of a ridge on the cap to form a plurality of openings as described in more detail below. Accordingly, the granulated components in the container pass through the openings.

Figure 30:
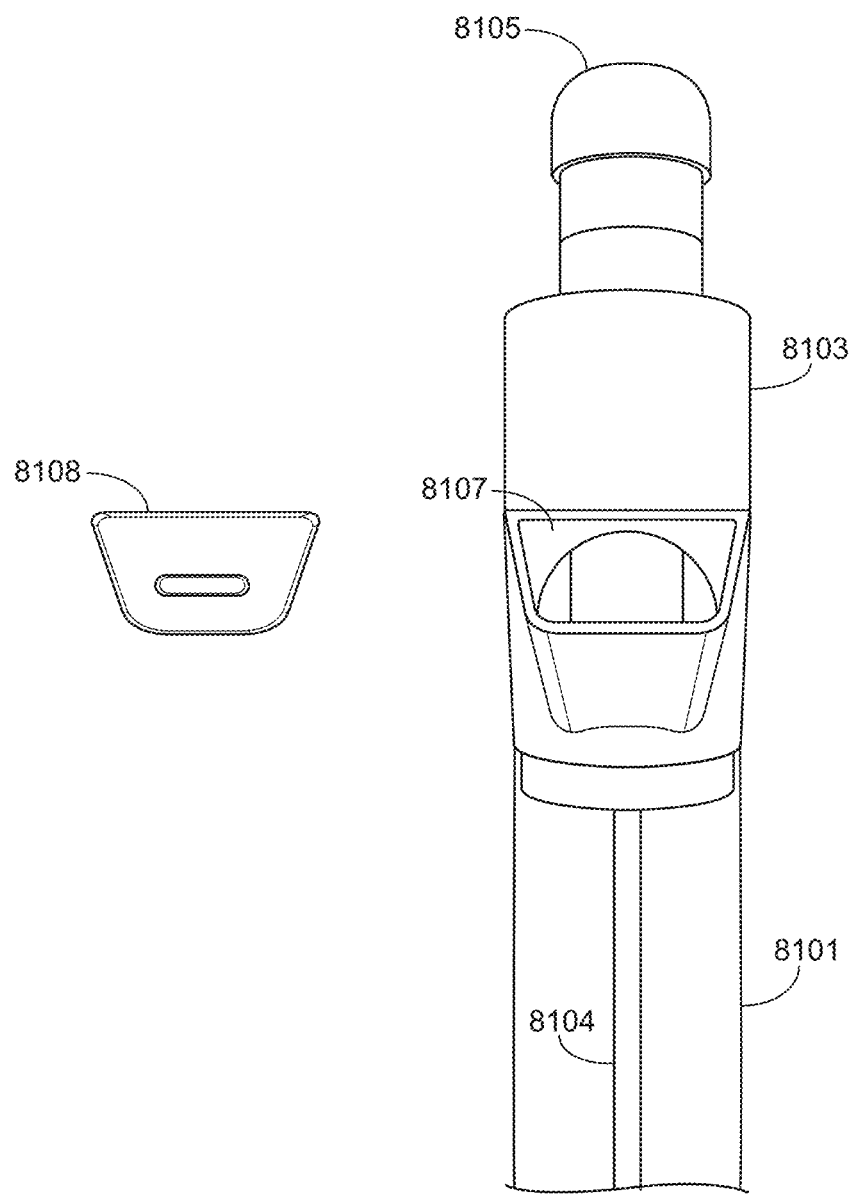
FIG. 30 illustrates an upper section of the granular dispenser according to one embodiment.

FIG. 30 illustrates an upper section of the granular dispenser apparatus of FIG. 1. FIG. 30 shows the feeder housing 8103 coupled to the container 8101 and the rod 8104 extending through the container. The feeder housing includes a feeder opening 8107 which allows the granulated components to be fed into the container. A feeder housing includes a top (or lid) 8108 to seal the granulated components within the container. The motor 8105 is coupled to the feeder housing to hold the motor in place. The rod is coupled to the drive shaft of the motor through the feeder housing.

Figure 31A:
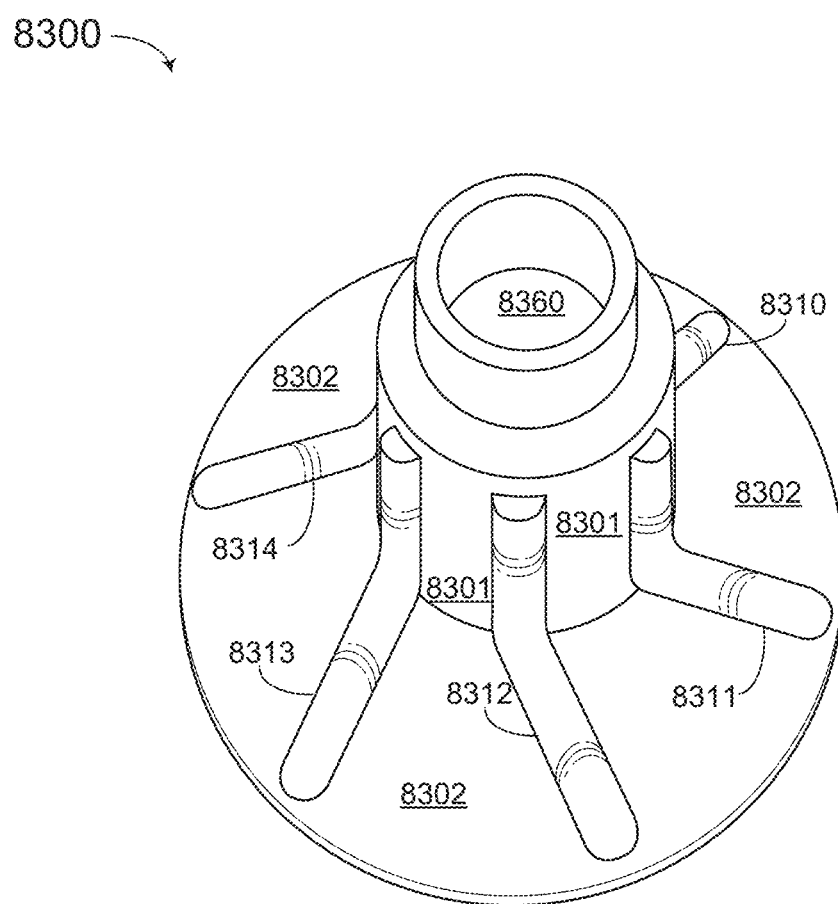
FIGS. 31A-C illustrate an example stopper according to one embodiment.
Figure 31B:
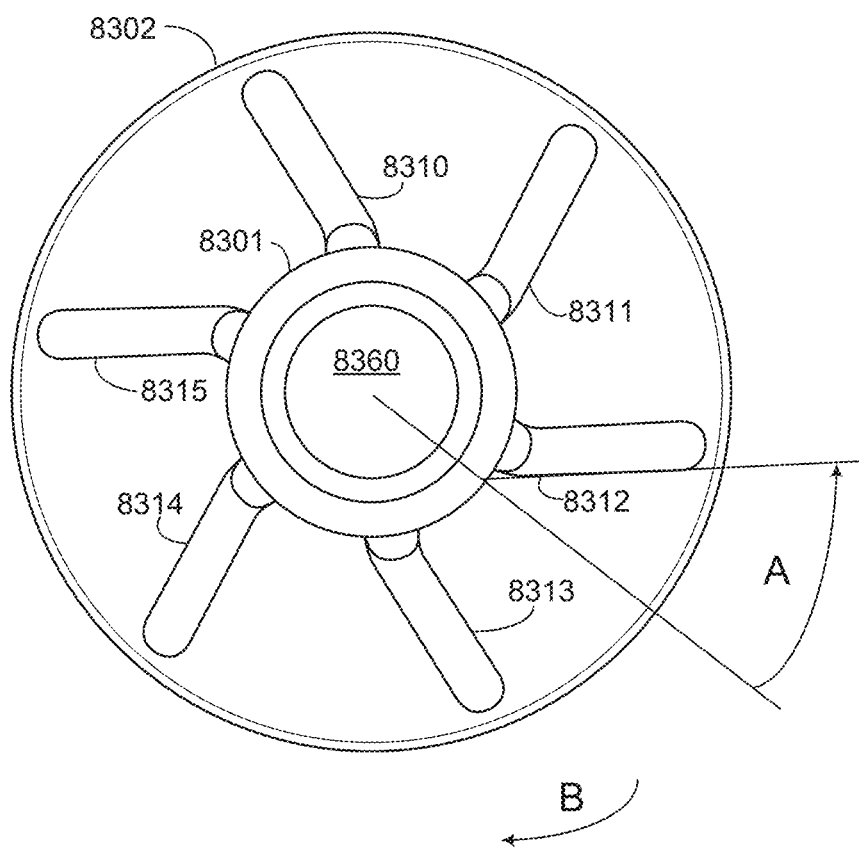
Figure 31C:
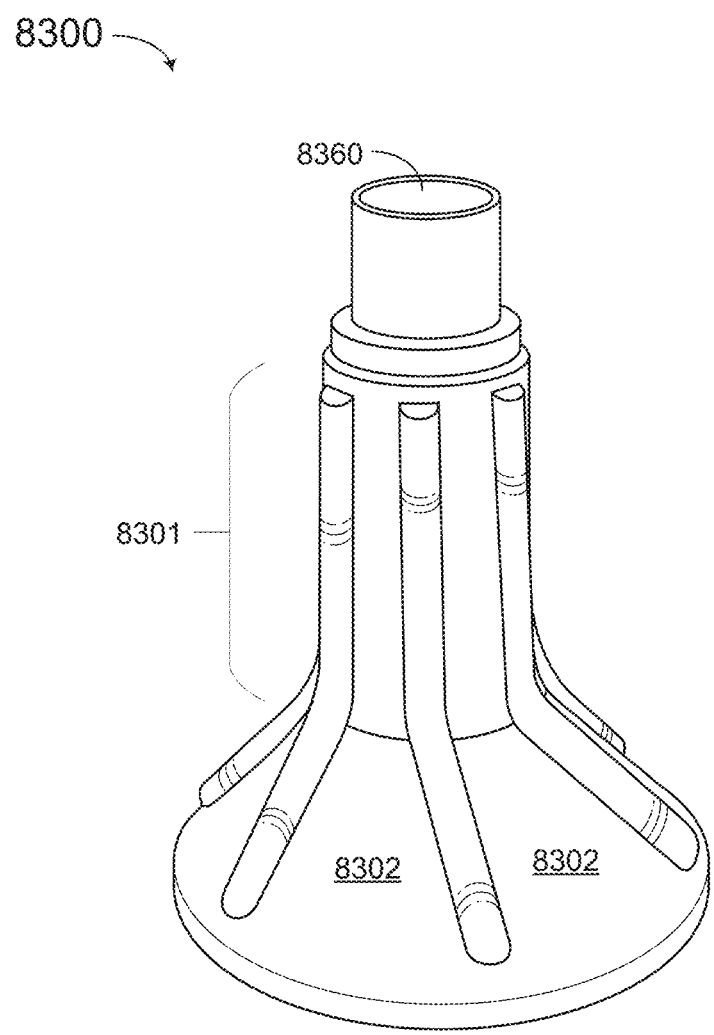

FIGS. 31A-C illustrate an example stopper 8300 according to one embodiment. FIG. 31A shows a 3 dimensional view of the stopper. The stopper forms a conical surface comprising a plurality of vertical protrusions (the protrusions are outlined in FIG. 31A). FIG. 31B shows a top view of the example stopper 8300. In this example, the stopper has 6 protrusions 8310-8315 curving from a central elongated portion 8301 of the stopper to a lower portion 8302. The stopper may be rotated in direction B (e.g., by the motor) to create openings and dispense as the stopper rotates around an edge of the cap. Protrusions 8310-8315 may be raised above the surface of lower portion 8302 to create openings when engaging the cap as described in more detail below. In this example, the protrusions are rounded. Additionally, in one embodiment, the protrusions may bend or curve away from the direction of rotation at an angle A to advantageously create a sweeping effect to move granulated items or powder from the container into the openings, for example. FIG. 31C illustrates another view of the stopper 8300 with the protrusions (the protrusions are outlined in FIG. 31C). The stopper includes an upper elongated portion 8301 which may be cylindrical or slightly conical, for example. A lower portion 8302 of the stopper comprises a conical portion. The lower conical portion 8302 includes the conical surface comprising the plurality of vertical protrusions that extend above the conical surface, for example. The sloping aspect of the conical surface may further advantageously help granulated components move toward the edges of the stopper and out through the openings created when the stopper is rotated by the motor, for example. As further illustrated in FIGS. 31A-C, the top of stopper 8300 includes a hole 8360 for coupling to the rod, for example.

Figure 32A:
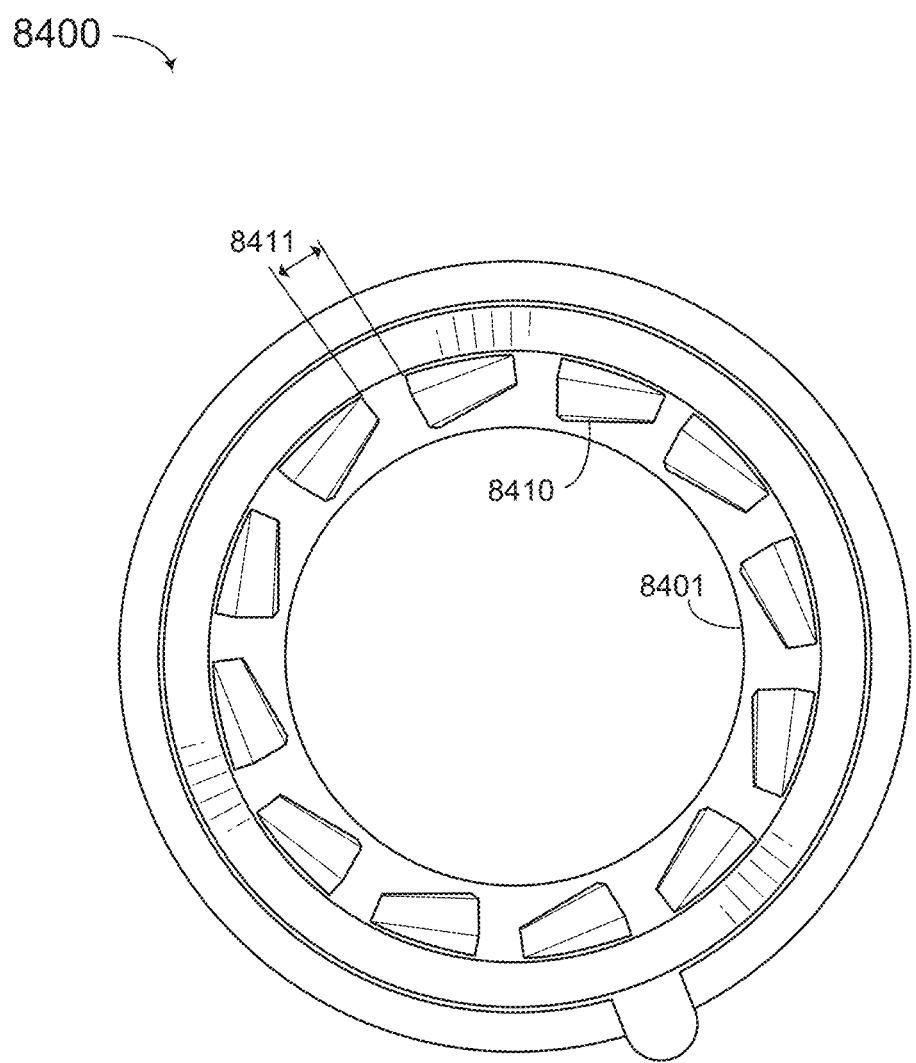
FIG. 32A-B illustrates an example cap according to one embodiment.
Figure 32B:
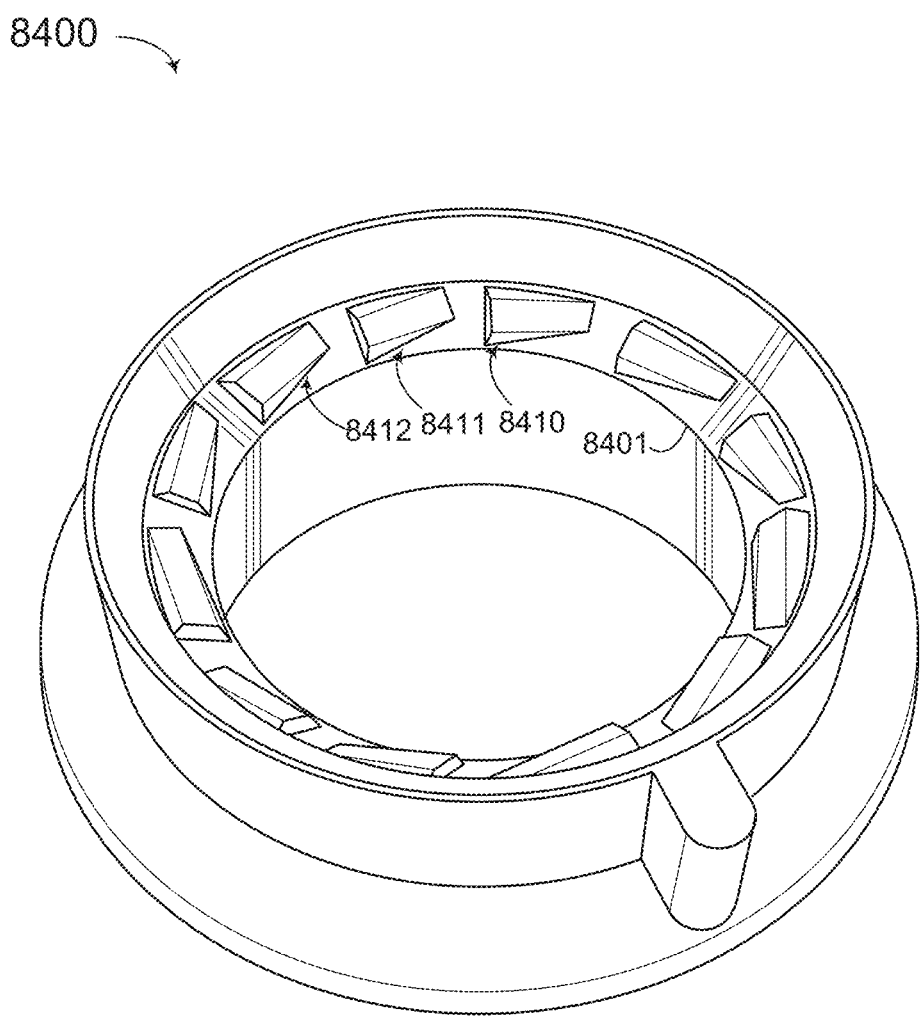

FIG. 32A-B illustrates an example cap 8400 according to one embodiment. In this example, a round cap includes a sawtooth ridge. In this example, the sawtooth ridge includes a plurality of sawtooth forms 8410 and a plurality of base portions 8411 between adjacent sawtooth forms. The vertical protrusions of the stopper (FIG. 31A-C) mate to the base portion of the sawtooth ridge of the cap in a home position to form a seal with the stopper. When the stopper is rotated, the vertical protrusions of the stopper (FIG. 31A-C) engage the sloped portion of the sawtooth forms to produce a plurality of openings. The stopper is lifted away from the ridge 8401 of the cap, while being pulled toward the cap ridge by the spring loaded rod, to create openings. The openings may be formed by the protrusions being lifted by the sloped portion of the sawtooth forms to move the conical surface of the stopper away from the cap. The openings reach their maximum size when the protrusions are at the top of the sawtooth forms as further illustrated in FIGS. 34A-B below. Accordingly, the sawtooth forms and protrusions are one example means for alternately forming a seal and one or more openings between the cap and the stopper.

Comparing FIG. 31A-C with FIGS. 32A-B, it can be seen that the number of sawtooth forms on the ridge of the cap and the number of vertical protrusions on the stopper may not be one-to-one. Rather, in this example, there are six (6) vertical protrusions on the stopper and twelve (12) sawtooth forms on the ridge of the cap. As the stopper is rotated, the protrusions cause openings to form between the stopper and the ridge of the cap (e.g., the protrusions and the sawtooth forms lift the stopper away from the ridge of the cap). The sawtooth forms also perform a second function. Every time a protrusion is moved up a sawtooth and then drops back into a base portion, pulled back by the spring loaded rod, a perturbation occurs (i.e., an agitation or vibration), which advantageously prevents or breaks up the granulated components from sticking together or otherwise blocking the flow from the container out through the openings between the stopper and cap. In some embodiments, the protrusions on the stopper may not come in direct contact with the base portions 8411, but rather a portion of the stopper surface (e.g., at an edge) is depressed against the lip (or edge) of the cap 8400 when the protrusions of the stopper mate with the base portions of the cap, thus sealing the container.

FIG. 32B illustrates the cap of FIG. 32A at another angle. The arrows indicate 3 of the sloped portions 8410-8412 of the ridge 8401. The sawtooth ridge includes a plurality of sloped portions (as outlined) interspersed with a plurality of base portions. As mentioned above, the plurality of protrusions of the stopper (FIG. 31B) may be less than the plurality of base portions of the cap, but the location of the protrusions may match the locations of a set of base portions of the cap in order for the cap to mate uniformly with the stopper when not rotating. In this example, having double the number of sawtooth forms compared to the number of protrusions increases the frequency of agitations. Since the protrusions fit into the base between each sawtooth form (to form a seal between the cap and the stopper and prevent flow), there may be the same number of sawtooth ridges between each of the protrusions, for example. Thus, other embodiments may have fewer or more sawtooth forms between each protrusion (e.g., 1, 3, etc . . . ), where the number of sawtooth forms between each protrusion corresponds to a frequency of agitation, and the height of the sawtooth forms corresponds to a size of opening created and a strength of agitation.

Figure 33A:
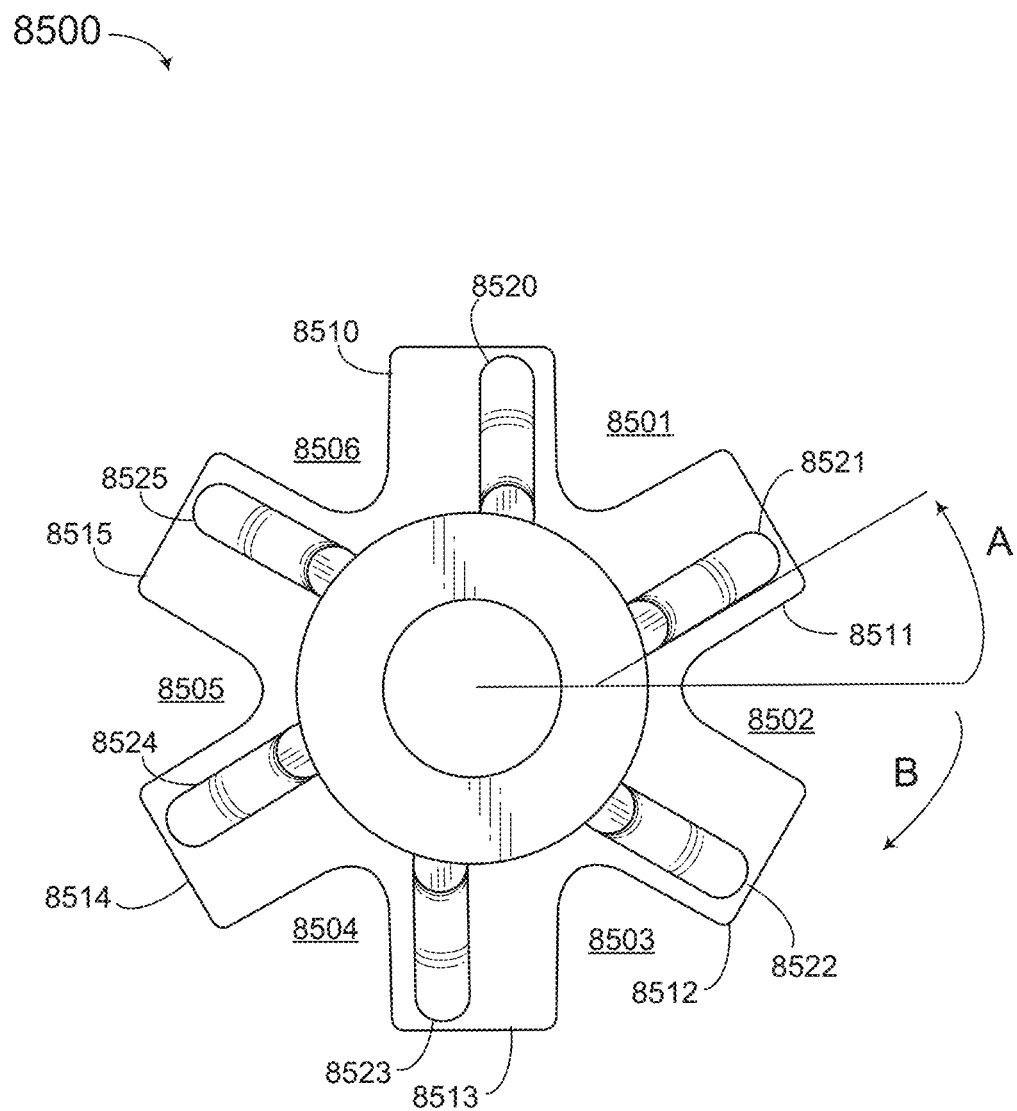
FIG. 33A-B illustrate another example stopper according to another embodiment.
Figure 33B:
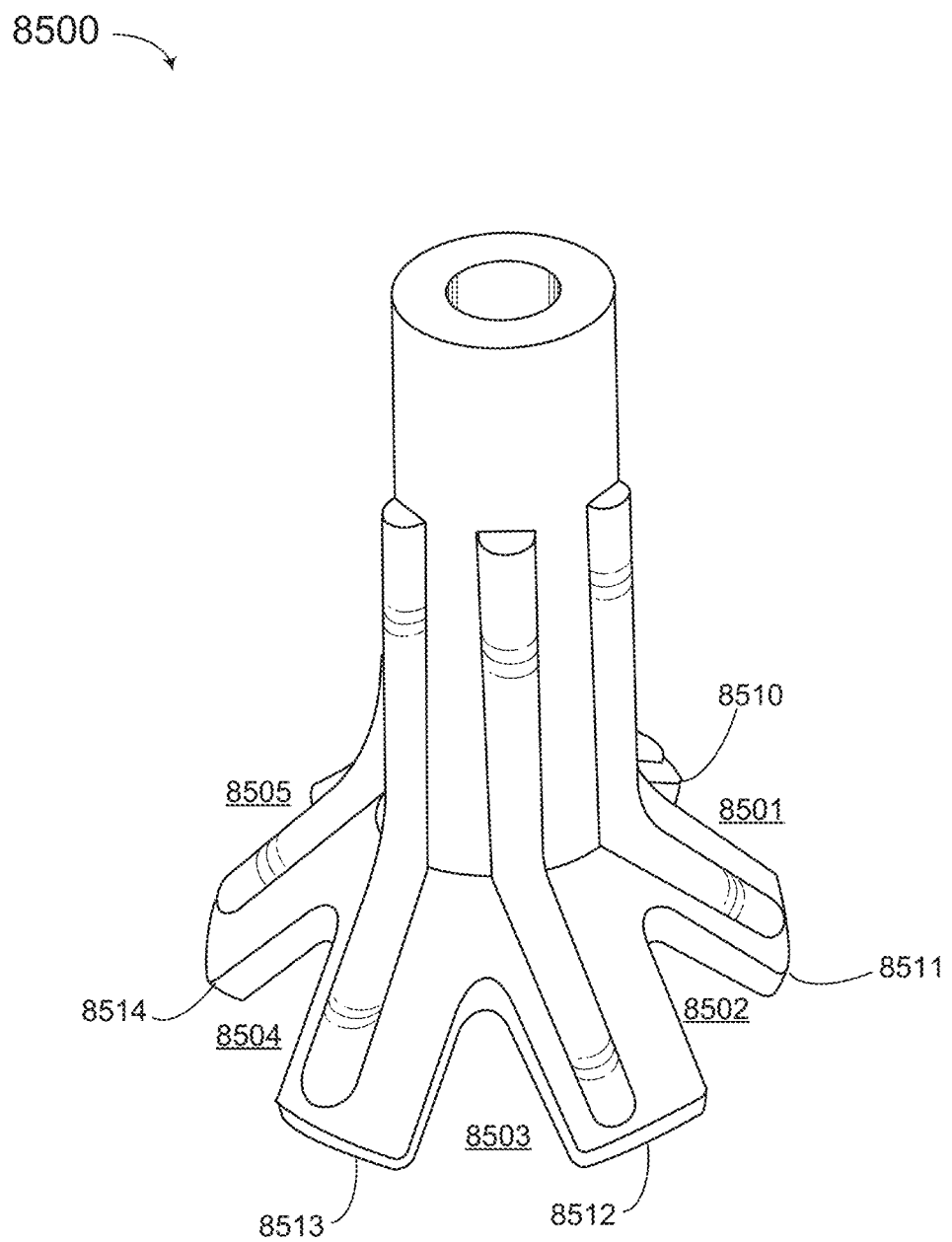

FIG. 33A-B illustrate another example stopper 8500 according to another embodiment. FIG. 33A illustrates a top view of the stopper. The stopper 8500 includes an elongated portion and a conical portion. The conical portion includes a conical surface broken up by gaps 8501-8506 between six fingers 8510-8516 each having protrusions 8520-8526 arranged at an angle in a direction (veering) away from the direction (B) of rotation as described for the stopper in FIG. 31B. FIG. 33B illustrates a 3-dimensional view of the stopper 8500. The stopper has gap openings 8501-8506 between the fingers 8510-8516. The protrusions may be more pronounced than the stopper of FIG. 31A-C. The more pronounced protrusions increase the size of the openings when the protrusions move up the slope of the sawtooth forms on the ridge of the cap, for example. The gaps in the conical surface may also help to increase flow. For example, the larger the gap, higher the volume/flow rate and easier it is to dispense sticky powders (which tend to be fine powders) or substances with larger granularities.

FIG. 34A-B illustrate the movement of the stopper in relation to the sawtooth forms on the ridge of the cap according to one embodiment. The sawtooth ridge includes the sawtooth (e.g., a ramp) and base portions. FIG. 34A illustrates a linear depiction of the stopper in relation to the sawtooth ridge in which the protrusion is mated with the base portion of the sawtooth ridge. When rotated, the stopper will move the protrusion in direction (B). FIG. 34B illustrates a linear depiction of the stopper in relation to the sawtooth after the stopper has been rotated and the protrusion has moved in direction (B). As a result the protrusion has been pushed up the ramp of the sawtooth and the stopper has separated from the cap by a distance (C). This distance (C) may cause a plurality of openings to form between the protrusions and allow the granular items to exit the container. In another embodiment, the protrusion does not come in direct contact with the base portion, but rather a lip (or edge) of the stopper is depressed against a lip (or edge) of the cap when the protrusions of the stopper mate with the base portions of the cap.

Accordingly, in one embodiment, the angle of rotation of the stopper controls an amount of the granulated components that pass through the openings. For example, a 90 degree rotation of the stopper may result in a first amount of granulated components to be dispensed, while a 360 degree rotation of the cap may result in a second larger amount of granulated components to be dispensed, for example. As mentioned above, the dispenser apparatus further comprises a motor coupled to the stopper for rotating the stopper. The motor may be configured to rotate a predetermined amount to dispense a corresponding amount of ingredients, for example.

In one embodiment, protrusions extend along a length of the conical surface along an upper portion of the stopper, and wherein the protrusions curve along a lower portion of the stopper. In another embodiment, the protrusions curve in a direction opposite to the direction of rotation to guide the granulated components through the openings. The curve of the protrusions may occur at the intersection of the upper portion and a conical portion as illustrated in FIGS. 31A-C and 33A-B, for example.

In one embodiment, the granulated components are granulated food items. Example granulated food items may include powders (e.g., protein powders or other powdered food supplements), seeds (e.g., Chia seeds), and a wide range of other granulated food products, for example.

In another embodiment, the size of the vertical protrusions and the size of the sawtooth ridge may be different for different items. Larger items with larger granularities may have a larger sized vertical protrusions and/or larger sized sawtooth ridge, for example, than smaller items having smaller vertical protrusions and a smaller sized sawtooth ridge, for example.

In yet another embodiment, the motor is a direct current (DC) motor and an ON time of the DC motor corresponds to an amount of the granulated components that pass through the openings.

In one embodiment, a periodic closing of the stopper vibrates the granulated components within the container, which advantageously prevents granulated components from sticking together or getting jammed and facilitates a steady flow of ingredients, for example. As mentioned above, the height of the sawtooth, the height of the protrusions from the conical surface, and/or the strength of the spring may contribute to the impact of the stopper closing onto the cap, and thereby govern the amount of vibration or agitation, for example.

Example Delivery System

In one embodiment, one or more remote devices include a delivery system. Thus, the present disclosure further relates to moving items, and in particular, to apparatuses, systems, and methods for delivering an item across a surface.

FIGS. 35-43 illustrate various embodiments of a delivery system. Features and advantages of the present disclosure include apparatuses, systems, and methods for moving items. In one embodiment, the present disclosure pertains to an apparatus comprising a mechanical guide, a movable unit, an engaging unit, and paired magnetic field generating elements and magnetically responsive elements. The movable unit is coupled to the guide. The movable unit travels along the path of the first surface defined by the guide. The movable unit and the guide may be configured to mount to the first surface, for example. The engaging unit is configured to couple to a second surface separated from the first surface by a thickness. For example, the second surface may be an upper surface of a counter, the first surface may be a lower surface of the counter, and the counter may have a thickness. The engaging unit is configured to engage an item on the upper surface (e.g., along the path), for example. One or more magnetic field generating elements are adjacent to one of the upper or lower surfaces to produce a magnetic field that penetrates the lower surface, the thickness, and the upper surface. The one or more magnetic field generating elements may be mounted to one of the movable unit or engaging unit and configured to generate a binding force in one or more magnetically responsive elements mounted to the other of the movable unit or engaging unit. Accordingly, when the movable unit travels along the path on the lower surface, the binding force moves the engaging unit along a corresponding upper path on the upper surface, for example. The engaging unit moves an item along a least a portion of the upper path, for example.

Figure 35:
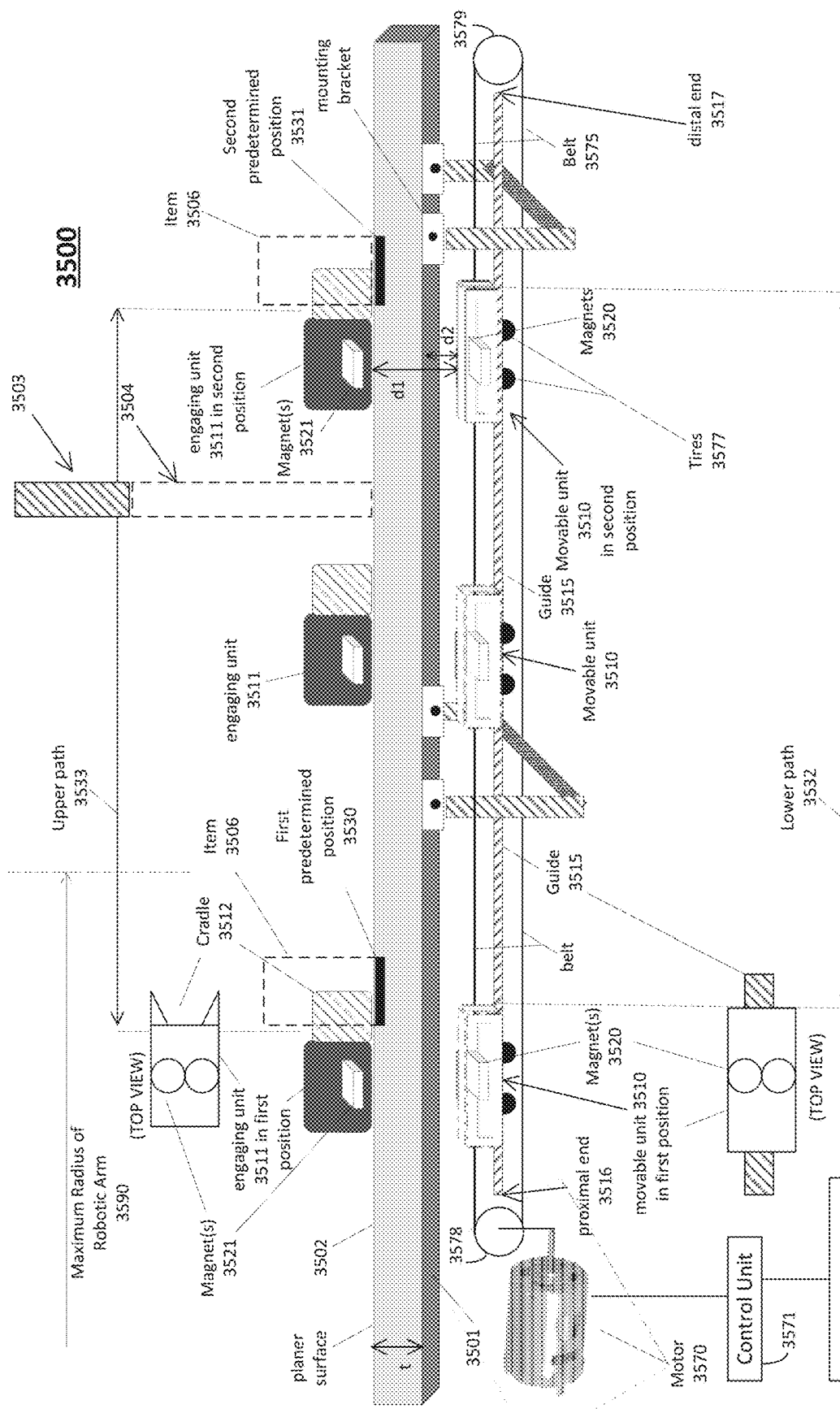
FIG. 35 illustrates an example delivery system according to one embodiment.

FIG. 35 illustrates an example implementation of a delivery system 3500 according to an embodiment. As mentioned above, in one example application the first surface 3501 is a lower surface of a counter, the second surface 3502 is an upper surface of the counter, and the thickness (t) is a thickness of a counter. The delivery system 3500 may be used to deliver items across a counter, such as food items, for example. In one example embodiment, the counter may include a window or other barrier 3503 with an opening 3504. Movable unit 3510 may be coupled to a guide 3515 having a proximate end 3516 and a distal end 3517, which defines the path 3505 of the movable unit 3510. The path may extend through the opening 3504 in the barrier 3503 to deliver an item 3506 outside the barrier as illustrated in FIG. 35. For example, in one application the item is a cup, a tray, or other mechanism for delivering food items, for example.

FIGS. 35-43 illustrate alternative embodiments with various overlapping and distinct features. Referring to FIG. 35, in one embodiment, the movable unit 3510 comprises a substantially flat surface configured adjacent to the lower surface 3501 (e.g., a car or platform positioned just below the lower surface of a counter). Similarly, the engaging unit 3511 may have a substantially flat surface configured adjacent to the upper surface 3502 (e.g., a puck in FIG. 35 or a lazy susan in FIG. 36 configured on the upper surface of a counter). The engaging unit 3511 may further comprise means for reducing friction as the engaging unit moves along the upper surface. In one embodiment, means for reducing friction may comprise rolling-elements, for example. For instance, the rolling-elements may be coupled to the engaging unit and extend between the engaging unit and the upper surface. In one example embodiment, the rolling-elements comprise one or more wheels 4010 (FIG. 40) configured in the direction of movement along the path of the upper surface. In another embodiment, the rolling-elements comprise one or more ball bearings, for example.

As mentioned above, the magnetic field generating elements and magnetically responsive elements produce a binding force holding the engaging unit to the upper surface. The binding force also moves the engaging unit when the movable unit is moved along the path on the lower surface (e.g., linearly or rotationally). The magnetic field may be generated using any known techniques. In one example embodiment, the magnetic field generating element is a magnet and the magnetically responsive element is an element attracted to the magnet. Referring again to FIG. 35, in another embodiment, the movable unit 3510 comprises at least one magnet 3520 and the engaging unit 3511 comprises at least one magnet 3521 to produce the binding force, for example. In this case, magnets serve as both magnetic field generating elements and magnetically responsive elements, for example.

Figure 39:
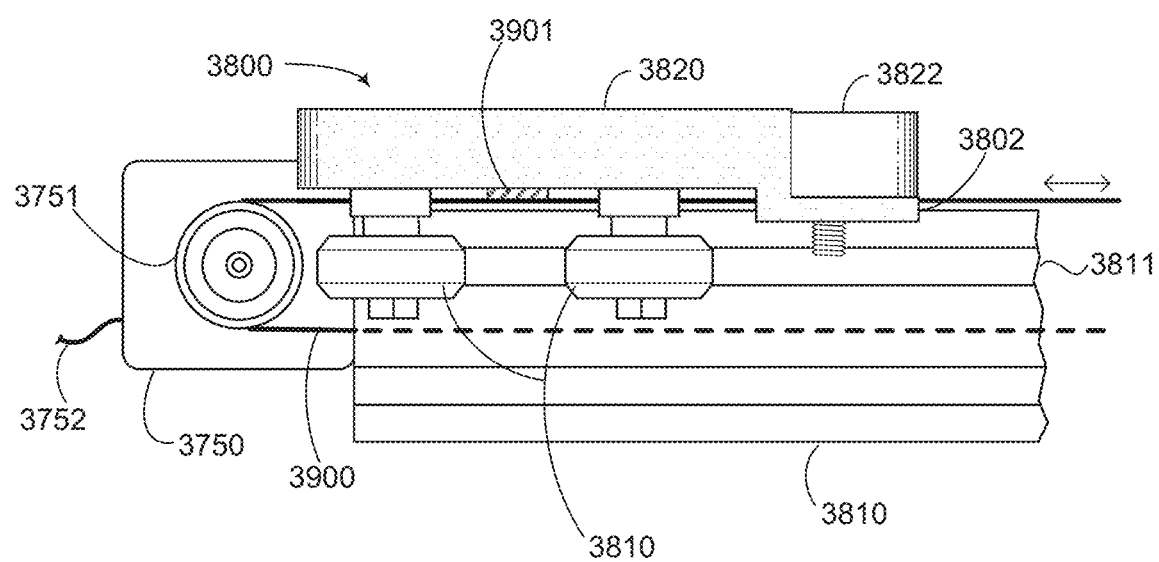
FIG. 39 illustrates a side view of an example movable unit, guide, motor and mounting unit according to an embodiment.
Figure 40:
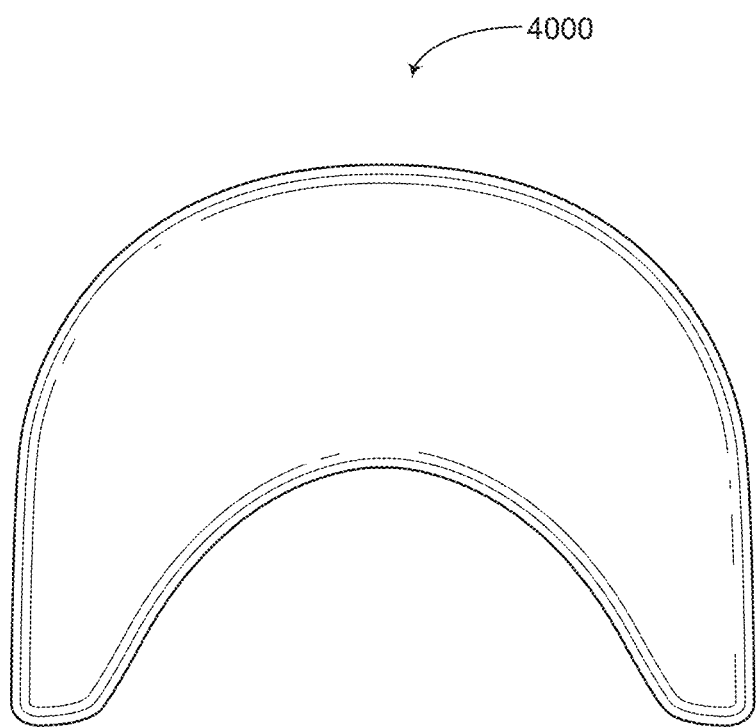
FIG. 40 illustrates a top view of an example engaging unit according to an embodiment.

Features and advantages of the present disclosure include an engaging unit that includes a mechanism for engaging an item. The item is then moved by moving the movable unit on an opposite surface, which may be hidden from view to create the appearance that the engaging unit and item are moving by themselves, for example. In one embodiment, the engaging unit comprises means for engaging the item, which may include a cradle 3512 to push and hold the item or a holding platform for repositioning the item (e.g., such as a carousel or lazy susan), for example. An example cradle 3512 is illustrated in FIG. 35, which shows a side view and tope view of engaging unit 3511. Features and advantages of the present disclosure may include an engaging unit having a shape configured to push objects towards the engaging unit when the object and engaging unit are out of alignment. For example, if a cup is not placed in center of the engaging unit's path, the shape of the engaging unit may be designed such that it will move the cup to the center. FIGS. 39 and 40 further illustrate a configuration for an engaging unit having a crescent shape for engaging an item to achieve this result, for example. In this example, the curvature of the engaging unit (e.g., a crescent) matches that of the object being pushed (e.g., a cup).

Figure 36:
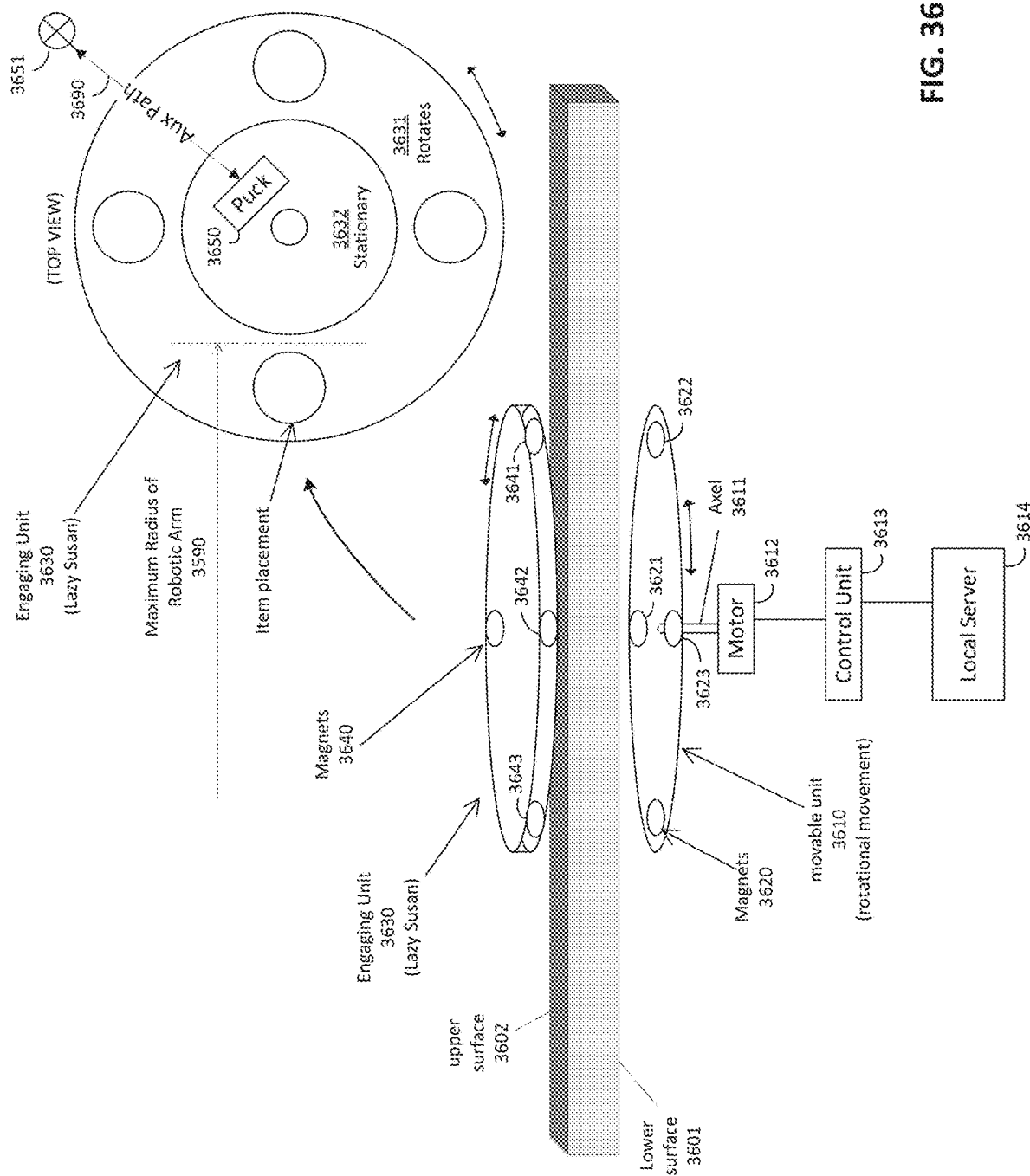
FIG. 36 illustrates an example delivery system according to another embodiment.

Some embodiments of the present disclosure may be used in conjunction with a robotic system, such as a robotic arm, to deliver items operated on by the robotic system and other devices, for example. In one embodiment, the path of the moveable unit and engaging unit overlaps a reach of a robotic system (e.g., a maximum reach or a radius of a robotic arm). Referring to FIGS. 35-36, a robotic arm may have a maximum radius 3590, for example, and a first portion of the engaging unit's path includes a first predetermined position 3530 (e.g., where the robotic arm places an item). Thus, the first predetermined position 3530 may overlap a reach of the robotic arm. A second portion of the path includes a second predetermined position 3531 (e.g., where the delivery system delivers the item), which may be outside the reach of the robotic arm, for example.

Figure 37:
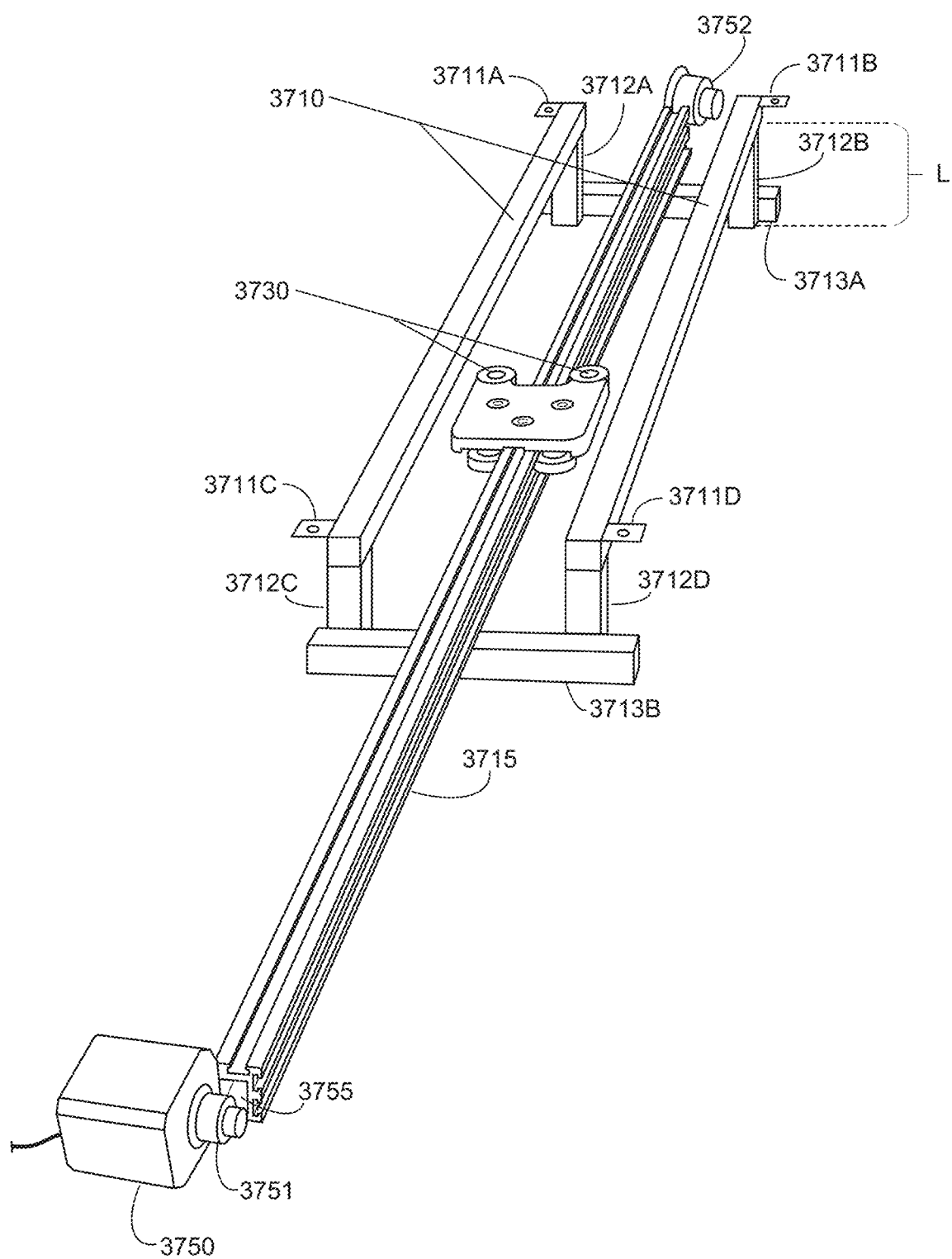
FIG. 37 illustrates an example movable unit, guide, mounting unit, and motor according to an embodiment.
Figure 42:
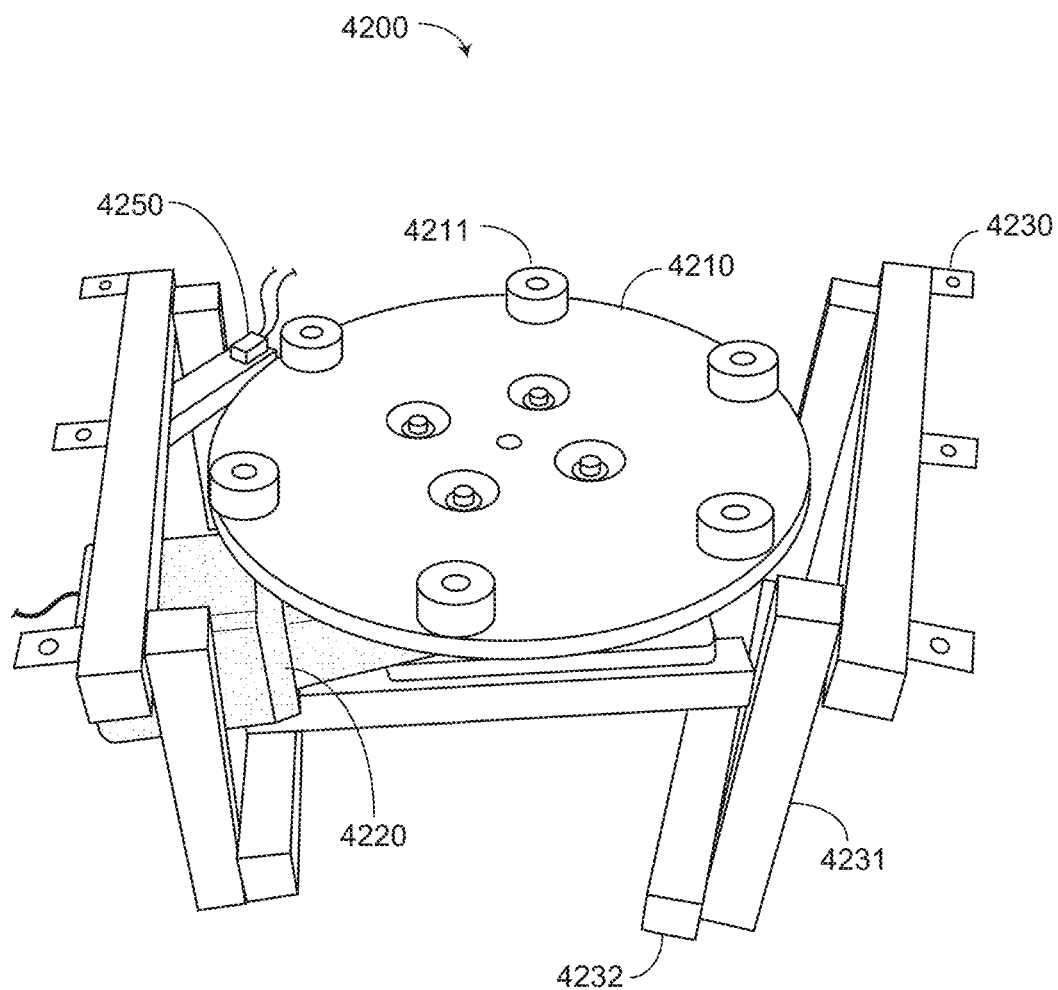
FIG. 42 illustrates an example movable unit, mounting unit, and motor according to another embodiment.

Embodiments of the present disclosure may include a mounting unit coupled to the guide to mount the guide to the lower surface, which may be hidden under a surface of a counter, for example. FIG. 37 illustrates an example mounting unit 3710 and for a delivery system according to one embodiment. In one embodiment, the mounting unit 3710 comprises a plurality of mounting brackets 3711A-D and a plurality of mounting posts 3712A-D. In one example embodiment, the mounting brackets each have a surface parallel to the lower surface to attach to the lower surface (e.g., with a screw or bolt). Various example mounting units, posts, and brackets are illustrated in FIGS. 35, 37, and 42, for example. Referring again to FIG. 37, the mounting posts 3712A-D are coupled to the mechanical guide 3715 using crossbars 3713A-B, and a length (L) of the mounting posts sets a distance, d2 (FIG. 35), between the lower surface and one of the magnetic field generating elements or magnetically responsive elements in the moveable unit. Referring again to FIG. 35, the mounting posts and thickness (e.g., of the counter) also set the distance, d1, between magnetic field generating elements and magnetically responsive elements on opposite surfaces because the engaging unit may lie substantially on the upper surface. In some embodiments, the distance, d2, and the magnetic field set the binding force above a first threshold, where the first threshold is configured to move the engaging unit and the item so that the engaging unit does not break free of the binding force. The values of magnetic field and distance, d2, required to meet this strength requirement are a matter of design choice based on the frictional forces of the surface, the engaging unit design, and the items to be moved. In some applications, the distance, d2, and the magnetic field may also set the binding force below a second threshold, where the second threshold is configured to provide safe manual coupling of the engaging unit to and from the upper surface. For example, the binding force should be strong enough to move the item, but not so strong that it is impossible for a user to remove the engaging unit from a countertop or that the binding force snaps or grabs the engaging unit with such strength as to injure maintenance workers or customers, for example.

As illustrated in FIG. 35, in one embodiment, a motor 3570 may be configured to move the movable unit 3510 along the guide 3515, for example. In one example implementation illustrated in FIG. 35, a control unit (aka controller) 3571 may be coupled to the motor 3570 for controlling movement of the movable unit 3510. The controller may further be coupled to a local server 3572, for example. Accordingly, in response to an instruction from the local server, the controller configures the motor to move the movable unit from a first position to a second position along the lower path 3532. Accordingly, the engaging unit 3521 is moved along a corresponding upper path 3533. As mentioned above, in one embodiment, the upper path comprises a first predetermined position for receiving an item and extends to a second predetermined position for delivering the item.

FIGS. 35 and 37-41 are example embodiments where the mechanical guide is a rail and the movable unit is a car that moves along the rail. The rail may form a straight line path or a curved path, for example. As illustrated in FIG. 35, a motor 3570 receives control signals from the control unit 3571, which may be responsive to instructions from a local server 3572, for example. The motor 3570 is coupled to a pulley system including pulleys 3578 and 3579, which are arranged on a proximate end 3516 and distal end 3517 of the rail, for example. A belt 3537 configured around the pulleys is attached to the car (moveable unit 3510) and motor 3570 is coupled to pulley 3578. While this example illustrates the drive mechanism as a belt, it is to be understood that belt 3537 may be any linear or circular drive mechanism for move the movable unit. Accordingly, as the motor 3570 turns, pulley 3578 at the proximate end of the rail, the belt rotates around the pulley 3579 at the distal end of the rail. Movement of the belt causes the car to move back and forth along the rail under control of the motor. The car may have wheels (e.g., with tires 3577) or other rolling-elements configured to engage a track of the rail to move the car smoothly along the rail, for example.

Referring again to the example in FIG. 37, a motor 3750 drives a pulley 3751. A second pulley 3752 is configured on an opposite end of the mechanical guide (e.g., a rail) 3715 and a belt (not shown) may be configured around the pulleys in line with the rail. Guide 3715 may include an opening 3755 (or hole) running the length of the guide such that a portion of the belt may be above the guide and attached to the car, while another portion of the belt may return from pulley 3752 to pulley 3751 inside the opening 3755, for example.

Figure 38:
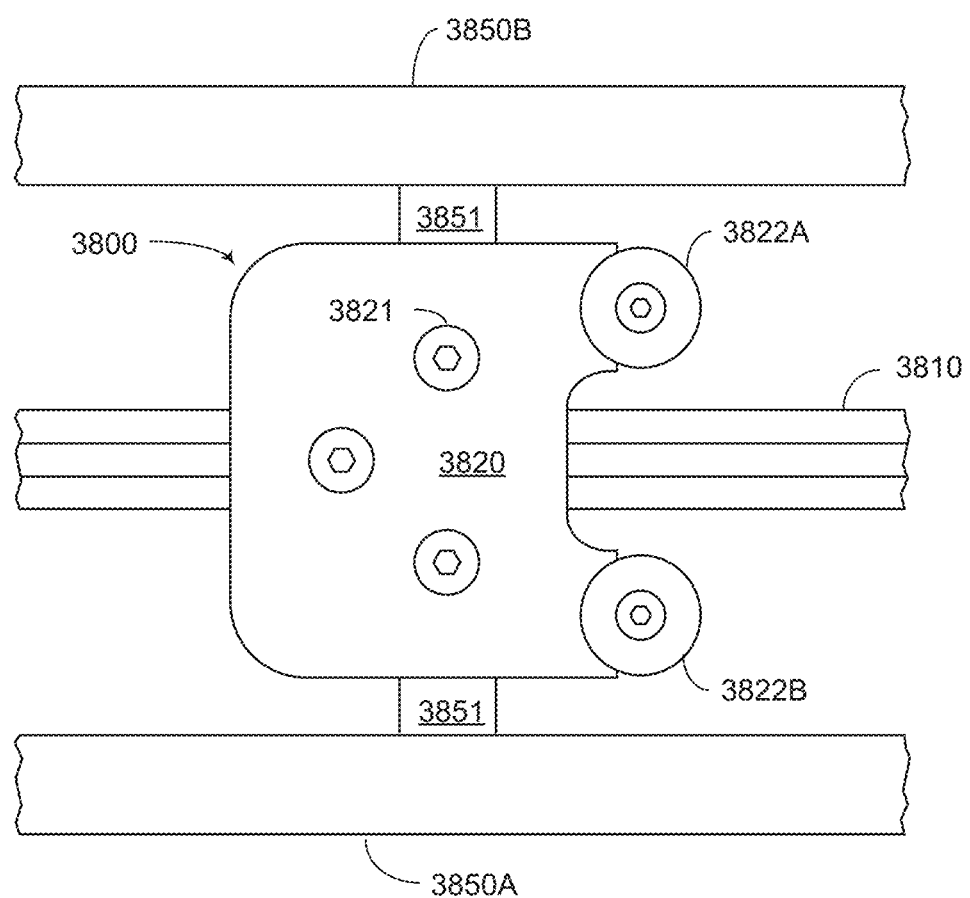
FIG. 38 illustrates a top view of an example movable unit, guide, and mounting unit according to an embodiment.

FIGS. 38 and 39 illustrate top and side views of an example movable unit 3800 and rail 3810. In this example, movable unit 3800 is approximately square with a forward portion comprising magnets 3822A-B arranged perpendicular to rail 3810. Rail 3810 may be mounted to crossbar 3851, and crossbar 3851 is coupled to mounting unit 3850A-B as mentioned above, for example. Movable unit 3800 may comprise a substantially flat surface 3820 for moving close to a surface (e.g., the lower surface of a counter). Screws 3821 may hold the flat surface to underlying components of the movable unit as well as holding magnets 3822A-B to the unit. FIG. 39 illustrates a side view of the movable unit. In this view, it can be seen how a belt 3900 is configured around pulley 3751 and attached (at 3901) to movable unit 3800 so that motor 3750 can control the movement of the car back and forth along the rail in response to electrical control signals over wires 3752 from a controller, for example. This side view of movable unit 3800 further illustrates two wheels (or tires) 3810, on each side, engaging a track 3811 in the guide 3810 to allow easy movement along the guide. FIG. 39 further illustrates a flat upper surface 3820 which may be approximately coplanar with an upper surface of magnets 3822 so that the magnets on the movable unit may be configured close to one surface to magnetically engage elements of an engaging unit on an opposite surface, for example. In this example, surface 3820 may comprise a recessed area 3802 configured to receive magnets 3822 such that the thickness of the magnets results in the upper surface of the magnets being approximately coplanar with surface 3820.

In the example shown in FIG. 35, the moveable unit 3510 may have two magnets arranged perpendicular to the direction of the lower path (movable unit top view), and the engaging unit 3521 may include two corresponding magnets arranged perpendicular to the direction of the corresponding upper path (engaging unit top view) to prevent rotation of the engaging unit as it moves along the upper path, for example. As mentioned above, the engaging unit 3511 may further comprise a cradle 3512 arranged perpendicular to the upper surface for engaging a sidewall of the item 3506, for example. The engaging unit may be a crescent shaped puck, for example, to engage round objects (e.g., a cup) as illustrated in the top view of the engaging unit shown in FIG. 35 as well as in the other example embodiments shown in FIGS. 40-41, for example.

Figure 41:
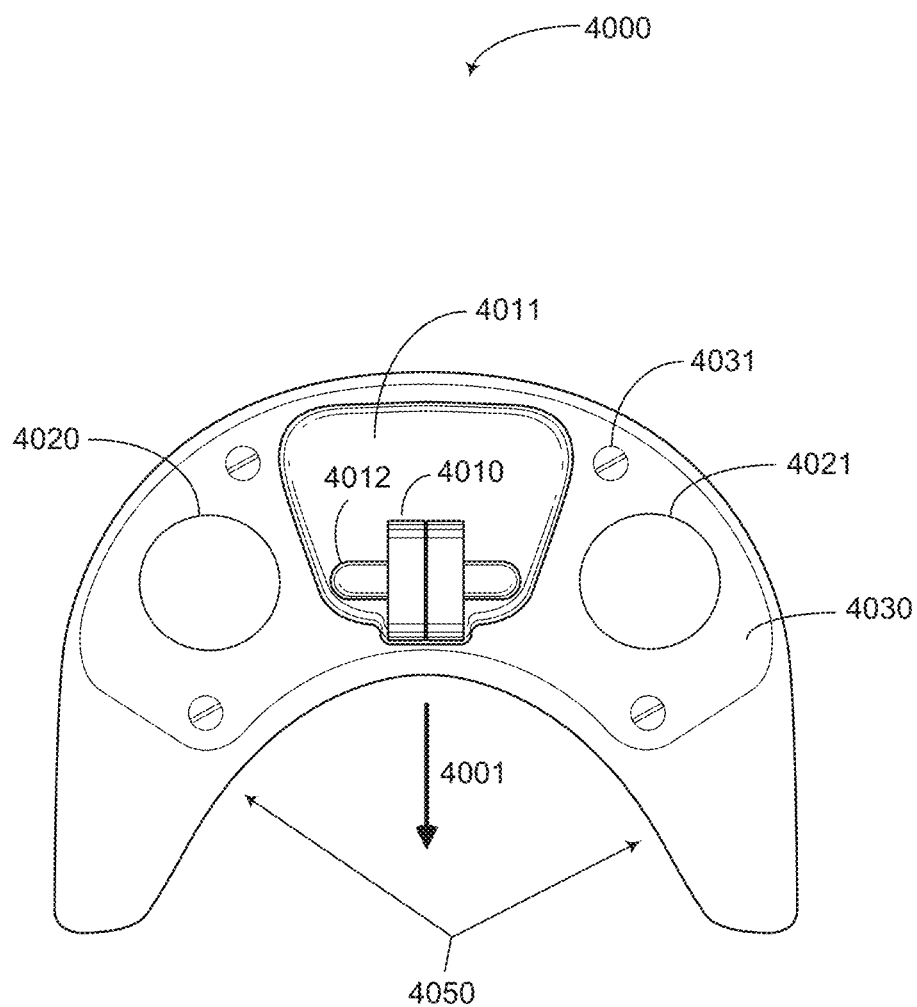
FIG. 41 illustrates a bottom view of an example engaging unit according to an embodiment.

FIGS. 40 and 41 illustrate a top view and bottom view of an example engaging unit 4000 according to an embodiment. FIG. 40 illustrates that an example engaging unit may have a crescent shape for engaging a cup or other round object, for example. FIG. 41 illustrates some components of an example engaging unit 4000 (aka, "puck"). Puck 4000 may comprise a lower plate 4030 attached to the puck using screws 4031, for example. Under the plate, inside the puck, are two magnets 4020 and 4021, for example. The magnets are arranged perpendicular to the cradle 4050 and the direction of motion 4001 of the puck. The plate 4030 may comprise a recessed region 4011 for receiving wheels (or a roller) 4010, which are configured so that the wheels roll in the direction of motion 4001 of puck 4000 along the path to reduce friction as mentioned above. Wheels 4010 may comprise an axel 4012 snapped into a receiving portion of the recessed region, for example, or otherwise attached to puck 4000, for example.

Referring again to FIG. 35, it can be seen that the lower path 3532 of the movable unit 3510 on the guide 3515 may be slightly different than the upper path 3533 of the item placed adjacent to the engaging unit 3511 on the opposite surface. For example, the path of the movable unit and engaging unit may start from an initial position and move across a first predetermined position 3530 where the item is picked up or engaged. The movable unit and engaging unit may move to a final position to move the item from the first predetermined position to a second predetermined position 3531, where the second predetermined position is adjacent to the final position of the engaging unit and movable unit, for example.

Figure 43:
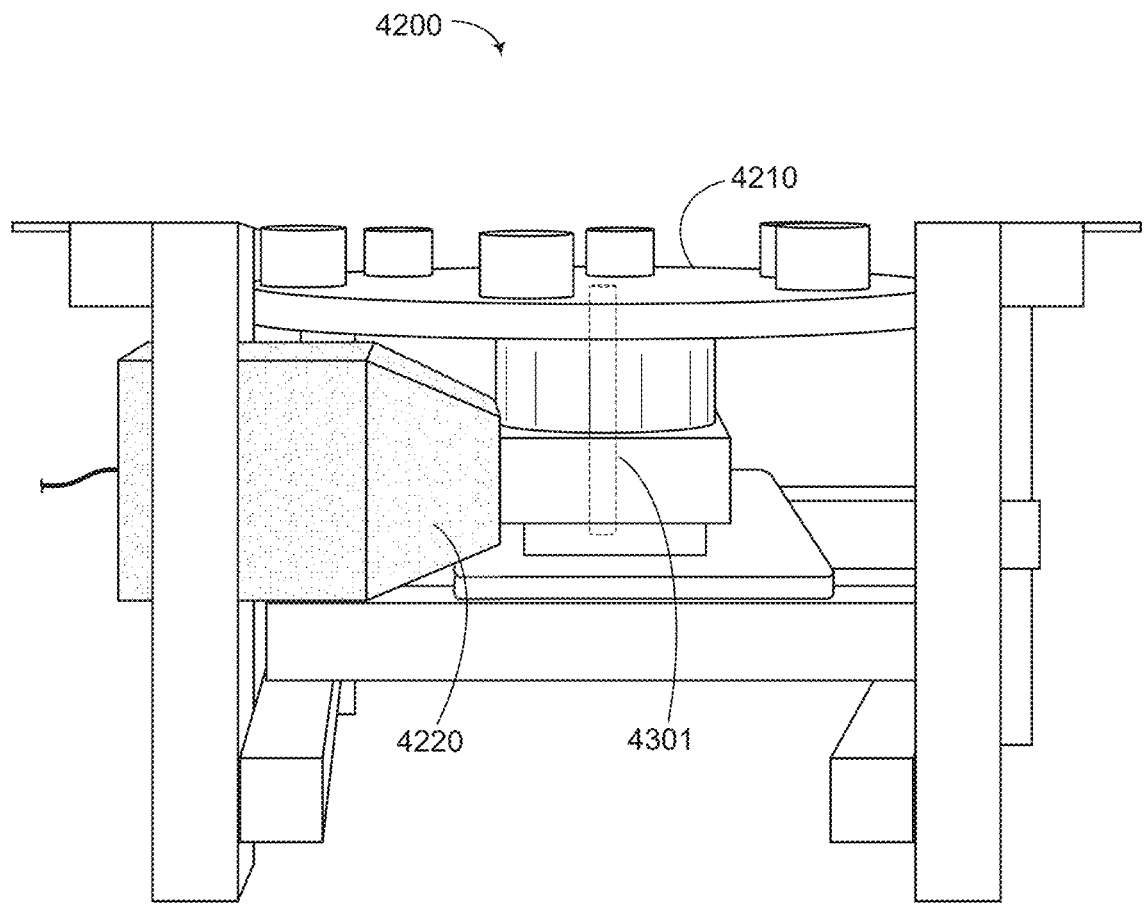
FIG. 43 illustrates side view of an example movable unit, mounting unit, and motor according to another embodiment.

FIGS. 36, 42-43 illustrate another embodiment. In these examples, the movable unit rotates adjacent to one surface (e.g., under a counter) and a corresponding engaging unit rotates on the other surface (e.g., above the counter). As illustrated in FIG. 36, one example movable unit 3610 is a platform that rotates around an axel 3611. The axel may be driven by a motor 3612, for example, under the control of a control unit 3613 and server 3614 as described above. Accordingly, in this example, the mechanical guide is the axel and the path is a rotational path around the axel, for example. The movable unit may be mounted under a surface 3601 using a mounting unit (not shown in FIG. 36) similar to that shown for the rail embodiment, where posts may set the distance between the magnets on the movable unit and the lower surface, for example.

In the examples shown in FIGS. 36, 42-43, the movable unit 3610 is a round platform comprising a plurality of magnets 3620-3623 arranged in a pattern around the platform along (e.g., in a circle). The engaging unit 3630 configured on upper surface 3602 may be a carousel (referred to herein as a "lazy susan"), for example, comprising a plurality of magnets 3640-3643 arranged to meet the plurality of magnets 3620-3623 in the movable unit 3610 and form a binding force, for example. In one example embodiment, the lazy susan has an outer annulus 3631 that rotates and an inner circle 3632 that is stationary. A second movable unit, guide, and engaging unit (e.g., as illustrated in FIGS. 35 and 37-41) form an auxiliary path ("Aux Path") 3690 and may be configured to move items off the lazy susan as the outer annulus rotates to different positions, for example. For instance, the lazy susan may be rotated to place an item in front of and along an auxiliary (Aux) path of a puck 3650. The delivery system may engage the puck to move the item off the lazy susan to a second predetermined position 3651 for delivering the item for pick up, for example. Other embodiments may use additional auxiliary paths to move items off a lazy susan, for example.

FIGS. 42 and 43 illustrate different views of an example rotational delivery system 4200. FIG. 42 illustrates an example movable unit, mounting unit, and motor system. In this example, movable unit 4210 is a round platform comprising five (5) magnets 4211 arranged around the circumference of the platform. The platform is rotated under control of a motor 4220 that receives electrical control signals from a control unit (not shown). Motor 4220 is coupled to an axel, and the axel is coupled to the center of the movable unit platform. The mounting unit comprises mounting brackets 4230, mounting posts 4231, and crossbars 4232. Movable unit 4210 is coupled to the crossbars 4232, which in this example are also coupled to the mounting posts 4231. The mounting posts 4231 and mounting brackets 4230 are configured to attach the mounting unit on a surface such that the magnets of the movable unit 4210 are positioned close to and approximately coplanar with the surface (e.g., a lower surface of a counter). In this example, a position sensor 4250 may be configured near an edge of the movable unit 4210 to sense a rotational position of the platform, for example, which may be useful in controlling and/or calibrating the precise position of the platform, for example. FIG. 43 illustrates a side view of the rotational delivery system of FIG. 42. FIG. 43 illustrates that motor 4220 is coupled to and may drive axel 4301 under control of electrical signals from a controller. Motor 4220 may rotate axel, and thus movable unit 4210, clockwise or counterclockwise (or both) to any of a variety of angular positions as desired to cause a corresponding engaging unit to deliver items.

Example Computer System

Figure 44:
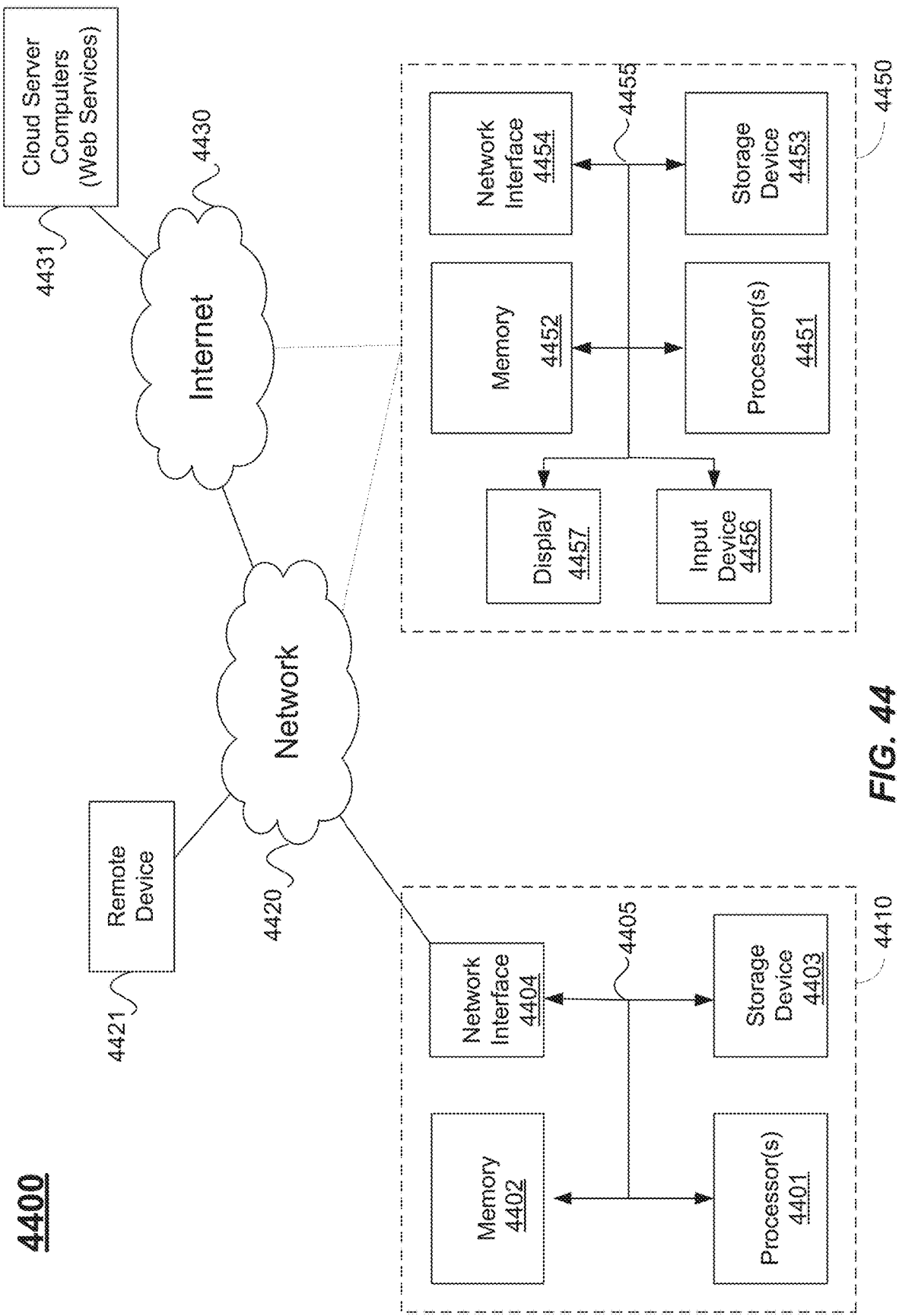
FIG. 44 illustrates computer system hardware according to the above disclosure.

FIG. 44 illustrates known elements of computer system hardware configured according to the innovative techniques in the above disclosure. The following hardware description is merely one illustrative example. It is to be understood that a variety of computer hardware topologies may be used to implement the above described techniques. An example server computer system 4410 is illustrated in FIG. 44. Computer system 4410 includes a bus 4405 or other communication mechanism for communicating information, and one or more processor(s) 4401 coupled with bus 4405 for processing information, including instructions received from a cloud server as described herein. Computer system 4410 also includes a memory 4402 coupled to bus 4405 for storing information and instructions to be executed by processor 4401, including information and instructions for performing some of the techniques described above, for example. Memory 4402 may also be used for storing programs executed by processor(s) 4401. Possible implementations of memory 4402 may be, but are not limited to, random access memory (RAM), read only memory (ROM), or both. A storage device 4403 is also provided for storing information and instructions. Common forms of storage devices include, for example, a hard drive, a magnetic disk, an optical disk, a CD-ROM, a DVD, a flash or other non-volatile memory, a USB memory card, or any other medium from which a computer can read. Storage device 4403 may include source code, binary code, or software files for configuring the hardware to perform the techniques above, for example. Storage device 4403 and memory 4402 are both examples of non-transitory computer readable storage mediums. Computer systems including one or more processors, memory, storage, and a network interface may be used across a wide range of applications, including data centers 4431 for cloud computing, local hardware servers 4410, and remote devices 4421, for example. In one embodiment, one or more of cloud server computers 4431 may reside in a cloud computing environment, for example, and may include storage devices, processors, and memory like computer 4410 for executing instruction to perform the cloud operating system and control aspects of the disclosure described above.

Computer system 4410 also includes a network interface 4404 coupled with bus 4405. Network interface 4404 may provide two-way data communication between computer system 4410 and a local network 4420. Network 4420 may represent one or multiple networking technologies, such as Ethernet, local wireless networks (e.g., WiFi), or cellular networks, for example. The network interface 4404 may be a wireless or wired connection, for example. Computer system 4410 can send and receive information through the network interface 4404 across a wired or wireless local area network, an Intranet, or a cellular network to the Internet 4430, for example.

In some embodiments, users may access the system using another computing device 4450, such as a tablet computer or mobile computer device (e.g., a mobile phone). Using a local application (e.g., an "App") or a browser, for example, users may access data and features described herein (e.g., placing an order or modifying an amount of ingredients in a recipe). In one embodiment, computing device 4450 may access software on cloud server computers 4431 across the Internet 730, for example. In another embodiment, computing device 4450 may access software on cloud server computers 4431 over network 4420 (e.g., using a dedicated tablet for a kiosk).

In some applications, computing device 4450 may also include a processor 4451, memory 4452, storage 4453, network interface 4454, and a bus 4455. Additionally, the aforesaid components may be coupled via bus 4405 to a display 4457 for displaying information to a computer user. An input device 4456 such as a keyboard, touchscreen, and/or mouse is coupled to bus 4455 for communicating information and command selections from the user to processor 4451. The combination of these components allows the user to communicate with the system. In some systems, buses 4405 and 4455 represent multiple specialized buses for coupling various components of the computer together, for example.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A cloud computer system for controlling a plurality of remote devices comprising:
   a first server including a cloud based operating system comprising a plurality commands to be performed by a plurality of remote devices in a remote system and operations for triggering processes executed by the remote devices, the cloud based operating system generating a set of instructions from the plurality of commands and corresponding operations to control a portion of the remote devices to perform a task; and
   a second server coupled to the plurality of remote devices, the second server receiving the instructions from the first server, the second server distributing particular instructions to corresponding remote devices, wherein the second server distributes the instructions based on particular operations in the instructions corresponding to particular remote devices, and wherein the second server manages the execution of instructions in the remote devices,
   wherein when a first command associated with a first operation corresponding to a first remote device is triggered in the first server, the first server generates instructions including the first operation, and the second server distributes the first operation to the first remote device for execution, and wherein when a second command associated with a second operation corresponding to a second remote device is triggered in the first server, the first server generates instructions including the second operation, and the second server distributes the second operation to the second remote device for execution.

2. The system of claim 1 wherein multiple remote devices execute instructions from the second server in parallel.

3. The system of claim 1 wherein the commands are natural language expressions corresponding to one or more device specific operations executable by a remote device.

4. The system of claim 1 wherein the commands are mapped to one or more operations for a particular device.

5. The system of claim 1 wherein the commands are mapped to one or more device specific operations executable by one or more remote devices to perform one or more device specific processes.

6. The system of claim 1 wherein the commands are mapped to a particular device, a particular device specific operation, and one or more parameters for the device specific operation.

7. The system of claim 1 wherein at least one remote device is a robotic system.

8. The system of claim 1 wherein the distribution of instructions alternates between sending an instruction to a robotic system and sending an instruction to one of the other remote devices.

9. The system of claim 1 wherein the instructions generated by the first server comprise remote device identifications of particular remote devices associated with the operations, and the second server distributes particular instructions based on the remote device identification.

10. The system of claim 1 wherein one or more remote devices are specified as sharable, and wherein the instructions from the first server indicate remote devices that are sharable, wherein when a first remote device specified as sharable is inactive during a first job corresponding to first instructions from the first server, the second server distributes an instruction to the first remote device from a second job corresponding to second instructions from the first server.

11. The system of claim 1 wherein the remote devices have associated operations and parameters stored in the first server.

12. The system of claim 1 wherein the first server stores information specifying whether or not a remote device is sharable.

13. The system of claim 1 wherein a result of a first command modifies parameters associated with a subsequent command.

14. The system of claim 1 wherein the first server further stores production recipes specifying a plurality of ingredients, wherein the ingredients are stored in a first plurality of the remote devices, wherein the ingredients are components of a product produced by the remote devices, and wherein a particular remote device dispenses a particular ingredient in response to a particular instruction.

15. The system of claim 1 wherein the first server further stores production recipes comprising steps stored in the first server, wherein the steps are natural language descriptions of a particular portion of a process for producing the product.

16. The system of claim 15 wherein the production recipe steps stored in the first server are associated with a priority, wherein the priorities of different steps of a particular production recipe are different and control the order that the second server distributes instructions to each device, wherein the priority is stored in the instructions sent from the first server to the second server.

17. The system of claim 15 wherein the first server further stores a plurality of mappings associating recipe steps with particular remote devices and one or more device specific operations.

18. The system of claim 1 wherein a plurality of mappings associate particular devices in a cluster of remote devices with ingredients, wherein the ingredients are components of a product being produced by execution of the instructions across the remote devices in the cluster.

19. The system of claim 1 wherein one or more remote devices are associated with a place data element stored in the first server, the place data element providing a physical position of a particular remote device for interaction with a robotic system.

20. The system of claim 1 wherein the first server is a cloud server and the second server is a local server in the same location as the remote devices, wherein the local server and the remote devices are configured in a kiosk.

21. The system of claim 1 wherein a robotic system moves an item between physical interfaces of a first plurality of the remote devices, wherein each remote device and the robotic system are coupled to a second server over a network, and the second server coordinates movement of the item by the robotic system across a plurality of predetermined positions based on the distribution of instructions by the second server, wherein the predetermined positions are the locations of the physical interfaces for the remote devices for receiving the item.

22. The system of claim 21 wherein, after the robotic system places the item in a particular physical interface for receiving the item, the corresponding remote device receives an instruction from the second server, wherein the instruction configures the remote device to move one or more components from a first location to a second location, wherein the second location is in the particular physical interface, and in accordance therewith, the remote device couples the one or more components to the item.

23. The system of claim 22 wherein the components are food ingredients and the item is a food item under production.

24. The system of claim 23 wherein the components are one or more of a powdered food item, a granulated food item, a cut food item, or a liquid food item, and the remote devices include a plurality of dispensers.

25. The system of claim 1 wherein a plurality of the remote devices have physical interfaces for receiving an item placed in the physical interfaces by a robotic system, and wherein the remote devices move components of the item under production into the physical interface based on instructions received from the first server and distributed to the remote devices by the second server.

26. The system of claim 1 wherein a first device coupled to the second server is a robotic system having a maximum reach, and wherein the plurality of remote devices are configured around the robotic system such that physical interfaces for the remote devices are within said maximum reach.

27. The system of claim 26 wherein the maximum reach of the robotic system extends over a first portion of a counter, and wherein a second portion of the counter is outside the maximum reach of the robotic system, wherein the robotic system places completed items at a first predetermined position on the counter inside the maximum reach, and wherein a delivery mechanism moves the completed items from inside the maximum reach to outside the maximum reach to a second predetermined position.

28. The system of claim 1 wherein the remote devices comprise a robotic system and a delivery system, and wherein the second server distributes a first instruction from the first server to the robotic system to place a completed item in a first predetermined position on a counter within a reach of the robotic system, and after the robotic system sends a signal to the second server indicating that the robotic system has completed the place operation, the second server distributes a second instruction from the first server to the delivery system to move the completed item from the first predetermined position to a second predetermined position outside the reach of the robotic system.

29. The system of claim 1 wherein the plurality of remote devices and the second server are a food production kiosk.

30. The system of claim 1 wherein the plurality of remote devices comprise one or more dispensers, one or more physical processing units, a robotic system, and a delivery system for moving an automatically produced food product from a first position on a counter within a reach of the robotic system to a second position on the counter outside the reach of the robotic system.

31. The system of claim 1 wherein the first server stores information comprising:
   food recipes comprising a plurality of natural language steps and a plurality of ingredients, the steps having an associated order;
   devices comprising operations, which when received by the remote devices, cause the remote devices to execute device specific processes, each operation comprising one or more corresponding parameters;
   mappings associating steps of the recipes to one or more operations on the devices; and
   mappings associating food ingredients to particular devices,
   wherein, in response to execution of a recipe, the information on the first server is automatically translated into instructions, sent to a kiosk comprising the second server and the remote devices, and the second server distributes instructions comprising the operations to the remote devices based on the order to produce a food product.

32. A computer implemented method of controlling a plurality of remote devices from a cloud computer system comprising:
   storing, in a memory of the cloud computer system, commands to be performed by a plurality of remote devices in a remote system and one or more operations for triggering processes executed by the remote devices,
   generating a set of instructions in the cloud computer system in response to a user input, the instructions being generated from the plurality of commands and corresponding operations to control a portion of a plurality remote devices to perform a task; and
   sending the instructions to a first server over a network, wherein the first server is coupled to the plurality of remote devices, the first server receiving the instructions and distributing particular instructions to corresponding remote devices, wherein the first server distributes the instructions based on particular operations in the instructions corresponding to particular remote devices, and wherein the first server manages the execution of instructions in the remote devices, wherein the remote devices receiving the distributed instructions execute the particular instructions received from the first server, and wherein each remote device is configured to execute a plurality of predefined device specific processes in response to the particular instruction.

33. The method of claim 32 wherein at least one remote device is a robotic system.

34. The method of claim 32 wherein the first server further stores production recipes specifying a plurality of ingredients, wherein the ingredients are stored in a first plurality of the remote devices, wherein the ingredients are components of a product produced by the remote devices, and wherein a particular remote device dispenses a particular ingredient in response to a particular instruction.

35. The method of claim 32 wherein the first server further stores production recipes comprising steps stored in the first server, wherein the steps are natural language descriptions of a particular portion of a process for producing the product.

36. The method of claim 32 wherein a plurality of mappings associate particular devices in a cluster of remote devices with ingredients, wherein the ingredients are components of a product being produced by execution of the instructions across the remote devices in the cluster.

37. The method of claim 32 wherein one or more remote devices are associated with a place data element stored in the first server, the place data element providing a physical position of a particular remote device for interaction with a robotic system.

38. The method of claim 32 wherein the plurality of remote devices and the second server are a food production kiosk.

39. The method of claim 32 wherein the first server stores information comprising:
   food recipes comprising a plurality of natural language steps and a plurality of ingredients, the steps having an associated order;
   devices comprising operations, which when received by the remote devices, cause the remote devices to execute device specific processes, each operation comprising one or more corresponding parameters;
   mappings associating steps of the recipes to one or more operations on the devices; and
   mappings associating food ingredients to particular devices,
   wherein, in response to execution of a recipe, the information on the first server is automatically translated into instructions, sent to a kiosk comprising the second server and the remote devices, and the second server distributes instructions comprising the operations to the remote devices based on the order to produce a food product.

40. A non-transitory machine-readable medium storing a program executable by at least one processing unit of a computer for controlling a plurality of remote devices from a cloud computer system, the program comprising sets of instructions for:
   storing, in a memory of the cloud computer system, commands to be performed by a plurality of remote devices in a remote system and one or more operations for triggering processes executed by the remote devices,
   generating a set of instructions in the cloud computer system in response to a user input, the instructions being generated from the plurality of commands and corresponding operations to control a portion of a plurality remote devices to perform a task; and sending the instructions to a first server over a network, wherein the first server is coupled to the plurality of remote devices, the first server receiving the instructions and distributing particular instructions to corresponding remote devices, wherein the first server distributes the instructions based on particular operations in the instructions corresponding to particular remote devices, and wherein the first server manages the execution of instructions in the remote devices, wherein the remote devices receiving the distributed instructions execute the particular instructions received from the first server, and wherein each remote device is configured to execute a plurality of predefined device specific processes in response to the particular instruction.

41. The machine-readable medium of claim 40 wherein at least one remote device is a robotic system.

42. The machine-readable medium of claim 40 wherein the first server further stores production recipes specifying a plurality of ingredients, wherein the ingredients are stored in a first plurality of the remote devices, wherein the ingredients are components of a product produced by the remote devices, and wherein a particular remote device dispenses a particular ingredient in response to a particular instruction.

43. The machine-readable medium of claim 40 wherein the first server further stores production recipes comprising steps stored in the first server, wherein the steps are natural language descriptions of a particular portion of a process for producing the product.

44. The machine-readable medium of claim 40 wherein a plurality of mappings associate particular devices in a cluster of remote devices with ingredients, wherein the ingredients are components of a product being produced by execution of the instructions across the remote devices in the cluster.

45. The machine-readable medium of claim 40 wherein one or more remote devices are associated with a place data element stored in the first server, the place data element providing a physical position of a particular remote device for interaction with a robotic system.

46. The machine-readable medium of claim 40 wherein the plurality of remote devices and the second server are a food production kiosk.

47. The machine-readable medium of claim 40 wherein the first server stores information comprising:
    food recipes comprising a plurality of natural language steps and a plurality of ingredients, the steps having an associated order;
    devices comprising operations, which when received by the remote devices, cause the remote devices to execute device specific processes, each operation comprising one or more corresponding parameters;
    mappings associating steps of the recipes to one or more operations on the devices; and
    mappings associating food ingredients to particular devices,
    wherein, in response to execution of a recipe, the information on the first server is automatically translated into instructions, sent to a kiosk comprising the second server and the remote devices, and the second server distributes instructions comprising the operations to the remote devices based on the order to produce a food product.

* * * * *